United States Patent [19]
Riffat et al.

[11] Patent Number: 6,158,237
[45] Date of Patent: Dec. 12, 2000

[54] ROTATABLE HEAT TRANSFER APPARATUS

[75] Inventors: Saffa Bashir Riffat, Loughborough; Ian William Eames, Barlborough, both of United Kingdom

[73] Assignee: The University of Nottingham, United Kingdom

[21] Appl. No.: 09/068,256

[22] PCT Filed: Nov. 5, 1996

[86] PCT No.: PCT/GB96/02704

§ 371 Date: Mar. 5, 1999

§ 102(e) Date: Mar. 5, 1999

[87] PCT Pub. No.: WO97/17585

PCT Pub. Date: May 15, 1997

[51] Int. Cl.[7] .............. F25B 15/12; F24F 3/14; B01D 47/16
[52] U.S. Cl. .................. 62/484; 165/92; 261/90
[58] Field of Search .......... 62/476, 484, 494; 165/83, 86, 92, 110; 261/90, 89, 92

[56] References Cited

U.S. PATENT DOCUMENTS

| | | | |
|---|---|---|---|
| 3,544,084 | 12/1970 | Macrow | 261/29 |
| 3,605,436 | 9/1971 | Gammill | 62/476 |
| 5,249,436 | 10/1993 | Hemsath | 62/476 |
| 5,303,565 | 4/1994 | Pravda | 62/476 |
| 5,345,998 | 9/1994 | Itoh | 165/86 |

FOREIGN PATENT DOCUMENTS 565756  3/1958  Belgium .

*Primary Examiner*—William Doerrler
*Attorney, Agent, or Firm*—Watts, Hoffman, Fisher & Heinke CO LPA

[57] ABSTRACT

Heat transfer apparatus comprises a refrigeration assembly having a low pressure region and a high pressure region. The apparatus may also include a power generation assembly connected to the refrigeration assembly between the low and high pressure regions. The refrigeration assembly and the power generation assembly are so arranged that refrigerant in the high pressure region can be passed through the power generation assembly to the low pressure region of the refrigeration assembly. Power may be generated by the power generation assembly on passage therethrough of the refrigerant. The apparatus may also include an absorption region comprising a piston and cylinder, ejector cycles in combination with absorption cycles, fibre heat exchanges, vortex tubes, and one embodiment comprises lamp or a torch.

12 Claims, 37 Drawing Sheets

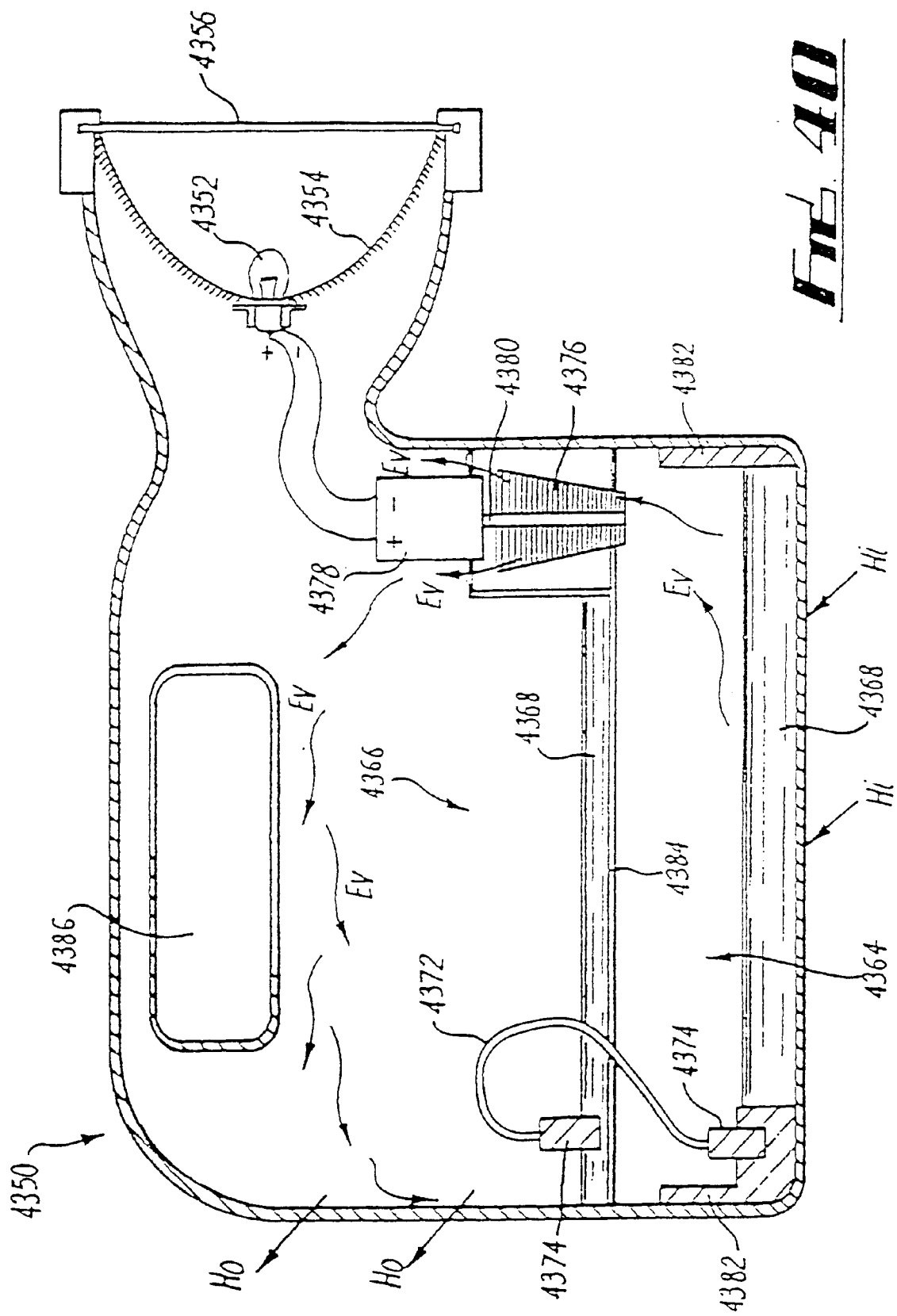

ROTATABLE HEAT TRANSFER APPARATUS

This invention relates to heat transfer apparatus.

Known heat transfer apparatus are expensive and inefficient. Also, some use techniques and materials that are damaging to the environment.

According to one aspect of this invention there is provided heat transfer apparatus comprising a refrigeration assembly having a low pressure region and a high pressure region, a power generation assembly connected to the refrigeration assembly and a refrigerant adapted to circulate in said refrigeration assembly between said low and high pressure regions, the refrigeration assembly and the power generation assembly being so arranged that refrigerant in the high pressure region can be passed through the power generation assembly to the low pressure region of the refrigeration assembly, whereby power is generated by the power generation assembly on passage therethrough of the refrigerant.

Desirably the power generation assembly comprises a turbine or an engine to which high pressure refrigerant can be passed, and may further include an electrical generator for generating electric power.

The refrigeration assembly preferably includes a condenser to condense refrigerant in the refrigeration assembly and may further include an evaporator to receive refrigerant from the condenser, whereby the evaporator is adapted to evaporate said refrigerant. Pressure reducing means, which may comprise a valve, is conveniently arranged between the condenser and the evaporator to reduce the pressure of the refrigerant passed to the evaporator.

The refrigeration assembly may further include an absorber to receive low pressure evaporated refrigerant from the evaporator. The absorber may include an absorbent capable of absorbing the refrigerant to produce a strong refrigerant solution.

The refrigeration assembly may further include heating means to which the strong refrigerant solution can be passed to be heated, the heating means being adapted to vaporise at least some of the refrigerant from the strong refrigerant solution to produce high pressure refrigerant vapour and a weak refrigerant solution. The weak refrigerant solution is preferably thereafter returned to the absorber. The heating means may comprise a solar collector and, conveniently, gas burner.

Pumping means may be arranged between the heating means and the absorber to pump the strong refrigerant solution to the heating means. A pre-heater may be provided between the pumping means and the heating means to pre-heat the strong refrigerant solution prior to it being passed to the heating means.

The pre-heater is conveniently in the form of a heat exchanger through which low temperature strong refrigerant solution is passed on one side and high temperature weak refrigerant solution is passed on the other side, and heat being exchanged between the strong and the weak refrigerant solutions to heat the strong refrigerant solution prior to the strong refrigerant solution being passed to the heating means and cool the weak refrigerant solution prior to the weak refrigerant solution being returned to the absorber.

Separating means may be provided to separate off the vaporised refrigerant from weak refrigerant solution.

The refrigeration assembly and the power generation assembly may be arranged in parallel so that some refrigerant can be passed to the power generation assembly after vaporisation thereof in the heating means, and the remainder of the refrigerant can be passed to the condenser. In this embodiment, low pressure refrigerant from the power generation assembly is passed to the absorber.

Alternatively, the refrigeration assembly and the power generation assembly may be arranged in series whereby substantially all the refrigerant is passed to the power generation assembly after vaporisation in the heating means. Thereafter, the refrigerant is preferably passed to the condenser.

In another embodiment, apparatus may comprise first and second heating means arranged in parallel, wherein each heating means may comprise a solar collector and, conveniently, a gas burner. Some of the strong refrigerant solution from the absorber may be passed to the first heating means, whereby substantially all the refrigerant vaporised in the first heating means is passed to the power generating assembly. The remainder of the refrigerant from the absorber is preferably passed through the second heating means, whereby substantially all the refrigerant vaporised in the second heating means is passed to the condenser. In this embodiment, the apparatus may include first and second separating means, the second separating means being adapted to separate refrigerant vaporised in the second heating means from the weak refrigerant solution formed therein and to pass said weak refrigerant solution to the pre-heater, and the first separating means being adapted to separate refrigerant vaporised in the first heating means from the weak refrigerant solution formed therein, and pass said weak refrigerant solution to the second separating means.

In a further embodiment, the apparatus may include first and second heating means arranged in parallel whereby strong refrigerant solution is passed through a first pre-heater. Thereafter, some of the strong refrigerant solution may be passed to the first heating means, desirably via a second pre-heater, and the remainder may be passed to the second heating means. Some of the refrigerant vaporised in the first heating means is preferably passed to the power generating assembly. The remainder of the refrigerant vaporised in the first heating means may be passed to the second heating means wherein heat is transferred to evaporate refrigerant from the strong refrigerant solution passing through the second heating means. The weak refrigerant solution from the first and second heating means may be passed via the pre-heater to the absorber.

Alternatively, the first and second heating means may be arranged in series whereby substantially all the strong refrigerant solution from the absorber is preferably passed through the first heating means to produce vaporised refrigerant and an intermediate refrigerant solution. The intermediate refrigerant solution from the first heating means may be passed to the second heating means for further vaporisation of refrigerant. Preferably, refrigerant vaporised in the first heating means not passed to the power generating assembly may be passed through the second heating means to evaporate refrigerant in the intermediate solution passing therethrough to produce further vaporised refrigerant and a weak refrigerant solution wherein refrigerant from the first heating means passing through the second heating means may be passed thereafter to the condenser. Refrigerant vaporised from the intermediate refrigerant solution in the second heating means may be passed to the condenser. Preferably, the weak refrigerant solution formed in the second heating means is returned to the absorber.

According to another aspect of this invention there is provided a method for generating power comprising circulating a refrigerant around a refrigeration assembly having a high pressure region and a low pressure region, passing some of said refrigerant from said high pressure region through a power generation assembly to generate power, and passing the refrigerant from the power generation assembly to the low pressure region of the refrigeration assembly.

Preferably, the power generation assembly comprises a turbine and said high pressure refrigerant is passed to said turbine to generate power.

The method may further include evaporating said refrigerant in an evaporator and passing said evaporated refrigerant through an absorber for absorption in an absorbent to produce a strong refrigerant solution.

Preferably, the method further includes passing the strong refrigerant solution from the absorber to heating means which may comprise a solar collector whereby the strong refrigerant solution is heated by solar energy. The heating means may also include a gas burner.

The method preferably includes the step of vaporising at least some of said refrigerant in said heating means to produce the high pressure refrigerant vapour and a weak refrigerant solution.

The strong refrigerant solution may be pumped by pumping means from the absorber to the heating means. Prior to entry into the heating means, the strong refrigerant solution may be heated by a pre-heater which may be in the form of a heat exchanger wherein low temperature strong refrigerant solution is passed on one side through the heat exchanger and high temperature weak refrigerant solution is passed on the other side through the heater exchanger whereby heat is exchanged between the strong and weak solutions.

The high pressure vaporised refrigerant may be separated from the weak refrigerant solution by separating means downstream of the heating means. In one embodiment, some of the vaporised refrigerant from the heating means may be passed to the power generation assembly, and the remainder of the vaporised refrigerant may be passed to a condenser to be condensed. The condensed refrigerant may be passed from the condenser via pressure reducing means to an evaporator for evaporation. In this embodiment, the low pressure refrigerant from the power generation assembly is preferably passed to the absorber.

In another embodiment substantially all the vaporised refrigerant from the heating means may be passed to the power generation assembly and thereafter to the condenser.

According to one aspect of the present invention there is provided heat transfer apparatus comprising means providing a closed circuit for movement of a heat transfer fluid therein, means in the circuit for pressurising the fluid, means in the circuit for removing heat from the pressurised fluid, and means in the circuit for reducing the pressure of the fluid and effecting the introduction of heat thereto.

Preferably the heat transfer fluid is a refrigerant vapour and the pressurising means is adapted to compress the vapour and cause the latter to be absorbed or adsorbed in a combination of refrigerant and absorbent. Means may be provided for heating the combination after compression and absorption or adsorption whereby to expel the absorbed refrigerant vapour under pressure.

The pressurising means may be a heat pump having a piston in a valved cylinder with the refrigerant vapour and the combination located between one side of the piston and a respective end of the cylinder, whereby movement of the piston towards said cylinder end compresses the vapour and causes absorption or adsorption, means being provided to open a valve of the cylinder to enable movement of the pressurised vapour to the heat removing means. The latter may comprise a condenser adapted to cause the refrigerant vapour to condense to liquid.

The circuit preferably includes a liquid accumulator between the condenser and an evaporator for effecting the introduction of heat to the refrigerant liquid. Pressure may be reduced in the evaporator by movement of the piston away from said one cylinder end whereby to enable boiling of the refrigerant liquid by extraction of heat from an area surrounding the evaporator, and thereby create a refrigerating effect in that area.

A further heat pump may be provided to operate in the closed circuit in the same manner as the first mentioned heat pump whereby to achieve continuous evaporation and consequent refrigeration.

According to one aspect of the invention there is provided heat transfer apparatus comprising an ejector cycle and an absorbent cycle, wherein refrigerant is recycled between the ejector and absorbent cycles.

Advantageously, the ejector cycle included an ejector so arranged to entrain refrigerant from the absorbent cycle.

Preferably, the ejector cycle comprises a generator for generating refrigerant vapour of a relatively high pressure and an ejector to which said generated refrigerant is passed. Preferably, the absorbent cycle comprises an evaporator for evaporating liquid refrigerant to form refrigerant vapour of a relatively low pressure, an absorber comprising an absorbent for absorbing refrigerant vapour from the evaporator to form a solution of refrigerant and absorbent, and a concentrator for evaporating some of the refrigerant from the solution to form refrigerant vapour of a relatively low pressure. In one embodiment, the ejector is connected to the evaporator to entrain some of the refrigerant vapour therefrom. In a second embodiment, the ejector is connected to the concentrator to entrain refrigerant vapour therefrom.

According to another aspect of the invention there is provided heat transfer apparatus comprising an ejector cycle and an absorbent cycle, the ejector cycle comprising a generator for generating refrigerant vapour of a relatively high pressure, and an ejector to which said generated refrigerant is passed, and the absorbent cycle comprising an evaporator for evaporating liquid refrigerant to form refrigerant vapour of a relatively low pressure, an absorber comprising an absorbent for absorbing refrigerant vapour from the evaporator to form a solution of refrigerant and absorbent, and a concentrator for evaporating some of the refrigerant from the solution to form refrigerant vapour of a relatively low pressure, wherein the ejector is connected to either the evaporator or the concentrator to entrain refrigerant vapour from either the evaporator or the concentrator.

Conveniently, the concentrator is in the form of a heat exchanger whereby relatively high temperature refrigerant passes on a first side thereof, desirably from the ejector cycle, preferably the generator, and relatively low temperature refrigerant, passes on a second side thereof, desirably from the absorbent cycle, preferably the absorber.

Preferably, the refrigerant from the generator is passed via the ejector to the concentrator, mixed with refrigerant entrained by the ejector.

In the first embodiment, in which the ejector entrains refrigerant from the evaporator, the apparatus includes a condenser wherein refrigerant is passed from the second side of the concentrator to the condenser. Preferably, refrigerant from the condenser is passed to the evaporator and the generator. In this embodiment, substantially all the refrigerant from the first side of the concentrator is passed to the evaporator.

In the second embodiment, in which the ejector entrains refrigerant from the concentrator, refrigerant is passed from the second side of the concentrator to the evaporator and the generator.

The apparatus may further include an expansion valve for refrigerant passed to the evaporator. In the first embodiment, two expansion valves are provided for refrigerant passed to the evaporator, the first expansion valve being provided for refrigerant passed to the evaporator from the first side of the concentrator, and the second expansion valve being provided for refrigerant passed to the evaporator from the second side of the concentrator. A further expansion valve may be provided for absorbent passed from the second side of the concentrator to the absorber.

A pump may be provided to pump the solution from the absorber to the concentrator. A pump may also be provided to pump refrigerant to the generator.

According to a further aspect of the invention, there is provided power generating apparatus comprising heat transfer apparatus as described above and power generating means connected between the ejector cycle and the absorbent cycle.

Preferably, refrigerant is passed from the ejector cycle to the power generating means to generate power and thereafter refrigerant is passed from the generating means to the absorbent cycle.

Advantageously, the power generating means is connected to the generator, whereby some of the refrigerant generated therein at said relatively high pressure is passed to the power generating means therefrom.

In a first embodiment of the power generating apparatus, the first embodiment of the heat transfer apparatus includes power generating means connected between the generator and the absorber, whereby refrigerant from the power generating means is passed to the absorber. In a second embodiment of the power generating apparatus, the second embodiment of the heat transfer apparatus includes power generating means connected between the generator and the absorber, whereby refrigerant from the power generating means is passed to the absorber.

According to another aspect of the invention there is provided apparatus for treating a liquid, comprising heat transfer apparatus as described above the liquid constituting the refrigerant, the heat transfer apparatus includes a liquid feed to the evaporator, a product discharge from the evaporator to discharge non-evaporated feed material from the evaporator, and a condensate discharge from the concentrator to discharge concentrate therefrom.

Preferably, some of the liquid passed from the second side of the concentrator is passed to the conduit discharge and the remainder is passed to the generator.

This aspect of the invention can be advantageously used as a water distillation apparatus wherein the liquid is in the form of brine, the product being a more concentrated salt solution, and the condensate being fresh water. Alternatively, the apparatus can be used as a distillation apparatus or as a concentrating apparatus.

According to a further aspect of the invention there is provided heat transfer apparatus comprising a heat transfer cycle including a main generator for generating refrigerant vapour, an ejector cycle to which the refrigerant vapour can be passed from the main generator, and an adsorber to which refrigerant can be passed from the ejector cycle.

In one embodiment, the ejector cycle comprises a subsidiary generator to which heated refrigerant vapour can be passed from the ejector, the second generator being charged with a predetermined amount of refrigerant, whereby the heat from the refrigerant passed thereto from the ejector is transferred to the charge of refrigerant in the second generator to evaporate said charge of refrigerant to refrigerant vapour. The ejector cycle may further include a condenser to condense the evaporated charge of refrigerant from the second generator, and, desirably an evaporator to receive refrigerant from the condenser. Preferably, the evaporator is connected to the ejector whereby low pressure refrigerant vapour in the evaporator is entrained by refrigerant passing through the ejector. Preferably an expansion valve is provided between the evaporator and the condenser to expand refrigerant from the condenser before entering the evaporator. Preferably, the adsorber is connected to the ejector cycle via the evaporator, wherein the refrigerant evaporated in the evaporator is passed to the adsorber.

Preferably, the subsidiary generator is charged with a refrigerant/adsorbent combination, and the adsorber is provided with an adsorbent which may be the same as the adsorbent in the subsidiary generator to adsorb thereon refrigerant from the evaporator.

Preferably, the adsorber is part of a second heat transfer cycle, preferably including a second ejector, a second main generator, a second evaporator and a second condenser. The adsorber preferably constitutes the second subsidiary generator as described above, and the first mentioned subsidiary generator may constitute a second adsorber to receive refrigerant.

In another embodiment, the ejector cycle comprises first and second ejectors. The ejector cycle preferably further includes a condenser and an evaporator, the condenser being in communication with the evaporator via an expansion valve. The condenser is conveniently connected to the first ejector, wherein refrigerant vapour from the generator passing through the first ejector entrains refrigerant from the evaporator, and the exhaust from the first ejector is preferably passed to the condenser and thereafter is desirably passed to the evaporator via the expansion valve. The remainder of the refrigerant from the generator is preferably passed to the second ejector which entrains refrigerant from the evaporator, wherein the exhaust from the second ejector is passed to a second generator having an adsorbent therein to adsorb refrigerant.

Preferably, the first generator includes an adsorbent/refrigerant combination whereby when heat is fed thereto, the refrigerant is evaporated.

The apparatus may further include a second heat transfer cycle to transfer refrigerant from the adsorber to the generator, the second heat transfer cycle also comprising first and second ejectors, a condenser and an evaporator arranged in a corresponding way to the first mentioned heat transfer cycle.

According to another aspect of the invention there is provided heat transfer apparatus comprising an absorber, a generator and a vortex tube, the generator being adapted to pass compressed refrigerant to the vortex tube, whereby the relatively hot and relatively cold refrigerant from the vortex tube is passed to an absorber.

Preferably, the absorber includes an absorbent to absorb the refrigerant passed thereto from the vortex tube to form a solution of refrigerant and absorbent. Preferably, the solution is passed to the generator whereby compressed vapour is generated therein and absorbent is passed to the absorber.

A heat exchanger may be provided between the absorber and the generator wherein the solution is passed through one first side thereof and absorbent passed from the generator is passed through the other second side thereof, heat being passed from the absorbent to the solution.

In one embodiment, a first end of the vortex tube, out of which hot refrigerant is passed, is connected to a condenser to condense the hot refrigerant. An evaporator may be connected between the condenser and the absorber to evaporate the condensed refrigerant passed thereto from the condenser thereby extracting heat from its surroundings.

Another embodiment of the invention may be in the form of a heat pipe with opposite ends thereof being connected to the vortex tube. The absorber may constitute a region of the heat pipe. This embodiment may be arranged such that the heat pipe is substantially vertical whereby the absorber is provided at the bottom thereof.

The generator may surround the vortex tube.

According to one aspect of this invention there is provided power generating apparatus comprising an ejector cycle and a power generating cycle, the ejector cycle including a generator for generating relatively high pressure refrigerant and an ejector to which the high pressure refrigerant is passed, the ejector cycle further including low pressure means connected to the ejector from which relatively low pressure refrigerant can be entrained on passage through the ejector of the relatively high pressure refrigerant, and the power generating cycle being connected to the generator whereby relatively high pressure refrigerant is also passed to the power generating cycle to generate power.

Preferably, the generator is powered by a solar collecting cycle comprising a solar collector arranged to pass heat to the generator. The solar collecting cycle may further include heating means to subsidise heat obtained from the solar collector.

Preferably, the refrigerant in the solar collecting cycle is separate from the refrigerant in the power generating apparatus.

The ejector cycle may further include a first condenser to receive refrigerant from the ejector and the power generating cycle and a second condense to receive refrigerant from the first condenser.

According to one aspect of this invention there is provided heat transfer apparatus comprising: a rotatable heat exchanger comprising a plurality of elongate elements extending outwardly from a rotatable shaft; drive means for rotating the heat exchanger; and supply means for supplying a heat transfer fluid to the elongate elements of the heat exchanger; whereby when the heat exchanger is rotated, heat can be transferred to or from the heat transfer fluid via said elongate elements.

Preferably, the elongate elements comprise fins in the form of spines, needles or narrow strips. An advantage of a rotatable heat exchanger is that by using a large number of elongate elements, it provides a large surface area. For example, a heat exchanger having a diameter of 30 cm can provide a surface area of 8 m$^2$.

In one embodiment, the heat transfer apparatus may be in the form of a generator for generating evaporated heat transfer fluid. In another embodiment, the heat transfer apparatus may be in the form of a condenser for receiving and condensing evaporated heat transfer fluid. In another embodiment, the heat transfer apparatus may comprise an absorber whereby an absorbent therein can absorb evaporated heat transfer fluid supplied thereto. In another embodiment, the heat transfer apparatus may comprise an evaporator to receive and evaporate expanded heat transfer fluid supplied thereto.

Preferably, the apparatus comprises a housing for the rotatable heat exchanger. The housing may include a reservoir to hold a liquid, and may further include collection means to collect some of said liquid and deliver the liquid to the elongate elements of the rotatable heat exchanger. The collection means may comprise a pipe rotatable with said rotatable heat exchanger. The collection means is preferably fixedly mounted on the shaft for rotation therewith. Preferably, the collection means comprises a scoop pipe. Alternatively, the collection means may be in the form of a pump operated by the rotation of the rotatable heat exchanger.

The rotatable shaft may comprise a conduit capable of transferring heat from one end region thereof to the opposite end region, upon which conduit the elongate elements are fixedly mounted. Preferably, the conduit is in the form of a rotatable heat pipe. Heat may be transferred to the heat pipe from the elongate elements. Alternatively, heat may be transferred from the heat pipe to the elongate elements.

Alternatively, the rotatable shaft may be a spindle upon which the elongate elements are fixedly mounted.

According to another aspect of this invention, there is provided a heat transfer assembly comprising a heat transfer apparatus as described in the relevant paragraphs above connected to at least one further heat transfer apparatus for transferring the heat transfer fluid from one region of the assembly to another thereby transferring heat from one region of the assembly to another.

Preferably, the, at least one, or each, of said further heat transfer apparatus is in the form of said heat transfer apparatus as described in the relevant paragraphs above.

The heat transfer assembly may comprise an evaporator for evaporating expanded heat transfer fluid. The assembly may further include an absorber to receive said evaporated heat transfer fluid from the evaporator, the absorber containing an absorbent to absorb said heat transfer fluid, to produce a strong heat transfer fluid/absorbent solution. A generator may also be provided for receiving said strong solution to generate evaporated heat transfer fluid and to produce a weak heat transfer fluid/absorbent solution. The assembly may further include a condenser to receive and condense said evaporated heat transfer fluid from the generator.

The expression "strong heat transfer fluid/absorbent solution" is intended to mean a solution having a high concentration of heat transfer fluid. Also, the expression "weak heat transfer fluid/absorbent solution" is intended to refer to a solution having a low concentration of heat transfer fluid.

At least one of the evaporator, the absorber, the generator, and the condenser preferably comprises a heat transfer apparatus described in the relevant paragraphs above.

The weak heat transfer fluid/absorbent solution is conveniently supplied from the generator to the absorber.

In one embodiment each of the evaporator, the absorber and the generator comprise a heat transfer apparatus described in the relevant paragraphs above.

In another embodiment, the condenser may also comprise a heat transfer apparatus as described in the relevant paragraphs above.

These embodiments may comprise a cycle whereby the condensed heat transfer fluid is supplied from the condenser to the evaporator preferably via expansion means to expand the heat transfer fluid, thereby reducing the pressure thereof.

In the second embodiment, the shafts of the rotatable heat exchangers of the generator and the condenser may comprise heat pipes.

In another embodiment, each of the evaporator and the absorber comprise a heat transfer apparatus as described in the relevant paragraphs above.

This embodiment may comprise an open cycle whereby heat transfer fluid is evaporated away at the generator, which may be solar powered. Preferably, the generator comprises a solar collector. Feed means may be provided to feed further refrigerant to the assembly.

In another embodiment, the evaporator, the absorber and the generator may each comprise a heat transfer apparatus as described in paragraphs 4 to 9 above, wherein the assembly provides an open cycle including feed means for feeding a solution comprising the heat transfer fluid as the solvent, to the evaporator for evaporation of the heat transfer fluid therefrom, and condensate discharge means for discharging condensed heat transfer fluid from the condenser. The assembly of the fourth embodiment may further include solvent discharge means for discharging the concentrated solution from the evaporator.

In another embodiment, each of the absorber, the condenser and the generator may comprise a heat transfer apparatus as described in paragraphs 4 to 9 above. This embodiment may comprise an open cycle for drying applications when the heat transfer fluid comprises water. The absorber may include an inlet for receiving humid air and an outlet for discharging dry air, the absorbent being adapted to absorb the water in the air. Preferably, the condenser is provided with a water outlet whereby condensed water can be discharged.

In a sixth embodiment, the assembly comprises two cycles connected by heat transfer means, and may be in the form of an air conditioning system. Preferably the first cycle of the assembly comprises an absorber to receive warm humid area to remove the moisture from said air thereby drying the air an evaporator to receive the dried air, and to receive a heat transfer fluid, advantageously water whereby, the water is evaporated to cool and humidify the incoming dry air, thereby to produce cooled moist air therefrom.

Heat transfer means is conveniently arranged between the absorber and the evaporator to transfer heat from the first cycle to the second cycle. Preferably, the heat transfer means is a heat pipe, one end region of which is arranged in the path of between the absorber and the evaporator.

The second cycle and evaporator for receiving warm air, and to receive a heat transfer fluid, whereby the heat transfer fluid is evaporated into the morning air to cool and humidify the air and exhaust means, to exhaust the humidified air. The heat transfer means is conveniently arranged between the evaporator and the exhaust means of the second cycle. Preferably, the opposite end region of the heat transfer means is arranged in the path of the air between the evaporator and the exhaust means.

The evaporator and the absorber of the first cycle and the evaporator of the second cycle may each comprise a heat transfer apparatus as described in the relevant paragraphs above.

According to another aspect of this invention there is provided heat transfer apparatus comprising a generator for generating an evaporated heat transfer fluid, an absorber for supplying to the generator a strong heat transfer fluid/absorbent solution an ejector to receive the evaporated heat transfer fluid from the generator and to eject, said heat transfer fluid therefrom, and an evaporator connected to the ejector whereby heat transfer fluid passing through the ejector entrains therewith heat transfer fluid from the evaporator.

In one embodiment, work extraction may be arranged between the generator and the ejector whereby the ejector receives evaporated heat transfer fluid from the generator via the work extraction means. The work extraction means may be in the form of a turbine which may drive an alternator to produce an electric current. In this embodiment, the apparatus may comprise a plurality of ejectors arranged in a plurality of stages.

A condenser may be provided to condense fluid from the generator and the evaporator may be arranged between the condenser and the ejector to receive condensed heat transfer fluid from the condenser. Pressure reducing means, which may be in the form of an expansion valve, may be arranged between the condenser and the evaporator.

The condenser may be arranged to receive evaporated heat transfer fluid directly from the generator, whereby some of the evaporated heat transfer fluid from the generator passes to the work extraction means and some of the evaporated heat transfer fluid from the generator passes to the condenser. Alternatively, the condenser may be arranged to receive evaporated heat transfer fluid from the work extraction means whereby some of the evaporated heat transfer fluid from the work extraction means passes to the ejector and some of the evaporated heat transfer fluid from the work extraction means passes to the condenser.

In another embodiment, the generator comprises a heat exchanger to generate said evaporated heat transfer fluid, said heat exchanger being adapted to receive heat transfer fluid from the ejector. In this embodiment, heating means may be provided to heat the fluid ejected from the ejector prior to being received by the generator. Preferably, the heating means comprises a compressor to compress the heat transfer fluid ejected from the ejector. Preferably, the heat transfer fluid from the ejector passes to the generator and thereafter to the evaporator.

In this last mentioned embodiment, the evaporator is connected to the absorber whereby some of the heat transfer fluid from the evaporator is entrained by the ejector and some of the heat transfer fluid from the evaporator is passed to the absorber.

In another embodiment, the apparatus may comprise a first ejector to receive some of the evaporated heat transfer fluid generated by the generator, and a second ejector to receive some of the evaporated heat transfer fluid generated by the generator.

Cooling means may be provided to receive heat transfer fluid ejected from the first ejector. The second ejector may be connected to the cooling means, whereby heat transfer fluid from the generator passing through the second ejector entrains therewith heat transfer fluid in the cooling means.

According to another aspect of this invention there is provided heat transfer apparatus comprising a generator for generating an evaporated heat transfer fluid, an ejector for receiving the evaporated heat transfer fluid from the generator, an evaporator for receiving heat transfer fluid, the evaporating being in fluid communication with the ejector, whereby evaporated fluid passing through the ejector from the generator can entrain therewith fluid from the evaporator, causing said fluid in the evaporator to evaporate to be mixed in the ejector with said fluid from the generator.

Preferably, the apparatus further includes a condenser to receive and condense the heat transfer fluid from the ejector, the evaporator being in fluid communication with said condenser to receive some of said condensed heat transfer fluid from the condenser.

Expansion means may be provided to expand and thereby reduce the pressure of the heat transfer fluid received by the evaporator from the condenser. The generator may be in communication with said condenser to receive some, preferably the remainder, of said condensed heat transfer fluid from the condenser. Pumping means may be provided to pump said heat transfer fluid to the generator.

Solar heating means may be provided to transfer heat to said generator to generate said evaporated heat transfer fluid. Preferably, the solar heating means comprises a solar collector to receive solar energy to heat a second heat transfer fluid therein. Pumping means is preferably provided to pump the second heat transfer fluid from the solar collector to the generator to heat the first mentioned heat transfer fluid.

The solar heating means may further include a secondary heating means to heat said second heat transfer fluid in the event that the solar energy collected by the solar collector is insufficient to provide sufficient heat to the first mentioned heat transfer fluid.

The apparatus may further include work extraction means adapted to receive some of the evaporated first mentioned heat transfer fluid from the condenser, wherein the work extraction means is operable by said heat transfer fluid to enable work to be extracted from the apparatus. Preferably the work extraction means comprises a turbine which may be connected to an alternator to produce electrical current. Preferably, the turbine is arranged in fluid communication with the generator and the condenser whereby fluid is passed from the generator to the turbine and, thereafter, in the condenser.

According to another aspect of this invention there is provided a power source for generating electricity comprising means for containing a heat transfer fluid, said means defining a first region and a second region whereby the heat transfer fluid can circulate between the first and second regions, and electricity generating means arranged between the first and second regions and operable by the circulation of said fluid to generate electricity.

Preferably, the power source comprises a turbine mounted between the first and second regions and an alternator connected to the turbine, whereby circulation of the fluid drives the turbine, thereby to operate the alternator to generate electricity.

Preferably, the first region comprises an evaporator whereby heat transfer fluid therein is evaporated by the application of heat thereto. The second region preferably comprises a condenser whereby heat is removed from the evaporated heat transfer fluid therein to condense said fluid. Transport means may be provided to transport the condensed heat transfer fluid from the second region to the first region. The transport means may be in the form of wicking means and may further include a conduit extending between the first and second region.

Preferably, the electricity generating means is arranged in the path of the evaporated heat transfer fluid to be operated by the pressure of said evaporated fluid thereon.

Fins may be provided at the second end region to facilitate the removal of heat therefrom. The evaporator may include fluid dispersal means to dispense the heat transfer fluid over a large surface area to facilitate evaporation thereof. The fluid dispersal means may be in the form of a wick.

According to another aspect of the invention there is provided an article of electrical equipment comprising a power source as described above and means for utilising electricity generated by said power source.

The article of electrical equipment may be a torch or a lamp.

According to another aspect of this invention there is provided an article of electrical equipment comprising a heat pipe containing a heat transfer fluid which can circulate between first and second regions on the application of heat thereto, electricity generating means arranged in the path of said circulating fluid to generate electricity, and electricity utilising means for utilising electricity generated by the electricity generating means.

Embodiments of the inventions will now be described by way of example only with reference to the accompanying drawings in which:

FIGS. 38 to 40 are sectional views of different embodiments of an article of electrical equipment.

Figure 1:
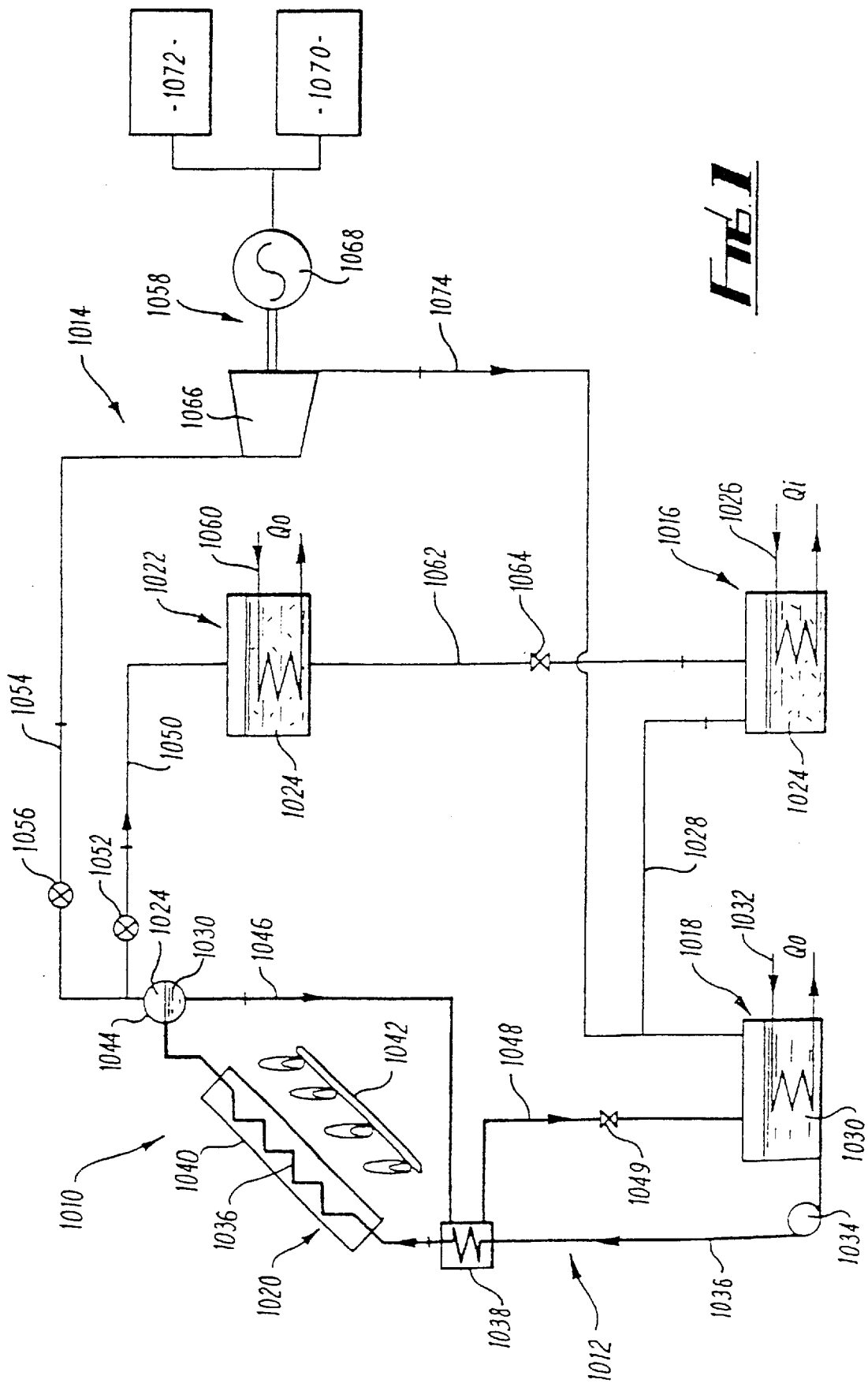
FIG. 1 shows schematically heat transfer apparatus;.

Referring to FIG. 1 there is shown power generating apparatus generally designated 1010 which comprises a refrigeration assembly 1012 and a power generation assembly 1014.

The refrigeration assembly 1012 comprises an evaporator 1016, an absorber 18, heating means 1020, and a condenser 1022. Refrigerant 1024 circulates throughout the refrigeration assembly 1012.

Refrigerant 1024 in the evaporator 1016 is evaporated by incoming fluids, for example air or water, through the line 1026. The evaporating refrigerant extracts heat (Qi) from the fluid in the line 1026. The chilled fluids can then be used for refrigeration. The refrigerant in the form of saturated vapour passes via a line 1028 to the absorber 1018 which holds an absorbent for absorbing the incoming refrigerant vapour giving out heat (Qo) to incoming fluid, for example water or air, in the line 1032. A strong refrigerant solution is formed during the absorption process and this is pumped by a pump 1034 via a line 1036 through a heat exchanger 1038 (the purpose of which will be explained below) to the heating means 1020. The pump 1034 raises the pressure of the strong refrigerant solution in the line 1036.

The heating means 1020 comprises a solar collector 1040, in which solar energy is used to heat the strong refrigerant solution, and a gas powered heater 1042 to provide further heat or, in the event that no solar energy is available, all the heat.

The refrigerant vapour 1024 and liquid absorbent are passed via a separator 1044 to separate the liquid absorbent 1030 from the vaporised refrigerant 1024. The high temperature liquid absorbent 1030 passes via a line 1046 to the heat exchanger 1038. In the heat exchanger 1038 the strong refrigerant solution in the line 1036 passes on one side, and the high temperature absorbent in the line 1046 passes on the other side so that heat from the absorbent is transferred to the strong refrigerant solution thereby increasing the temperature of the strong refrigerant solution and reducing the temperature of the absorbent. The absorbent is then passed via a line 1048 to the absorber 1030, its pressure being reduced before entry into the absorber 1030 by an expansion valve 1049.

Some of the high temperature refrigerant vapour exiting the separator 1044 is passed via a line 1050 and a check valve 1052 to the condenser 1022. The remainder of the high temperature refrigerant vapour is passed via a line 1054 and a check valve 1056 to a power generating assembly 1058, as will be explained below.

The high temperature, and high pressure, refrigerant vapour in the line 1050 is passed to the condenser 1024 where it is condensed by fluids, for example water or air, extracting the heat (Qo) from the refrigerant. The condensed refrigerant is then passed via a line 1062 through a pressure reducing valve in the form of an expansion valve 1064 whereby low pressure refrigerant is passed to the evaporator 1016 for the cycle to be repeated.

The high temperature, high pressure, refrigerant vapour in the line 1054 is passed to the power generating means which comprises a turbine 1066 and an electricity generator 1068. The high pressure refrigerant in the line drives the turbine 1066 thereby driving an electricity generator 1068 to produce electricity in units 1070,1072 as shown schematically.

The high pressure refrigerant driving the turbine 1066 undergoes a drop in pressure across the turbine 1066 whereby low pressure refrigerant passes via a line 1074 to merge with evaporated refrigerant in the line 1028 entering the absorber 1018.

Figure 2:
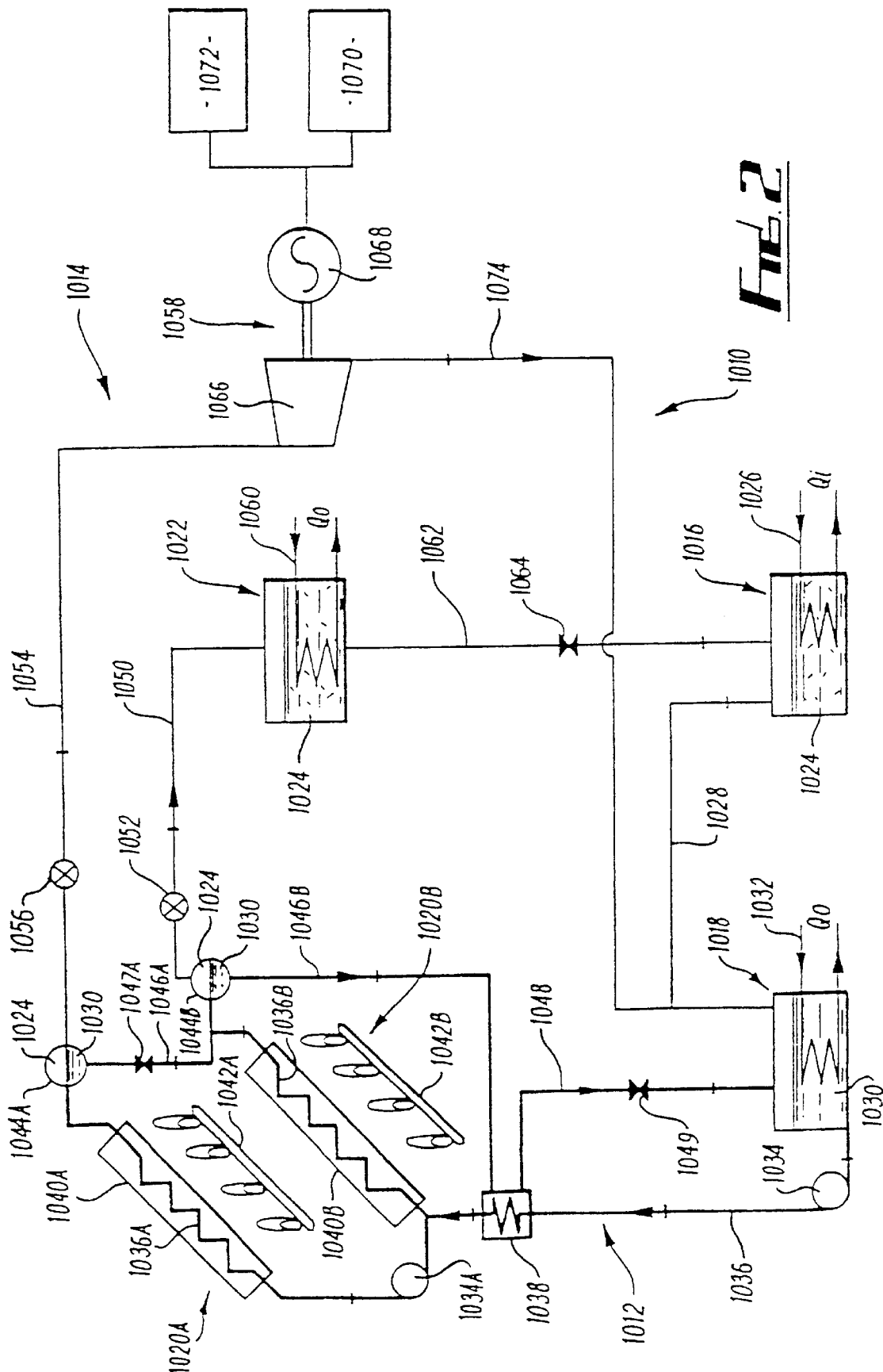
FIGS. 2 to 5 shows schematically modifications of the heat transfer apparatus shown in FIG. 1.

Referring to FIG. 2, there is shown another embodiment of the power generation apparatus 1010 which is generally the same as that shown in FIG. 1, with the exception that the apparatus comprises first heating means 1020A and second heating means 1020B arranged in parallel. The first heating means 1020A comprises a first solar collector 1040A, and a first gas heater 1042A. The second heating means 1020B comprises a second solar collector 1040B and a second gas heater 1042B. The strong refrigerant solution in line 1036, after passing through the heat exchanger 1038, is split between two lines 1036A and 1036B. The line 1036A passes via a liquid pump 1034A, which increases the pressure in the line 1036A to the first solar collector 1040A and the gas heater 1042A to vaporise the refrigerant in the line 1036A to produce a mixture of high pressure, high temperature refrigerant vapour 1024 and weak refrigerant solution 1030. This mixture is then passed to a separator 1044A where the refrigerant vapour is passed via a line 1054 to the power generating assembly 1014, and the weak refrigerant solution from the first separator 1044A is passed via a line 1046A to a second separator 1044B, as will be explained below.

The remainder of the strong refrigerant solution passing out of the heat exchanger 1038, which is not passed via the line 1036A is passed via the line 1036B through the solar collector 1040B and the gas heater 1042B to vaporise the refrigerant in the strong refrigerant solution to produce high temperature, high pressure refrigerant vapour 1024 and a weak refrigerant solution 1030. This mixes with the weak refrigerant solution 1030 in the line 1046A the pressure of which has been reduced by an expansion valve 1047A and enters the second separator 1044B. The refrigerant vapour 1024 in the second separator 1044B is passed via the line 1050 to the condenser 1022. The weak refrigerant solution 1030 in the second separator 1044B is passed via the line 1046B to the heat exchanger 1038.

The features in FIG. 2 which are given the same reference numeral as those in FIG. 1 are the same as those in FIG. 1, and perform the same function.

Figure 3:
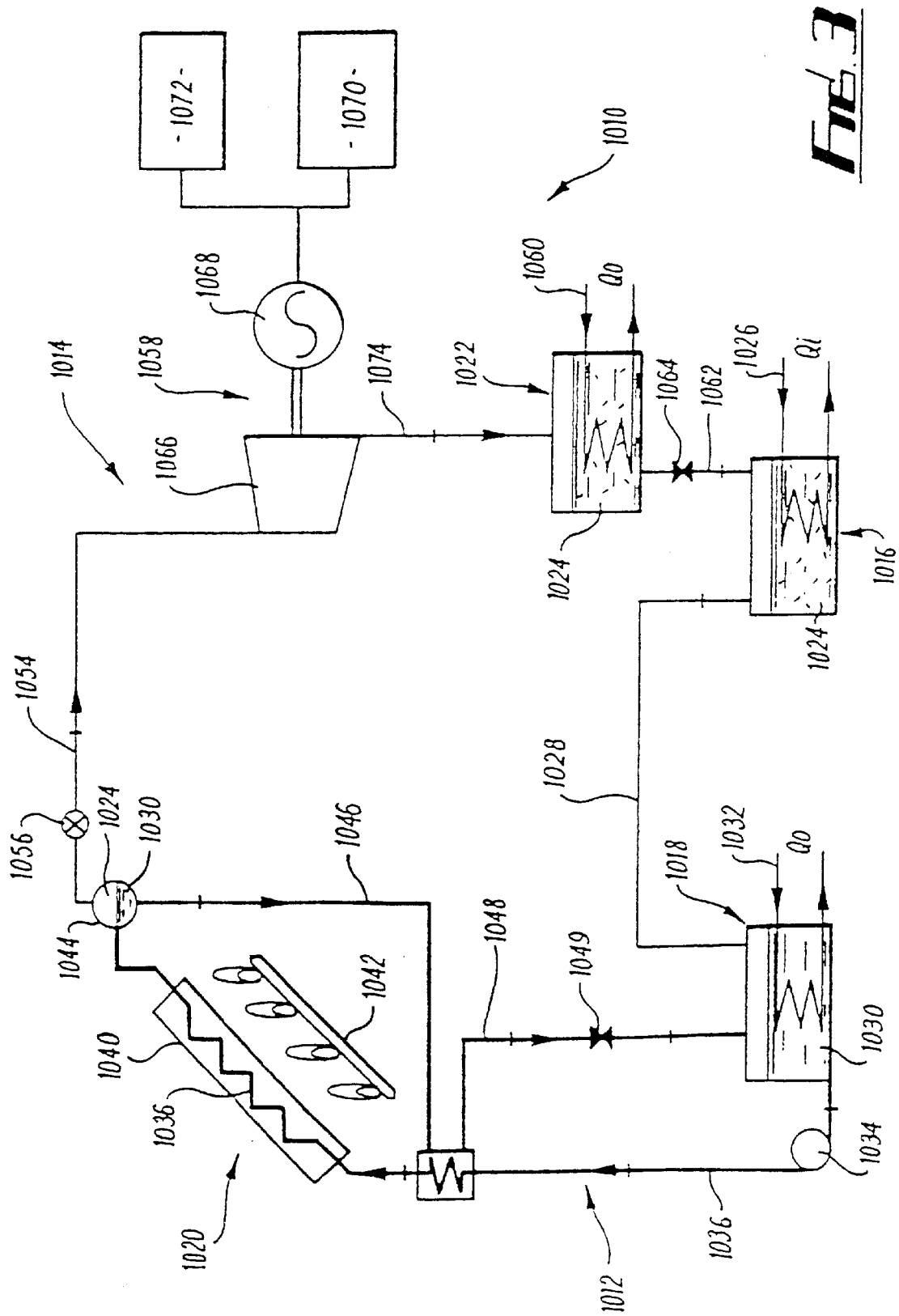

Referring to FIG. 3, there is shown a further embodiment of the invention which the power generating assembly 1014 is in series with the condenser 1022. In FIG. 3, the features which are the same as those in FIG. 1 are given the same reference numeral.

In the embodiment shown in FIG. 3, all the vaporised refrigerant in the separator 1024 is passed via the line 1054, and the valve 1056 to the turbine 1066 to generate electric power. The low pressure refrigerant in the line 1074 exiting the turbine 1066 is passed to the condenser 1022, wherein heat of condensation (Qo) is given out by the lines 1060. A condensed refrigerant 1024 is then passed via line 1062, and expansion valve 1064 to the evaporator 1016. The refrigerant evaporated in the evaporator 1016 is passed via a line 1028 to the absorber 1018. The rest of the apparatus functions in the same way as the apparatus shown in FIG. 1.

Figure 4:
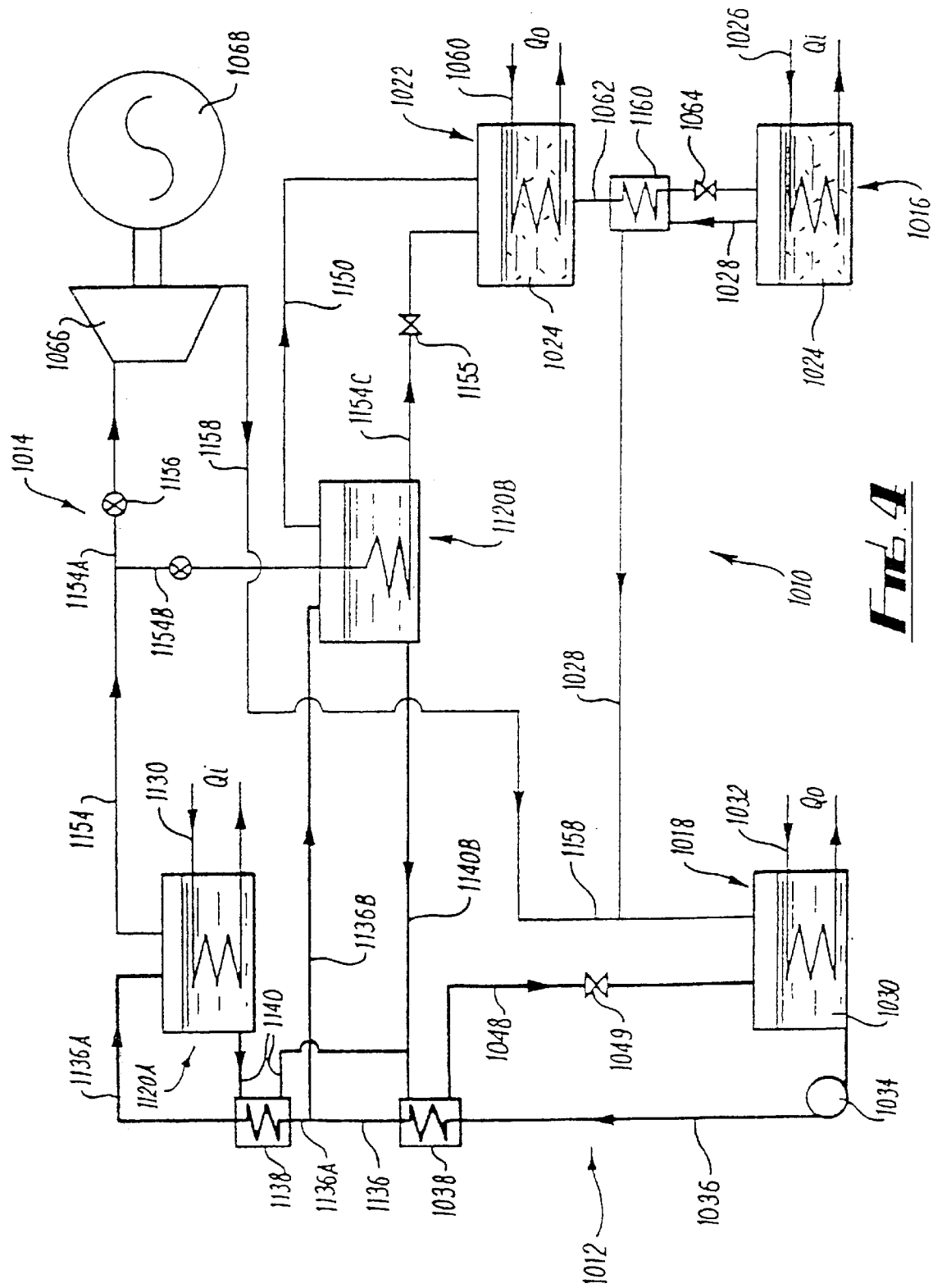

Referring to FIG. 4, there is shown a further embodiment which comprises first and second heating means 1120A, 1120B arranged in parallel. Those features of the apparatus shown in FIG. 4 which have been designated with the same reference numeral as those in FIG. 1 are the same, and perform the same function.

The first heating means 1120A can be any suitable heating means, and in FIG. 4 is shown schematically that the heating is effected by incoming fluid along the line 1130. It will be appreciated that the first heating means 1120A could be similar to the heating means 1020 described, with reference to FIGS. 1 and 3.

The strong refrigerant solution is pumped via the pump 1034 through the lines 1036 to the heat exchanger 1038 and thereafter through the line 1136 where some of the strong refrigerant solution is separated off via line 1136B to the second heating means 1120 as will be explained below. The remainder of the strong refrigerant solution is passed via a line 1136A through a second heat exchanger 1138 to the first heating means 1120A. In the first heating means 1120A, heat (Qi) from the line 1130 causes the refrigerant in the strong refrigerant solution to vaporise, and the vaporised refrigerant is passed via line 1154 and split into lines 1154A and 1154B as will be explained below.

The high temperature refrigerant vapour in the line 1154A is passed via a valve 1156 to a turbine or engine 1066 and thereafter via a line 1158 to mix with refrigerant in the line 1028 to enter the absorber 1018. The condensed refrigerant in the condenser 1022 is passed via line 1062 and a heat exchanger 1160, and expansion valve 1064 to the evaporator 1016. Evaporated refrigerant is passed from the evaporator 1016 via the line 1028 through the heat exchanger 1160 whereby heat is transferred from the evaporated refrigerant in the line 1028 to the refrigerant in the line 1062.

The weak refrigerant solution produced in the first heating means 1120A by the vaporisation of the refrigerant is passed via a line 1140 to the heat exchanger 1138. The high temperature weak refrigerant solution passes on one side of the heat exchanger 1138, and the strong refrigerant solution passes on the other, whereby heat is transferred from the high temperature weak refrigerant to the strong refrigerant solution thereby increasing the temperature of the strong refrigerant solution, and reducing the temperature of the weak refrigerant solution in the line 1140. The weak refrigerant solution in the line 1140 is then passed to a line 1140B, as will be explained below.

The strong refrigerant solution which is passed via the line 1136B is fed to the second heating means 1120B, which is heated by the high temperature vaporised refrigerant in the line 1154B which, in turn, is cooled and passed out of the second heating means 1120B via a line 1154C. The heating of the strong refrigerant solution entering the second heating means 1120B from the line 1140B causes refrigerant to be vaporised and passed via a line 1150 to the condenser 1022. The refrigerant in the line 1154C, is passed via an expansion valve 1155 also to the condenser 1022. The weak refrigerant solution produced in the second heating means 1120B by the vaporisation of the refrigerant therefrom is passed via the line 1140B to mix with weak refrigerant solution with the line 1140 through the heat exchanger 1038, and then via a line 1048 to the absorber 1018.

Figure 5:
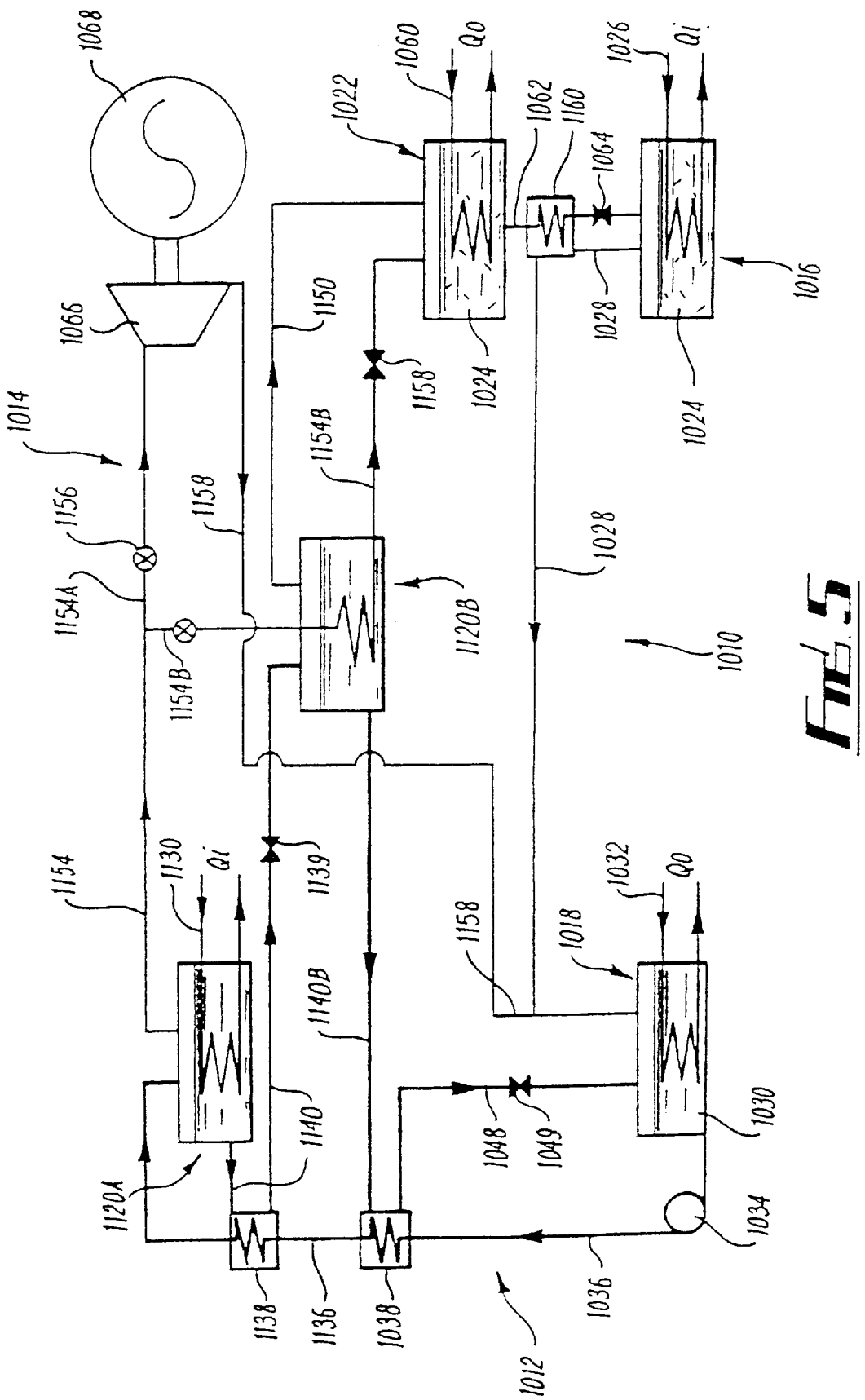
Figure 6:
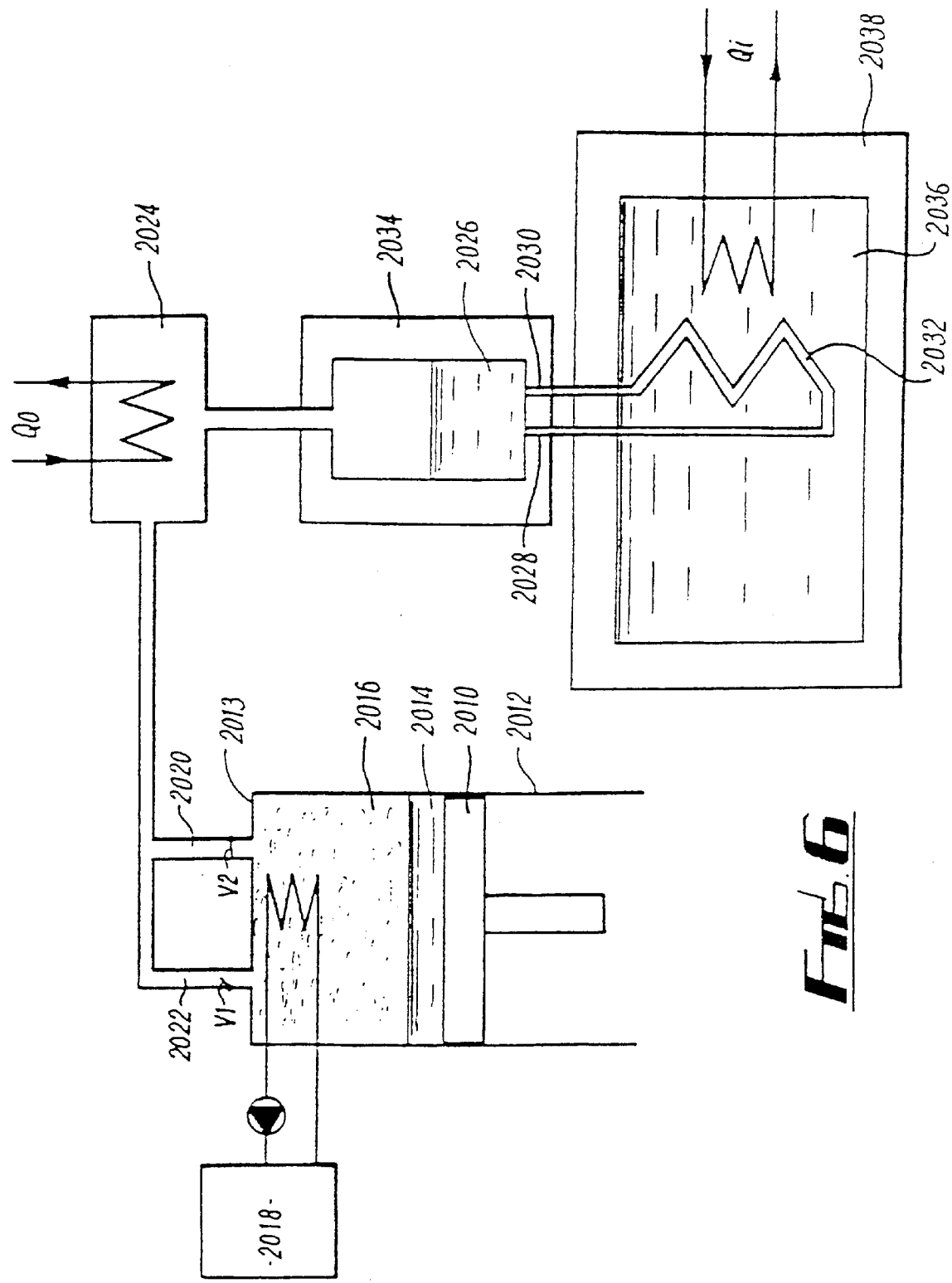
FIG. 6 is a schematic diagram of one embodiment of a heat transfer apparatus utilising a heat pump.
Figure 9:
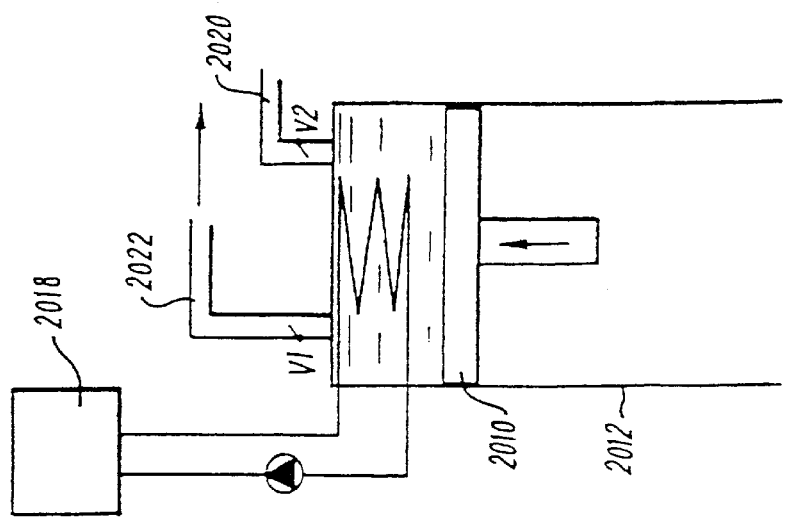
FIGS. 7 to 9 are schematic diagrams of the heat pump of FIG. 5 showing different stages during the operation thereof.

Referring to FIG. 5, there is shown a further embodiment in which the first and second heating means 1120A and 1120B are arranged in series. This embodiment, is the same as the embodiment shown in FIG. 4, with the exception that the strong refrigerant solution in the line 1136 is not split into two lines 1136A,1136B, but instead all the strong refrigerant solution in the line 1136 is passed via the heat exchanger 1138 to the first heating means 1120A, which vaporises the refrigerant in the strong refrigerant solution to produce an intermediate refrigerant solution, which is passed via the line 1140, and the heat exchanger 1138, and an expansion valve 1139 to the second heating means 1120B.

The intermediate refrigerant solution in the second heating means 1120B is heated by incoming high temperature refrigerant vapour in line 1154B to vaporise further refrigerant which is passed via line 1150 to the condenser 1022, and a weak refrigerant solution which is passed via line 1140B to the heat exchanger 1038 and then via a line 1048 to the absorber 1018. Thus, vaporised refrigerant from the first heating means is passed to the condenser via a line 1154B, and vaporised refrigerant from the second heating means 1120B is passed via line 1150 also to the condenser 1022. The high temperature, high pressure refrigerant vapour in the line 1154 is passed via line 1156 to the turbine or engine 1066 to generate electricity in the electricity generator 1068, and thereafter via line 1158, in the same manner as in FIG. 5 to mix with evaporated refrigerant in the line 1028 to be passed to the absorber 1018.

If desired, combustion gasses from the first heating means 1120A can be used in the heating means 1120B in the apparatus shown in either FIG. 4 or FIG. 5 for further heating in the second heating means 1120B.

The refrigerant and absorbent used in the embodiments described can be any suitable refrigerant and absorbent pair, for example, ammonia and water, water and lithium bromide, water and potassium formate, or water and NaSCN. Hydrofluorocarbon (HFC) refrigerant (e.g. R134a, R123, R32 and R152a) and absorbents such as ETFE, DTG and DTrG can also be used.

The expressions "high temperature", "low temperature", "high pressure" and "low pressure" are relative expressions referring to the relative temperatures and pressures in the various parts of the apparatus as appropriate.

The expression "strong", "intermediate" and "weak" refrigerant solution refer to the relative concentration of refrigerant in the absorbent. For example, the word "strong" refers to a relatively high concentration of refrigerant and the word "weak" refers to a relatively low concentration.

Referring to FIGS. 6 to 9 of the drawings, a vapour compression heat pump has a piston/cylinder arrangement wherein a piston 2010 can reciprocate within a cylinder 2012, the piston 2010 maintaining, between an operative side thereof and the respective end 2013 of the cylinder 2012, a liquid refrigerant/absorbent combination 2014 such as $NH_3/H_2O$ or $H_2O/LiBr$ (or a liquid refrigerant/adsorbent combination such as $NH_3/CaCl_2$, R32/AX21) and a refrigerant vapour 2016, such as ammonia, the latter between the combination 2014 and the cylinder end 2013. A boiler/heat exchanger 2018 provides a closed water circuit partly locating within the cylinder 2012 at the location of the refrigerant vapour 2016, to be used for heat exchange purposes.

The cylinder end 2013 has an inlet 2020 and an outlet 2022 each controlled by a check valve and each communicating with a condenser 2024. The latter has a flow path in communication with a liquid refrigerant accumulator 2026 which has an outlet 2028 and inlet 2030 connected to a closed refrigerant circuit defining a coil evaporator 2032.

The condenser 2024, the liquid refrigerant accumulator 2026, and the evaporator 2032 provide an assembly for a refrigerator (not shown), the accumulator 2026 having suitable insulation 2034 and the evaporator 2032 being in a water chamber 2036 with appropriate insulation 2038, the chamber 2036 having a heat exchange relationship with the interior of the refrigerator.

Figure 8:
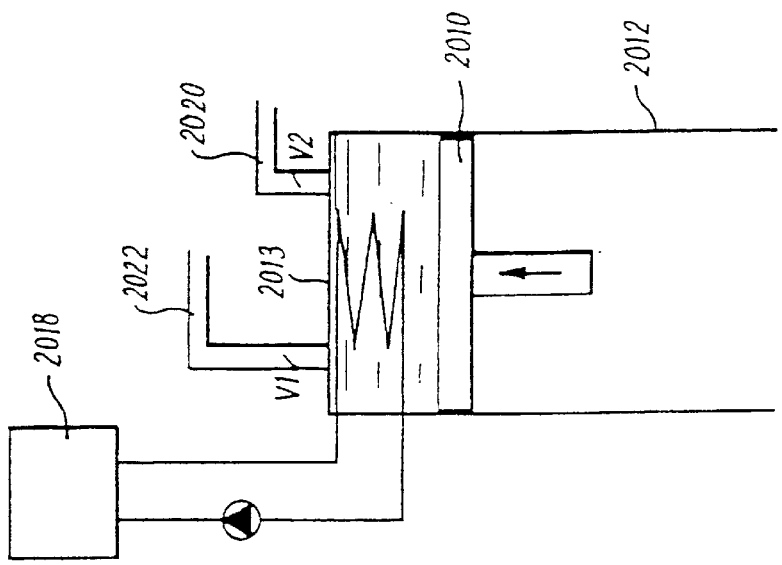
Figure 7:
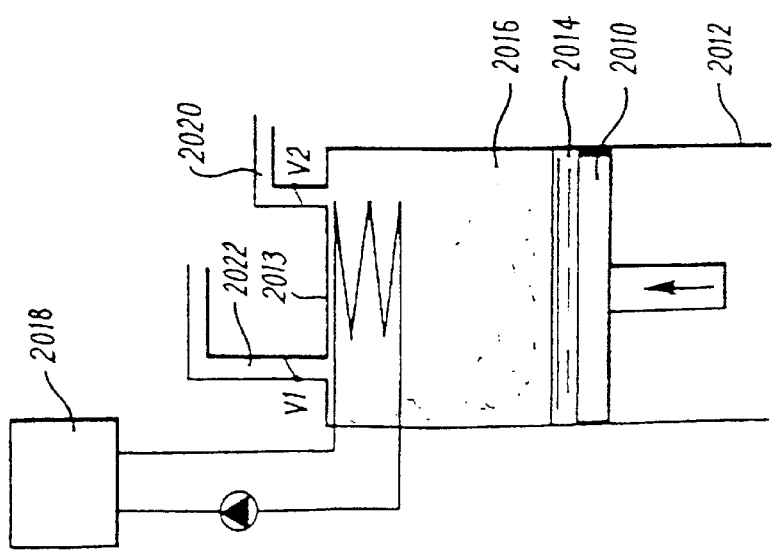

In operation, the piston 2010 moves from an equilibrium position as shown in FIG. 7 towards the operative end 2013 of the cylinder 2012, thereby compressing the refrigerant vapour 2016 and causing the latter to be absorbed in the refrigerant/absorbent combination 2014. The concentration of the combination 2014, as well as the pressure thereof, increases as the piston 2010 reaches the end of the compression stroke (FIG. 8). During the compression process, heat resulting from the absorption and compression is removed from the cylinder 2012 by way of the heat exchanger 2018.

When the compression process is completed, the outlet 2022 is opened by means of its check valve and the refrigerant/absorbent combination 2014 is heated by way of the boiler 2018 to expel the refrigerant vapour which was absorbed during the compression process. The chemical absorption is such that the refrigerant vapour is expelled as a high pressure vapour which condenses to liquid on cooling.

The high pressure refrigerant vapour is passed from the cylinder 2010 to the condenser 2024 where the vapour is condensed to liquid and releases the heat of condensation to the environment. From the condenser 2024, the liquid refrigerant is passed into the liquid accumulator 2026 and from there to the coil evaporator 2032.

When the boiler 2018 is switched off and the piston 2010 moves away from the operative end 2013 of the cylinder 2012, vapour is drawn from the accumulator 2026, whereby pressure falls in the evaporator 2032, causing the liquid ammonia refrigerant to boil and consequently cool the refrigerator. During the next cycle, no heat is transferred back into the refrigerator because of a thermal diode effect resulting from stratification in the liquid refrigerant. The different in density between cold and warm liquid refrigerant prevents mixing. Ice is able to be produced to keep the refrigerated space cold.

Absorption systems are generally more bulky than conventional vapour compression systems because an absorption chiller has more components. Also, as the heat and mass transfer of absorption equipment (i.e. generator and absorber) is poor, a large surface area is required. The use of the refrigerant/absorbent combination in the cylinder of a vapour compression system, to generate cooling and heating, obviates or mitigates these problems and allows the absorption process to be carried out more effectively (i.e. fast absorption and minimum heat input is required to desorb refrigerant) than by a conventional absorption system. In addition, the refrigerant/absorbent combination with the vapour compression system enables the use of environmentally friendly refrigerants which have no potential to deplete the ozone layer and which are not greenhouse gases.

Figure 10:
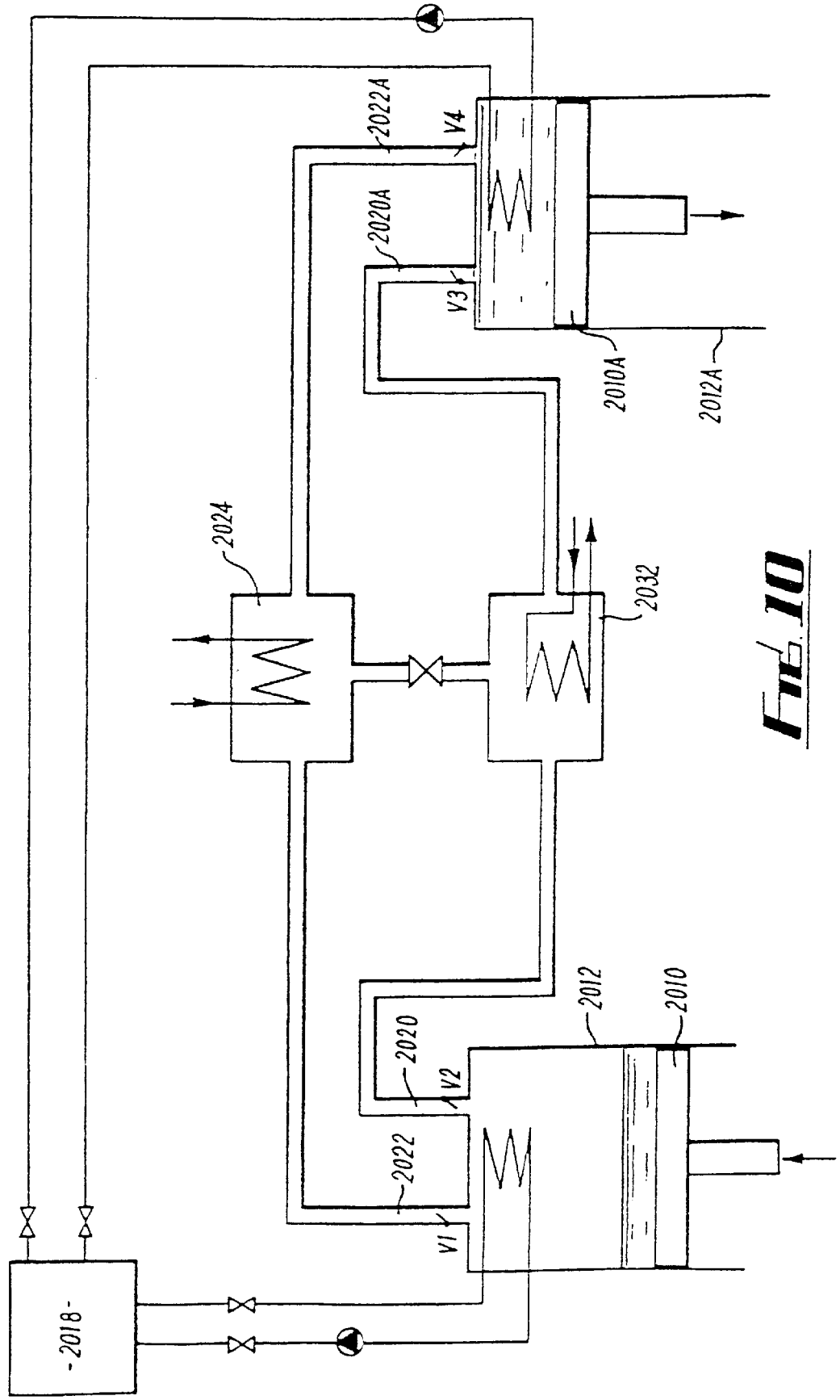
FIG. 10 is a schematic diagram of a modification of the apparatus of FIGS. 7 to 9.

In order to achieve a continuous operation, the apparatus can incorporate two piston/cylinder arrangements as shown in FIG. 10 where cylinder inlets 2020,2020A are connected directly to the evaporator 2032, each cylinder outlet 2022, 2022A being connected to the condenser 2024 and each cylinder 2010,2010A being in heat exchange relationship with the boiler/heat exchanger 2018. At the end of an expansion stroke of the respective cylinder, the refrigerant vapour occupies the space in the cylinder above the respective piston which therefore functions as an accumulator.

It is to be appreciated that different types of apparatus may be used for compressing the refrigerant vapour, for example reciprocating, rotary or screw compressors. Different types of compression and expansion processes could be used to achieve maximum cycle efficiency.

By way of example, other refrigerant/absorbent combinations which could be used include potassium formate/water $NH_3/NaSCN$, while refrigerant/adsorbent combinations can include silica gel/sulphur dioxide, and ammonia/calcium choloride R134a/AX21, R60/AX21.

Figure 11:
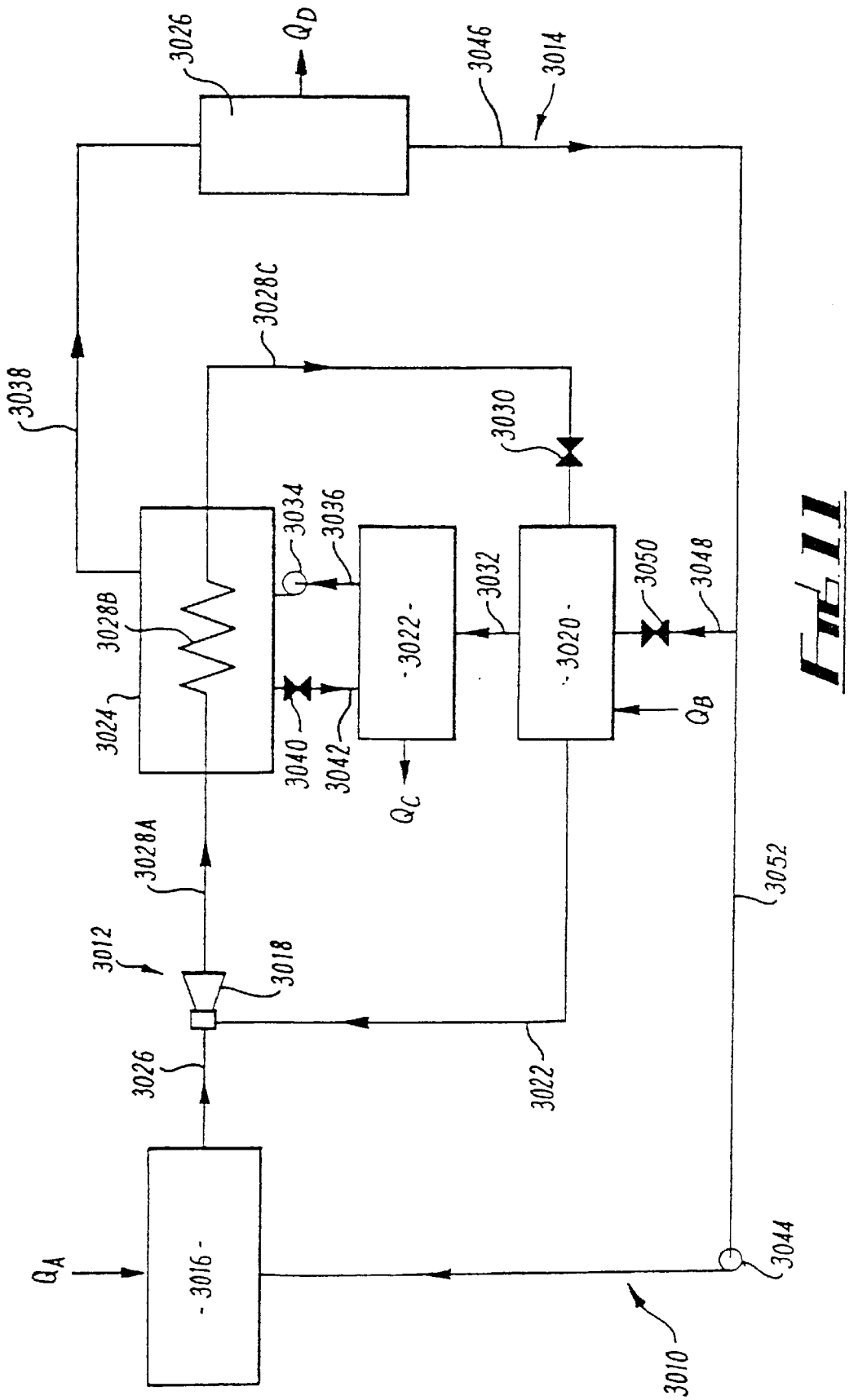
FIG. 11 is a schematic view of further heat transfer apparatus.

Referring to FIG. 11, there is shown heat transfer apparatus 3010 which comprises an ejector cycle 3012, and an absorbent cycle 3014. The ejector cycle 3012 comprises a steam generator 3016 and an ejector 3018. The absorbent cycle 3014 comprises an evaporator 3020 which, as shown, is connected to the ejector cycle 3012 via a line 3022 extending between the ejector cycle 3018 and the evaporator 3020.

The absorbent cycle 3014 further includes an absorber 3022 incorporating an absorbent, for example an aqueous lithium bromide solution. The absorption cycle 3014 further includes a concentrator 3024, and a condenser 3026. The apparatus 3010 is suitable for use with a refrigerant such as water.

In operation, heat $Q_A$ is fed to the generator 3016 which turns the refrigerant therein into vapour. The refrigerant is then passed via line 3026 to the ejector 3018, where it expands through the primary nozzle of the ejector 3018 thereby entraining low pressure vapour from the evaporator 3020 via the line 3022. The ejector exhaust is passed via line 3028A to the concentrator 3024 where it gives out a heat to the refrigerant/absorbent combination in a condenser coil 3028B. The condensed refrigerant passes from the condenser coil 3028B via the line 3028C, in liquid form, where it expands through an expansion valve 3030 before being passed to the evaporator 3020. The evaporator 3020 is at low pressure and extracts heat $Q_B$ from the surroundings to create a refrigerating effect at the evaporator 3020. Some of the evaporated refrigerant in the evaporator 3020 is entrained by the ejector 3018 via line 3022. The remainder of the evaporator refrigerant in the evaporator 3020 is passed via line 3032 to the absorber 3020 which contains an absorbent, for example a concentrated solution of lithium bromide in water. Heat $Q_C$ is given out on absorption of the refrigerant entering the absorber 3022 to form a dilute absorbent solution which is pumped by a pump 3034 via line 3036 to the concentrator 3024.

In the concentrator 3024 heat from the refrigerant passing through the condenser, 3028B causes the refrigerant in the solution entering the concentrator 3024 via the line 3036 to evaporate and to be passed via line 3038 to the condenser 3026.

The evaporation of the refrigerant in the concentrator 3024 increases the concentration of the solution, and the concentrator solution is passed through an expansion valve 3040 via line 3042 back to the absorber 3022 to absorb further incoming refrigerant from the line 3032. The evaporated refrigerant passed to the condenser 3026 is condensed therein giving out heat $Q_D$. The condensed refrigerant is then passed via line 3046 where it is split into two lines, the first line 3048 passes the refrigerant to the evaporator 3020 via an expansion valve 3050 in which the refrigerant is expanded. The second line 3052 passes the refrigerant via a pump 3044 to the generator 3016 in which incoming heat $Q_A$ evaporates the refrigerant to begin the cycle again. The cycle is thus continually repeated.

Figure 12:
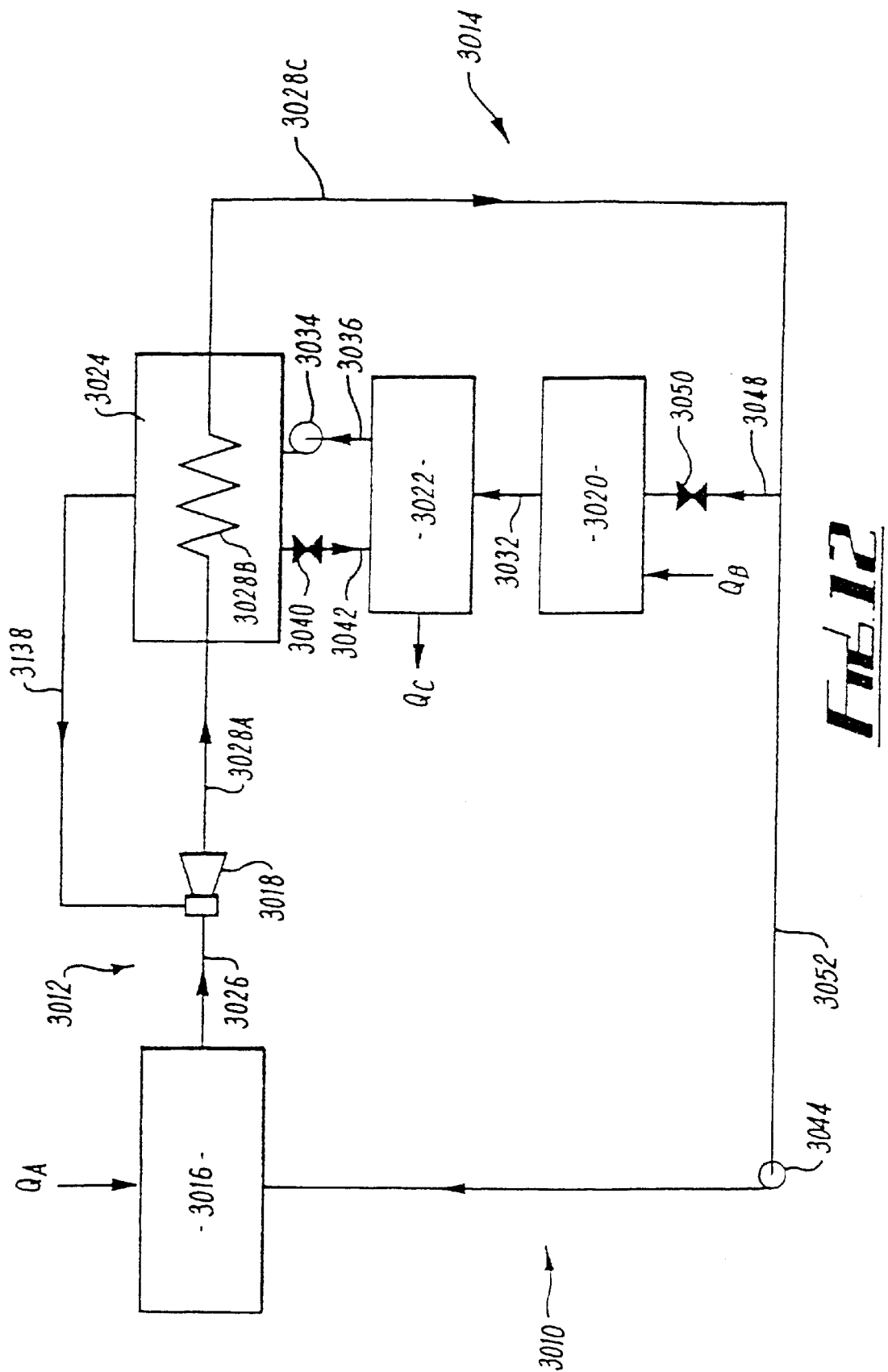
FIG. 12 is a schematic representation of a modification to the heat transfer apparatus shown in FIG. 11.

Referring to FIG. 12, there is shown a modification to the embodiment shown in FIG. 11, in which the same features have been designated with the same reference numeral. The apparatus shown in FIG. 12 differs from that shown in FIG. 11 in that the line 3038, the condenser 3026 and the line 3046 have been omitted. Also, the line 3028C from the condenser coil 3028B is split into two lines, namely a first line 3048 which passes the refrigerant to the evaporator via the expansion valve 3050 and a second line 3052 which passes the refrigerant to the generator 3016. The evaporated refrigerant from the concentrator 3024 is connected via line 3138 to the ejector 3018 whereby evaporated refrigerant from the generator 3016 passed via line 3026 to the ejector 3018 entrains low pressure evaporator refrigerant from the concentrator 3024 via the line 3138. As can be seen, the line 3022 from the evaporator 3020 has been omitted.

Figure 13:
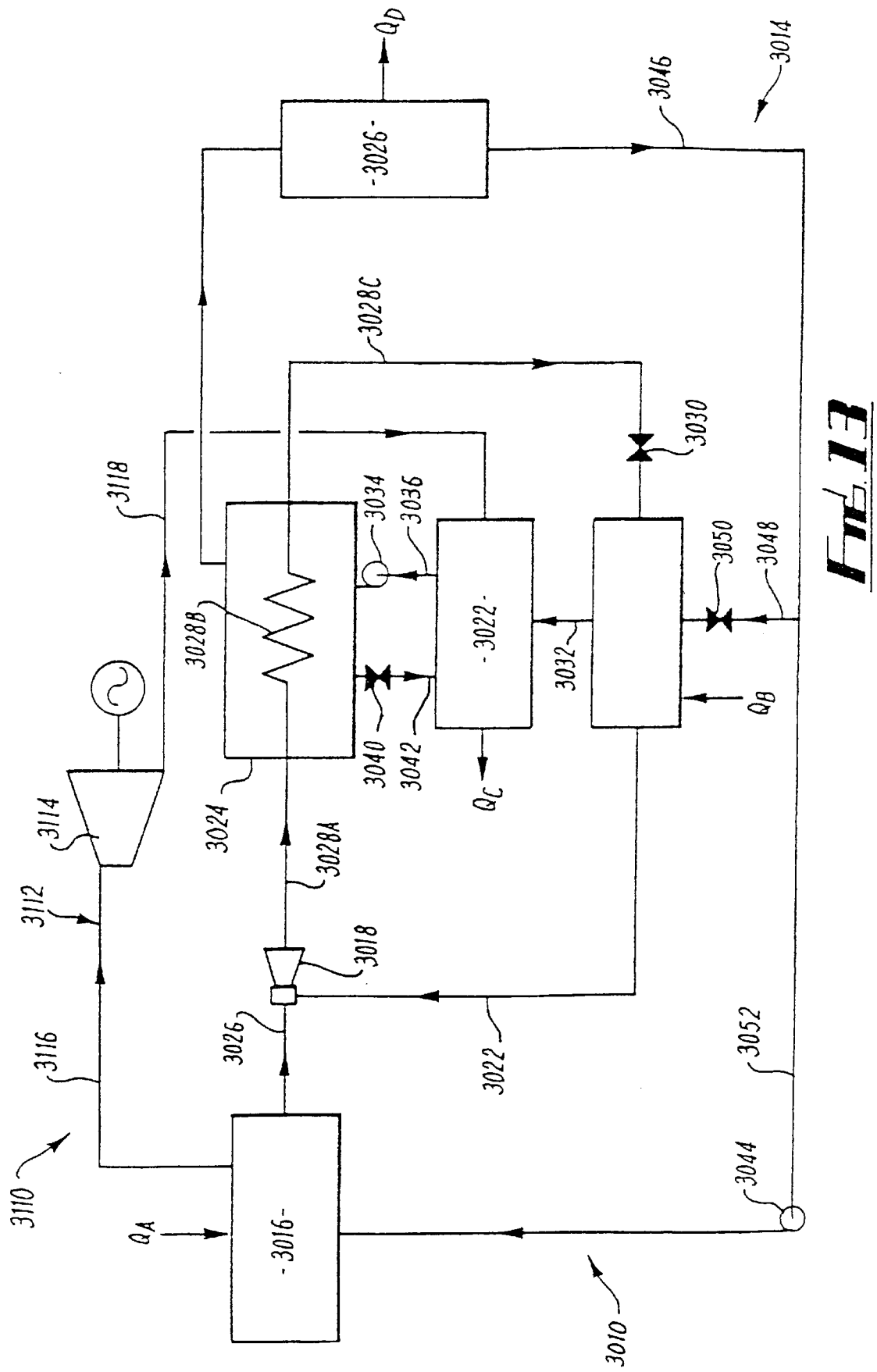
FIG. 13 is a schematic representation of power generating apparatus incorporating the heat transfer apparatus shown in FIG. 11.

Referring to FIG. 13, there is shown power generating apparatus 3110 which comprises heat transfer apparatus 3010, which is the same as that shown in FIG. 1, and power generating means 3112. Power generating means 3112 comprises a turbine 3114, which is connected via a line 3116 to the generator 3016. The turbine 3114 can be used to power a generator for creating electricity. The generator 3114 is connected via a line 3118 to the absorber 3022.

In operation, some of the refrigerant evaporated at the generator 3016 is passed via line 3116 to the turbine 3114. The refrigerant evaporated at the generator 3016 is at high pressure, and this causes the blades of a turbine 3114 to rotate, thereby enabling electricity to be generated. The refrigerant exiting from the turbine 3114 is at low pressure and this is passed via line 3118 to the absorber 3022.

Figure 14:
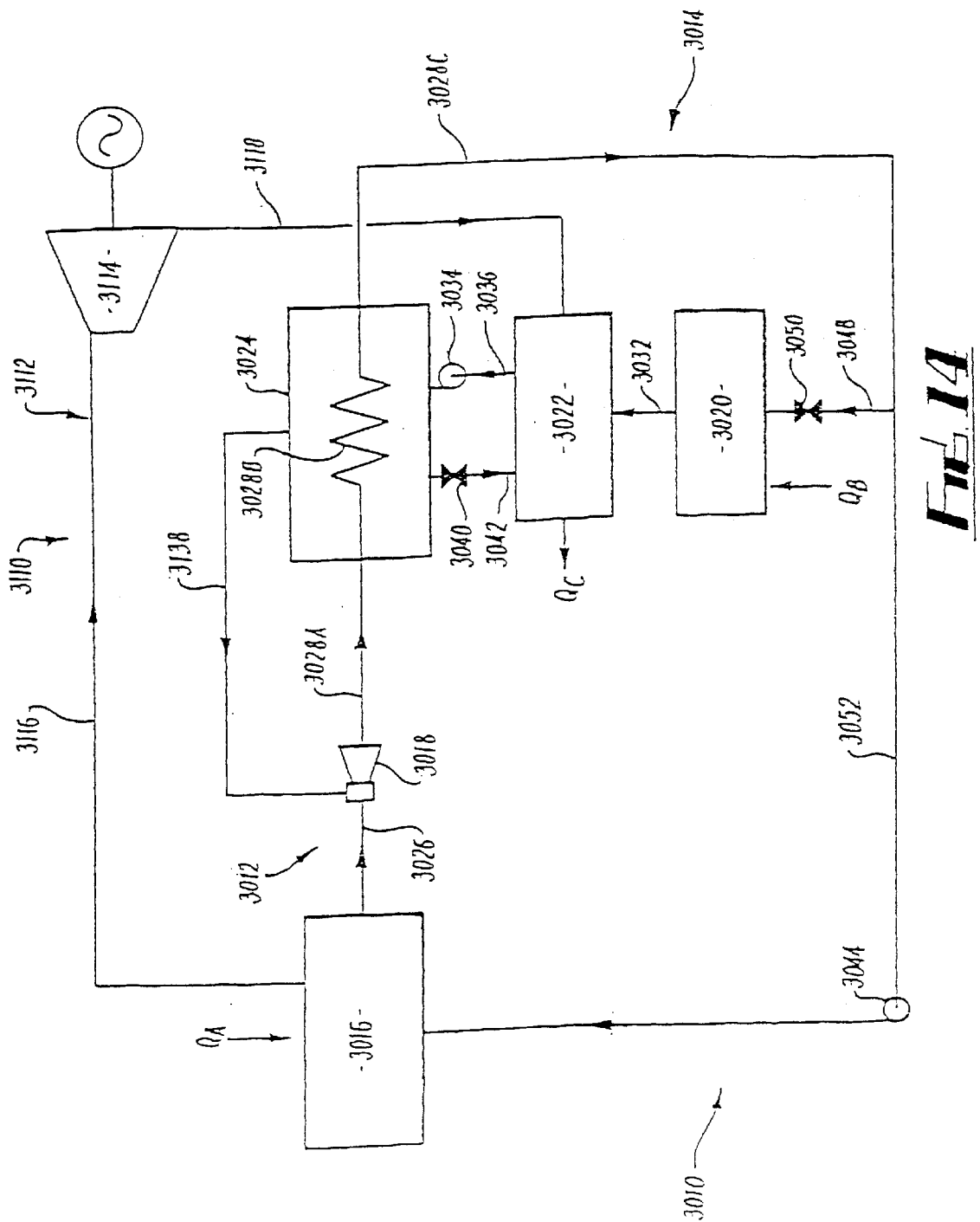
FIG. 14 is a schematic representation of power generating apparatus incorporating the heat transfer apparatus shown in FIG. 12.

Referring to FIG. 14, there is shown a further embodiment of power generating apparatus 3110, which comprises heat transfer apparatus 3010 as shown in FIG. 12. The power generating apparatus 3110 comprises power generating means 3112 which is the same as the power generating means 3112 shown in FIG. 13, and is connected in the same way between the generator 3016 and the absorber 3022.

In each of the above described embodiments, the ejector cycle 3012 and the absorbent cycle 3014 are both closed cycles.

Figure 15:
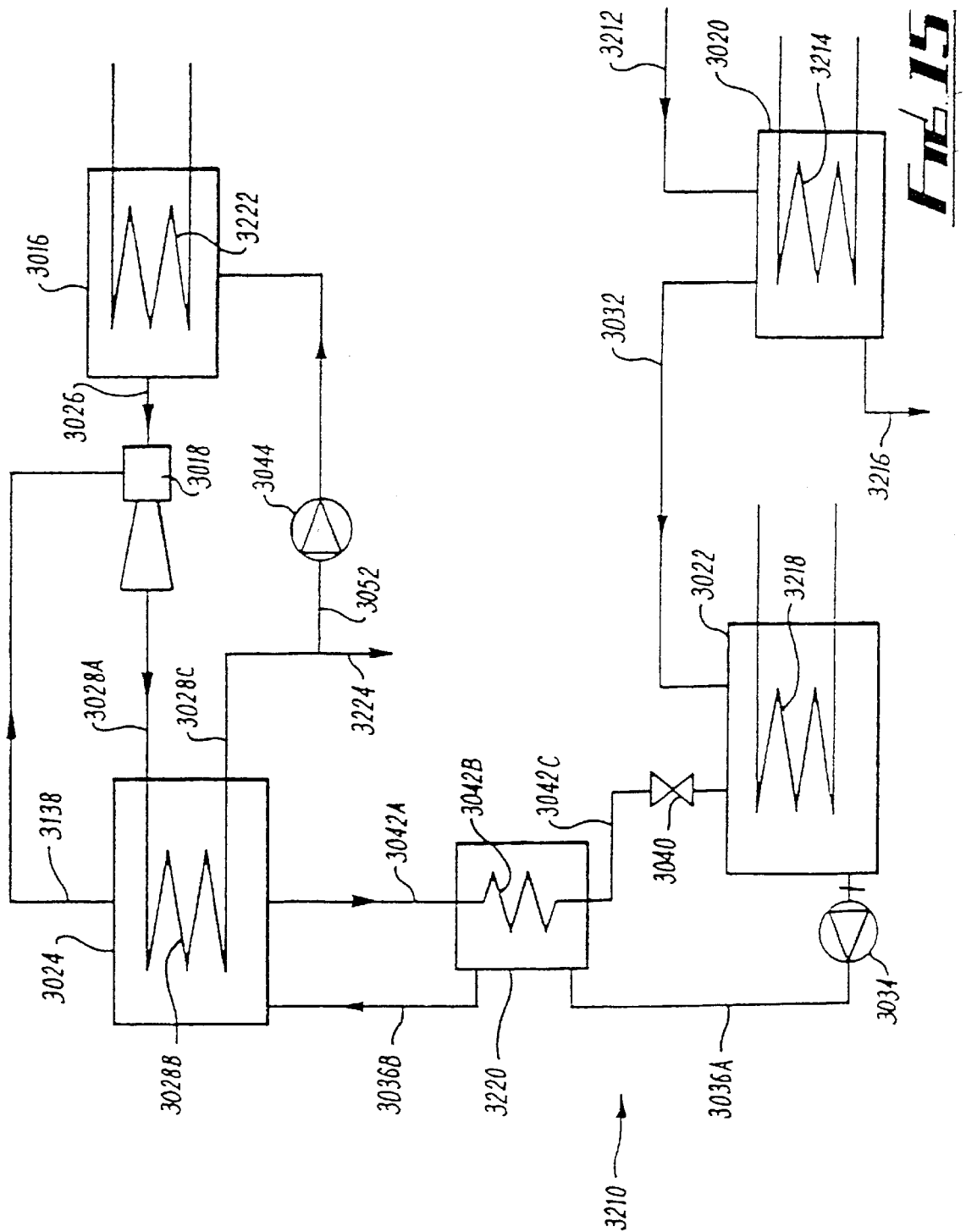
FIG. 15 is a schematic representation of liquid treatment apparatus.

Referring to FIG. 15, there is shown desalination apparatus 3210 which comprises many of the features shown in FIGS. 1 and 2, and these features have been designated the same reference numeral as in FIGS. 1 and 2.

In operation, brine is fed via feed line 3212 to the evaporator 3020. The evaporated 3020 extracts heat from a coil 3214 to evaporate the water from the brine. The steam is passed via line 3032 to the absorber. The residual brine solution remaining in the evaporator 3020 is in the form of a concentrated salt solution and is discharged therefrom via a line 3216. The steam from the evaporator 3020 is passed via line 3032 to the absorber 3022 whereupon it is absorbed in a concentrated aqueous solution of lithium bromide to produce a dilute aqueous solution of lithium bromide. The heat of absorption given out when absorption occurs is extracted by the coil 3218. The dilute solution of lithium bromide is then pumped by pump 3034 via line 3036A to a heat exchanger 3220 to heat the dilute solution which is then passed via line 3036B to the concentrator 3024. The condenser coil 3028B in the concentrator 3024 passes heat to the dilute solution entering the concentrator 3024 to evaporate the water therefrom. This evaporation of the water increases the concentration of the solution of lithium bromide which is passed via line 3042A to the heat exchanger 3220, through a heat exchange coil 3042B whereby heat is passed to the dilute lithium bromide solution passing on the outside of the coil 3042B. The concentrated lithium bromide solution is then passed via the line 3042C through the expansion valve 3040 and thereafter to the absorber 3022.

Heat is fed to the generator 16 via the coil 3222 to heat water therein, to create steam. The steam is passed via line 3026 to the ejector 3018. The steam expands through the primary nozzle of the ejector 3018 thereby entraining low pressure steam from the concentrator 3024 via line 3138. The steam from the line 3026 and the line 3138 is then passed by the line 3138 through the condenser coil 3028B in the evaporator 3024 and then via the line 3028C where it is split into two. The first line 3052 is fed via a pump 3044 back to the generator 3016. The remainder is fed via line 3224 for collection as condensate.

It will be appreciated that the embodiments shown in FIG. 15, which is used for desalination, can also be used for other purposes, for example distillation, or concentration of the liquid fed in at line 3212.

Figure 16:
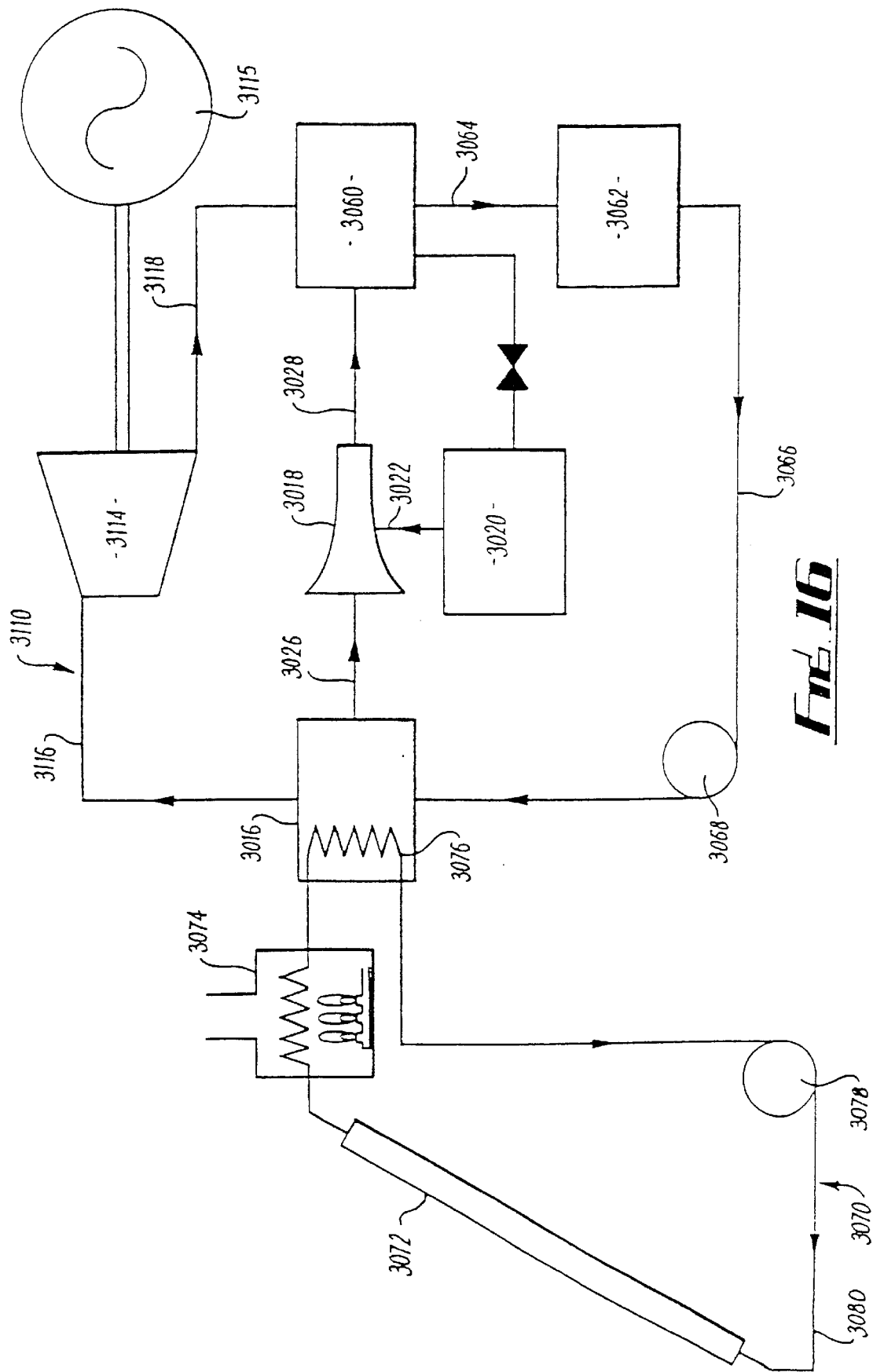
FIG. 16 is a schematic representation of another embodiment of heat transfer apparatus.

Referring to FIG. 16, there is shown further apparatus which comprises a generator 3016, an ejector 3018, an evaporator 3020, a first condenser 3060, a second condenser 3062, and power generating means 3110. The generator 3016 is powered by solar collecting means 3017 which comprises a solar collector panel 3072, a gas burner 3074 and a heating coil 3076 arranged in the generator 3016. A pump 3078 is provided to pump refrigerant around the solar collecting means 3070.

In operation, the pump 3078 acts to pump refrigerant to the solar collector 3072 via a line 3080. As the refrigerant passes through the solar collector 3072, it is heated by solar energy. The heated refrigerant is then passed through the gas burner 3074 which is used in days of low solar energy, and could be omitted in hot climates.

The heated refrigerant is then passed to the heating coil 3076 to heat refrigerant in the generator 3016. Refrigerant from the generator 3016 is passed via line 3026 to an ejector 3018. As the refrigerant is expanded through the primary nozzle it entrains low pressure refrigerant from the evaporator 3020 via line 3022. The exhaust from the ejector which comprises a mixture of refrigerant from lines 3026 and 3022 passes via line 3028 to the first condenser 3060.

Some of the refrigerant evaporated in the generator 3016 is passed to the power generating means via line 3116 to the turbine 3114. The high pressure refrigerant passing into the turbine 3114 causes the blades to rotate thereby enabling electricity to be generated in an alternator 3115. The low pressure refrigerant which exits from the turbine 3114 via line 3118 is passed to the first condenser 3060 where it mixes with the incoming refrigerant from the line 3028. The refrigerant is then passed via line 3064 to the second condenser 3062 whereupon the refrigerant is fully converted to liquid. The refrigerant is then passed via line 3066 by a pump 3068 from the second condenser 3062 to the generator 3016. The cycle can then be repeated.

It will be seen that this cycle comprises two refrigerants. The first refrigerant being in the power generating cycle comprising the ejector, the evaporator and the generator, and the second refrigerant being in the solar collecting means comprising the solar collector 3072, the gas burner 3074 and the heating coil 3076.

Figure 17:
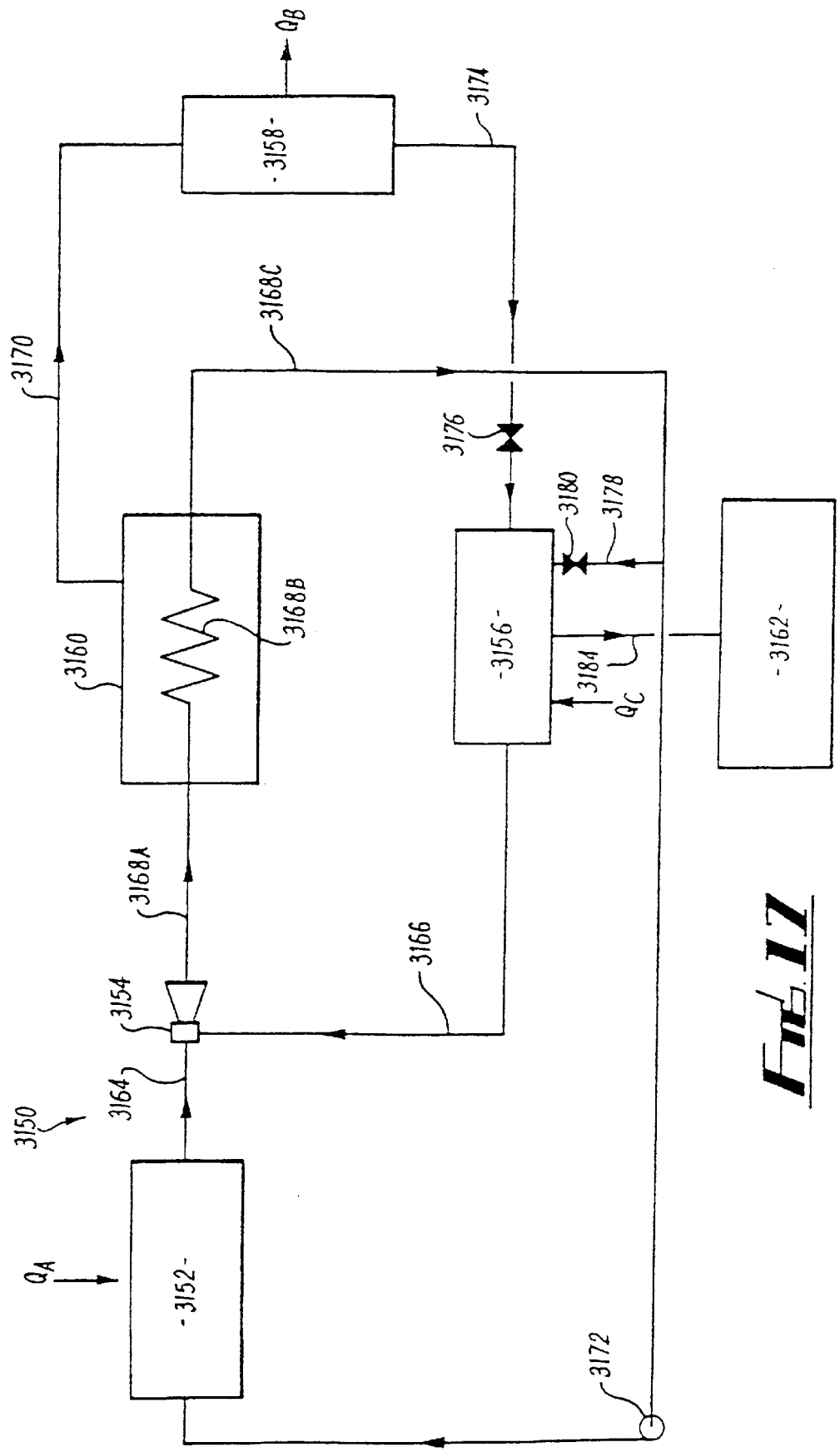
FIG. 17 is a schematic representation of another modification of the transfer apparatus shown in FIG. 11.

Referring to FIG. 17, there is shown a further embodiment of the invention comprising heat transfer apparatus 3150 comprising a first heat transfer cycle including a main generator 3152, an ejector 3154, an evaporator 3156, a condenser 3158, a subsidiary generator 3160, and an adsorber 3162. Heat $Q_A$ is fed to the main generator 3132 to evaporate refrigerant therein. The evaporated refrigerant is passed via line 3164 to the ejector 3154 which is connected via a line 3166 to the evaporator. The high pressure refrigerant passing from the line 3164 through the ejector 3154 entrains low pressure refrigerant in the evaporator 3156 via line 3166. The exhaust from the ejector, which comprises a mixture of refrigerant from the generator 3152 and the evaporator 3156 passes via line 3168 to the subsidiary generator 3160.

The subsidiary generator 3160 is charged with an adsorbent on which is adsorbed a refrigerant, preferably the same as the refrigerant evaporated from the generator 3152. A heating coil 3168B is provided in the subsidiary generator 3160, and transfers heat from the evaporated refrigerant from the ejector 3154 to evaporate refrigerant from the refrigerant/adsorber combination in the subsidiary generator 3160. The refrigerant evaporated in the subsidiary generator 3160 is passed via a line 3170 to the condenser 3158. The refrigerant passing from the heating coil 3168B is passed via line 3168C and is pumped by a pump 3172 back to the main generator 3152.

The refrigerant passing via line 3170 to the condenser 3158 is condensed therein and heat $Q_B$ is given out. The condensed refrigerant is passed via line 3174 to an expansion valve 3176 where the refrigerant is extended and is thereafter passed to the evaporator 3156.

The low pressure refrigerant in the evaporator 3156 extracts heat $Q_C$ from the surroundings to create a refrigerating effect. Some of the refrigerant in the line 3168C is passed via line 3178 and an expansion valve 3180 to the evaporator 3156.

Some of the refrigerant in the evaporator 3156 is entrained by the ejector 3154 via line 3156. The remainder of the refrigerant is passed via line 3182 to the adsorber 3162. The adsorber 3162 is provided with an adsorbent on which the refrigerant passed thereto is adsorbed.

The heat transfer apparatus 3150 further includes a second heat transfer cycle having features similar to those shown in FIG. 17, namely a second main generator, a second ejector, a second evaporator and a second condenser. These features have been omitted from FIG. 17 for clarity. The adsorber 3162 constitutes a second subsidiary generator in the second heat transfer cycle. Thus, the refrigerant/adsorbent combination in the adsorber 3162 acts as the charge of refrigerant/adsorbent combination from which refrigerant is to be evaporated. Thus, with the adsorber 3162 acting as the second subsidiary generator to generate refrigerant vapour, refrigerant vapour can be passed to the second condenser. The cycle, the refrigerant is passed back to the first mentioned subsidiary generator 3160 to be adsorbed onto the adsorbent therein. Thus, the two heat transfer cycles can be repeated as desired alternating from one part of the apparatus to the other.

Figure 18:
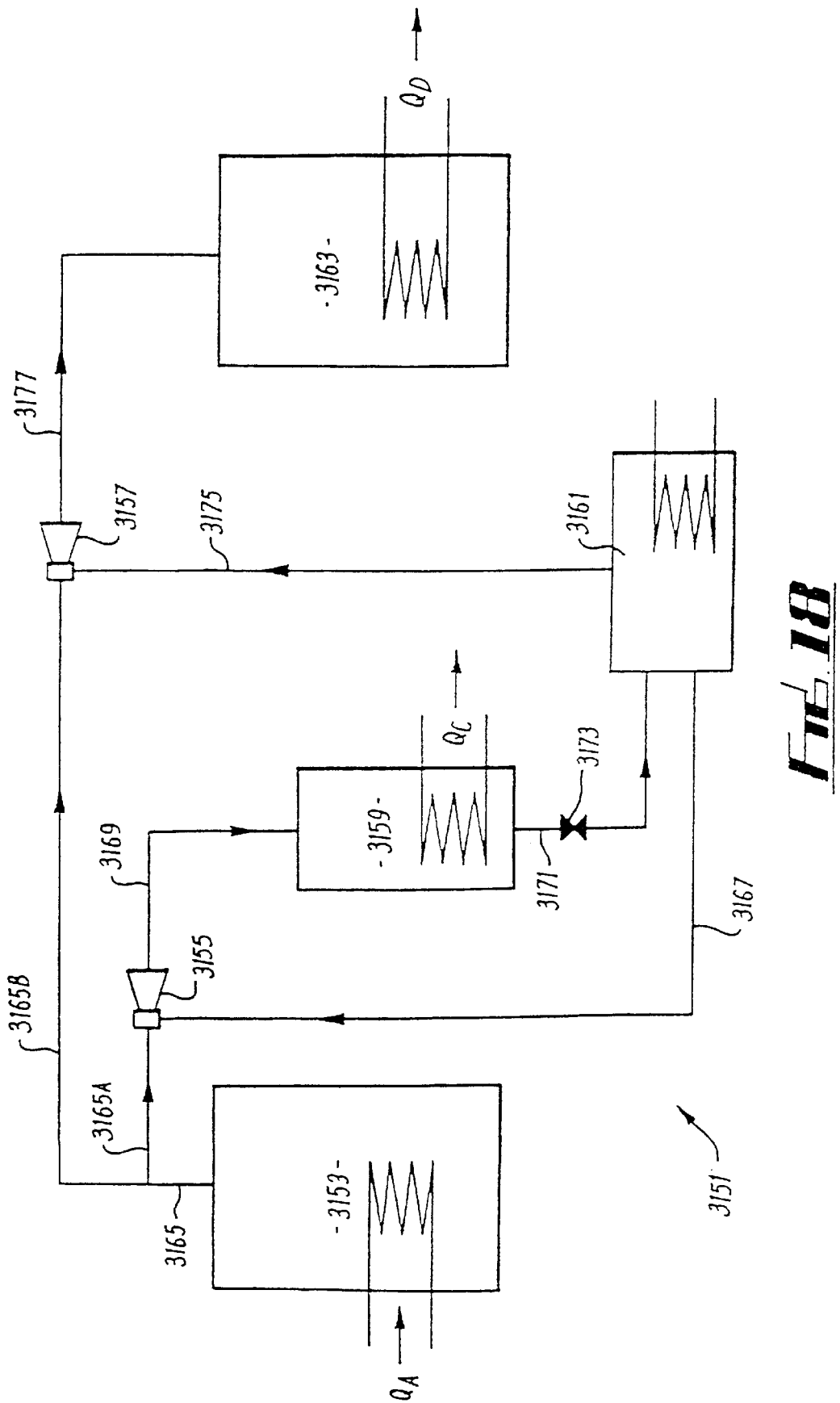
FIG. 18 is a schematic representation of a further modification of the transfer apparatus shown in FIG. 17.

Referring to FIG. 18, there is shown a further embodiment to the apparatus shown in FIG. 18 which is generally designated 3151. The apparatus 3151 comprises a first heat transfer cycle including a generator 3153, a first ejector 3155 and a second ejector 3157. The first ejector 3155 is connected to a condenser 3159, and to an evaporator 3161. The second ejector 3157 is connected to an adsorber 3163.

In operation, the generator 3153 is charged with an adsorbent/refrigerant combination and heat $Q_A$ is supplied thereto. This causes refrigerant to be evaporated and high pressure refrigerant vapour is passed out of the generator via a line 3165. Some of the refrigerant vapour is passed via line 3165A to the first ejector 3155. The passage of the refrigerant through the first ejector 3155 entrains low pressure refrigerant in the evaporator 161 which is passed via line 3167 to the ejector 3155. The exhaust from the first ejector 3155, which consists of a combination of refrigerant from the line 3165A and from the line 3167, is passed via line 3169 to the condenser 3159. Heat of condensation $Q_C$ is extracted from the condensing refrigerant and this is removed from the condenser 3159. The condensed refrigerant is passed via line 3171 and is expanded through expansion valve 3173 to be passed to the evaporator 3161.

The remainder of the high pressure refrigerant is passed via line 3165B to the second ejector 3157, which entrains low pressure refrigerant in the evaporator 3161 via line 3175. The exhaust from the second ejector 3157 is passed via line 3177 to the adsorber 3163. The adsorber 3163 is provided with an adsorbent, and the refrigerant entering the adsorber 3163 is adsorbed onto the adsorbent wherein heat adsorbent $Q_D$ is given out.

A second heat transfer cycle (not shown for clarity) in which refrigerant in the adsorber 3163 is passed back to the generator 3153 and adsorbed onto the adsorbent therein. The second heat transfer cycle includes first and second ejectors, a condenser and an evaporator arranged in a similar manner relative to each other as that shown in FIG. 18 for the first mentioned heat transfer cycle to transfer heat (and adsorbent) to the generator 3151.

Thus, when the refrigerant has been adsorbed into the adsorbent in the adsorber 3163, heat can be fed into the adsorber 3163 to generate refrigerant, wherein the generator 3153 acts as an adsorber and refrigerant is adsorbed onto the adsorbent therein.

Figure 19:
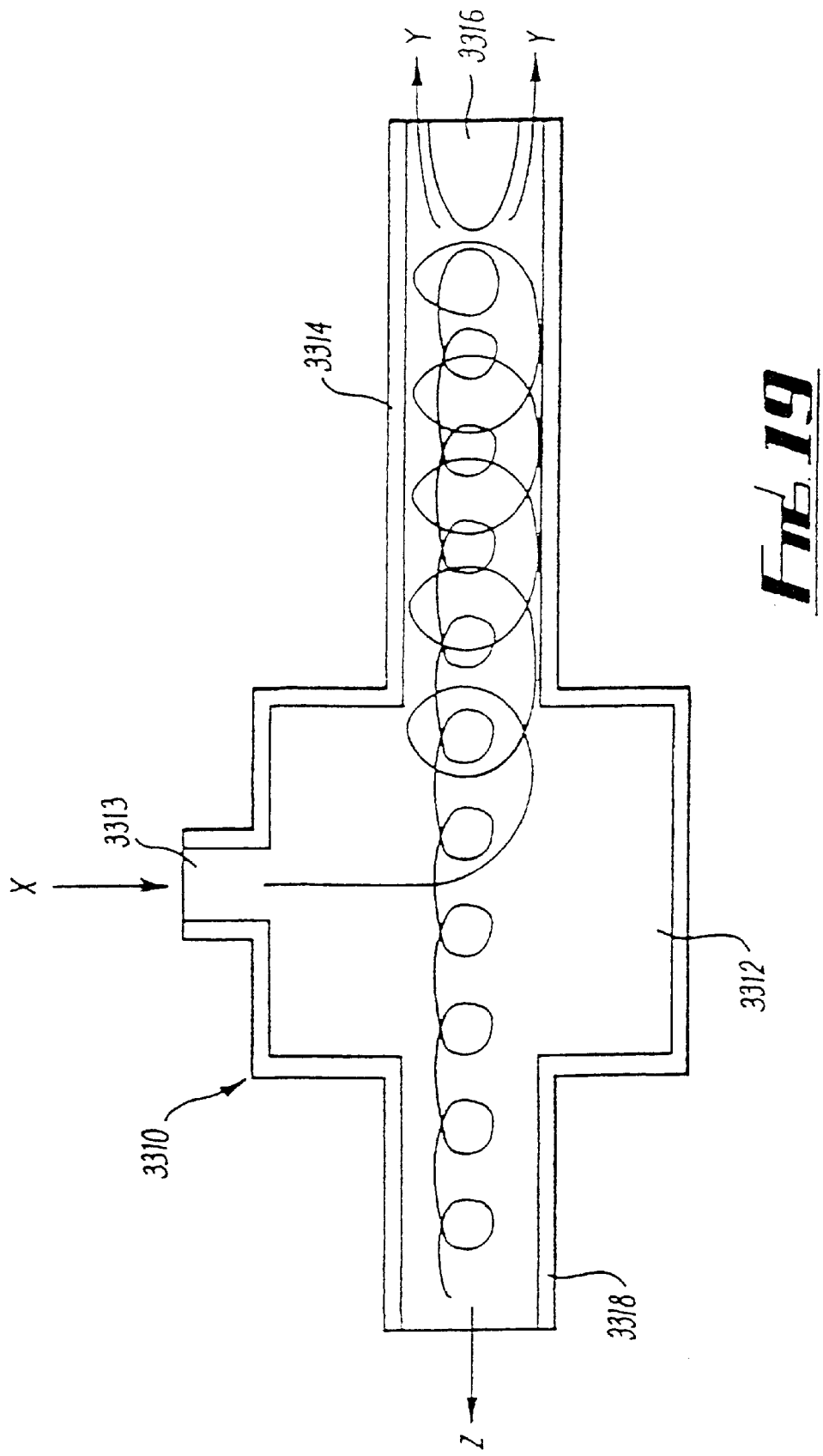
FIG. 19 is a schematic representation of a vortex tube.

Referring to FIG. 19, there is shown a schematic representation of a standard vortex tube 3310. The vortex tube 3310 comprises a chamber 3312 into which a compressed gas, for example air, is fed as shown by the arrow X. The tube 3310 further includes a first pipe 3314 having an obstruction 3316 arranged centrally at the end thereof partially to block the end of the pipe 3314. The vortex 3310 further includes a second pipe 3318. It has been found that the gas leaving the end of the tube 3314 as shown by the arrow Y is higher in temperature than the compressed gas entering via the inlet 3313, and the compressed gas leaving from the end of the pipe 3318 in the direction of the arrow Z is colder than the compressed gas fed through the inlet 3313.

Figure 20:
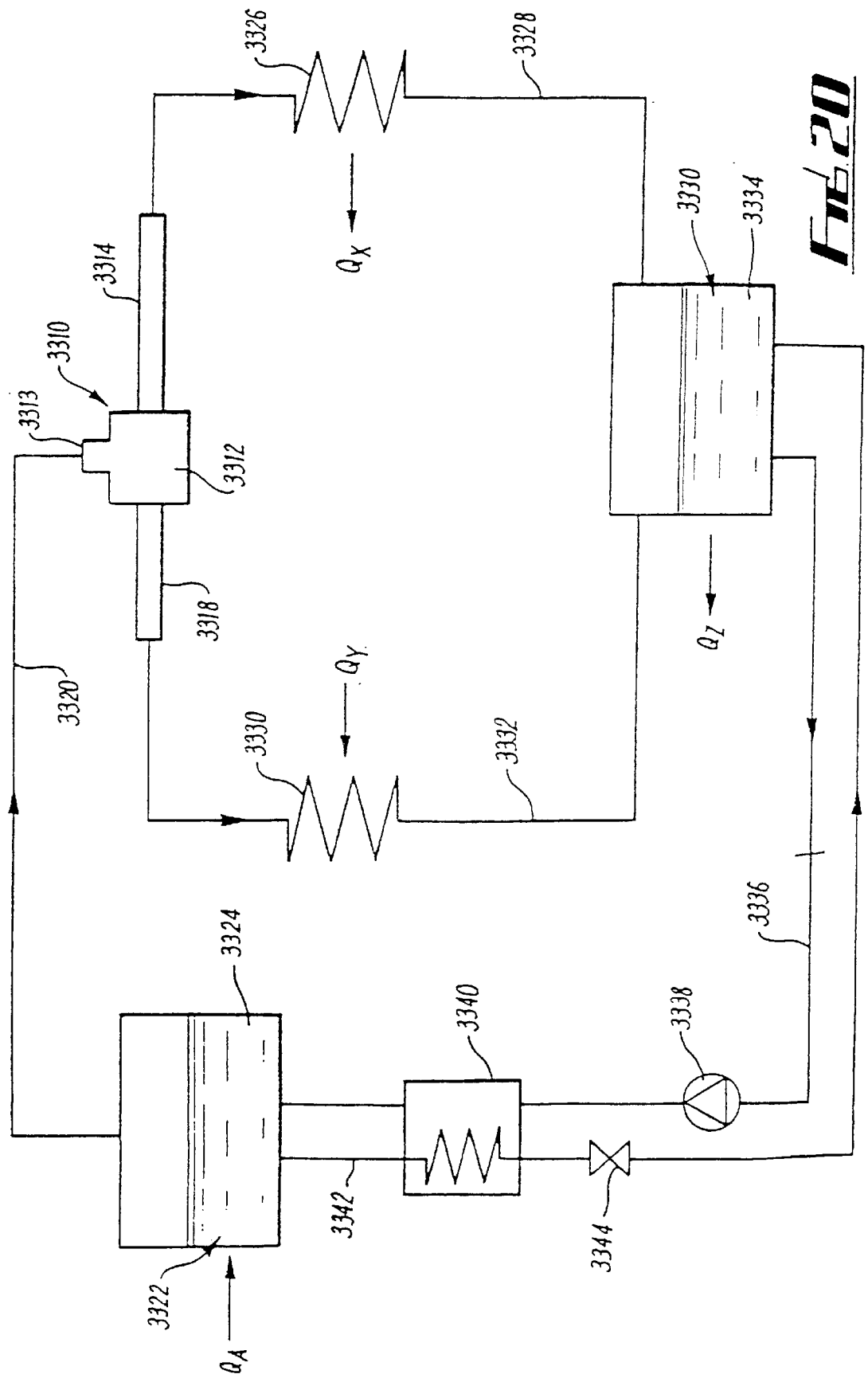
FIG. 20 is a schematic representation of heat transfer apparatus incorporation a vortex tube.
Figure 21:
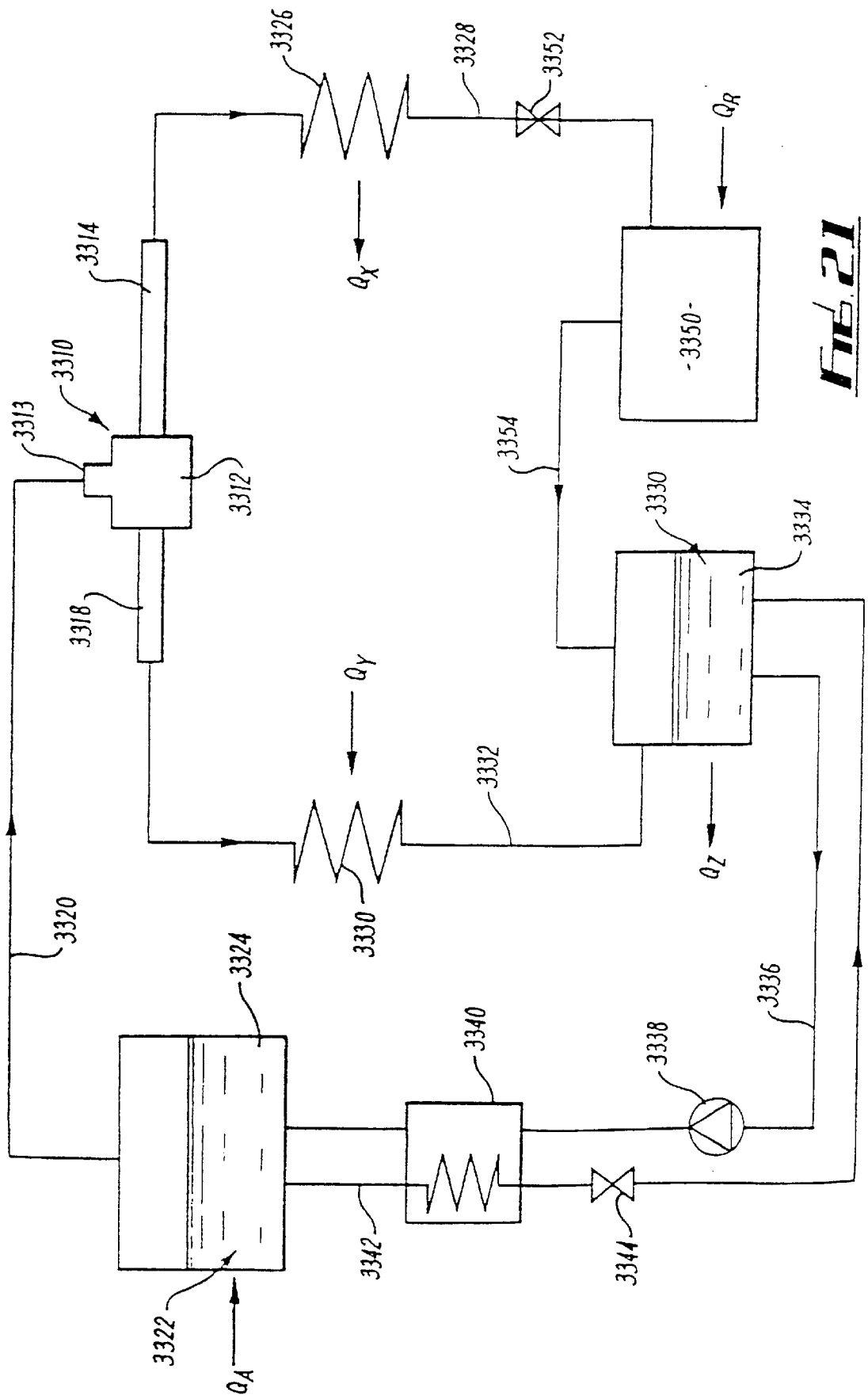
FIG. 21 is modification of heat transfer apparatus incorporating a vortex tube.
Figure 22:
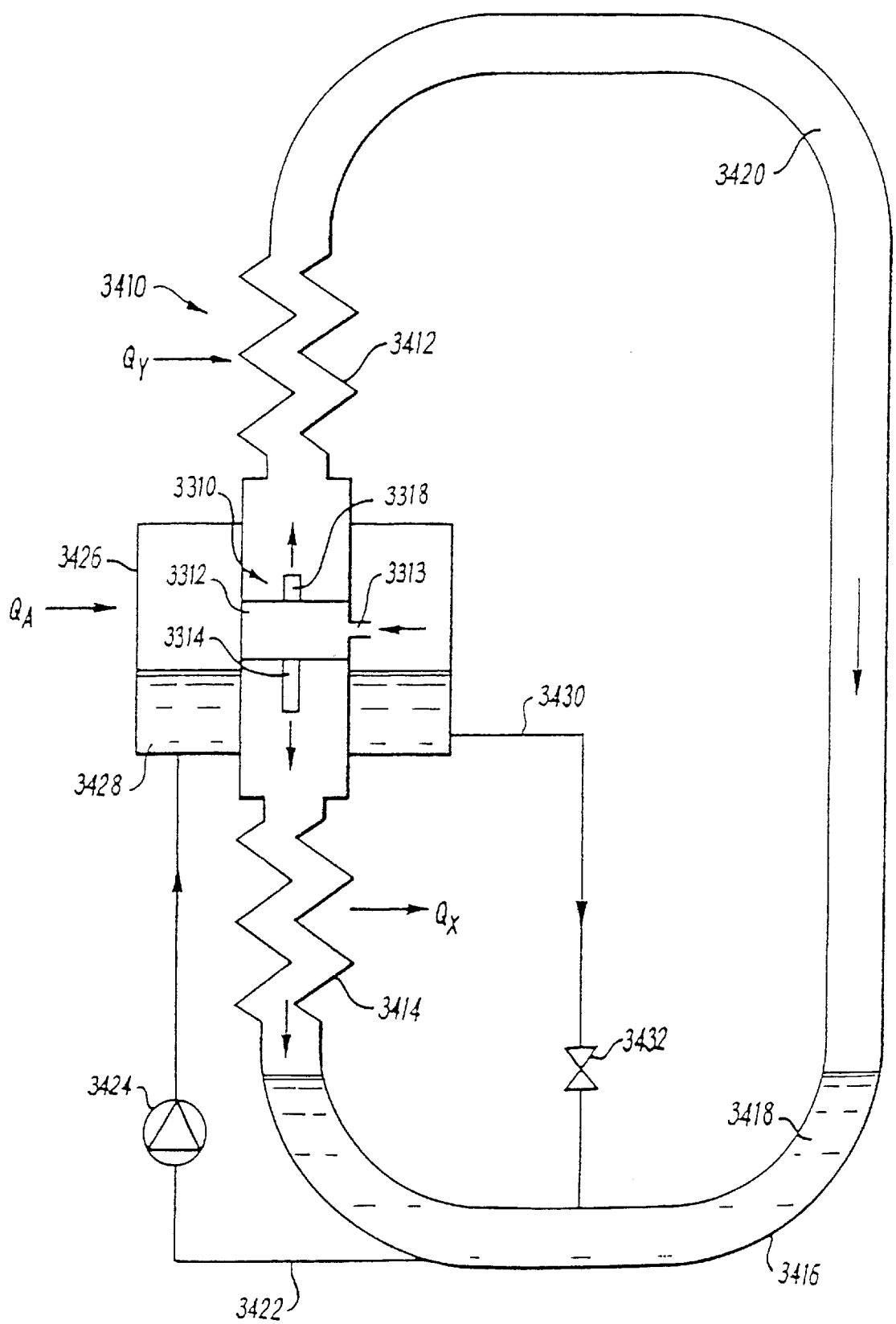
FIG. 22 is a further modification of heat transfer apparatus incorporating a vortex tube.

FIGS. 20, 21 and 22 show uses of the vortex tube 3310. Referring to FIG. 20, the vortex tube 3310 is fed via line 3320 from a generator 3322. Heat $Q_A$ is fed to the generator to evaporate a refrigerant/absorbent combination 324 therein. The refrigerant evaporated from the generator 3322 is at high pressure and when this is fed to the chamber 3312 of the vortex tube 3310 via the inlet 3313 hot refrigerant vapour is passed out of the end of the pipe 3314 is passed to a heater 3326 at which heat $Q_X$ is given out. The refrigerant from the heating coil 3326 is passed via line 3328 to an absorber 3330. Refrigerant exiting from the end of the pipe 3318 is in the form of cold vapour which is passed to a cooling coil 3330 to extract heat $Q_Z$ from the surroundings. The refrigerant is passed from the cooling coil 3330 via the line 3332 to the absorber 3330. The absorber 3330 contains an absorbent 3334 and the incoming refrigerant from the lines 3328 and 3332 is absorbed by the absorbent 3334. This gives out heat $Q_Z$ in the form of heat of absorption. The solution formed when the refrigerant is absorbed by the absorbent 3334 is passed via line 3336 and a pump 3338 through a heat exchanger 3340 to the generator 3322. The heat exchanger 3340 heats the refrigerant/absorbent combination in the line 3336 before being passed to the generator 3322. In the generator 3322 refrigerant is evaporated and passed via line 3320 as explained above, and the high temperature absorbent is then passed via line 3342 through the heat exchanger 3340 where heat is exchanged with the absorbent/refrigerant combination passing through the heat exchanger 3340 via the line 3336. The absorbent in the line 3342 is then expanded by an expansion valve 3344 and turned to the absorber 3330.

FIG. 21 shows a modification to the embodiment shown in FIG. 20 and includes many of the same features as that shown in FIG. 20. These features have been designated with the same reference numeral. The embodiment shown in FIG. 21 differs from that shown in FIG. 20 in that an evaporator 3350 is provided to receive refrigerant from the line 3328. The refrigerant in the line 3328 is expanded by an expansion valve 3352 prior to entry into the evaporator 3350. Thus, on entry to the evaporator 3350, the refrigerant is evaporated thereby extracting heat $Q_R$ from its surroundings to create a refrigerating effect. The evaporator refrigerant is passed via line 3354 to the absorber 3330 where incoming refrigerant from the lines 3350 and 3332 are absorbed by the absorbent 3334. The cycle shown in FIG. 21 then operates in the same way as that shown in FIG. 20.

Referring to FIG. 22, there is shown a heat pipe 3410 incorporating a vortex tube 3310. The heat pipe 3410 comprises a cooling coil 3412 whereby cold air passed from the end of the pipe 3318 can extract heat $Q_Y$ from the surroundings. The heat pipe 3410 further includes a heating coil 3414 to receive hot vapour from the end of the pipe 3314 thereby giving out heat $Q_X$. The heat pipe 3410 further includes an absorber section 3416 comprising an absorbent 3418. Cold refrigerant passing through the cooling coil 3412 is passed through a section 3420 of the heat pipe to the absorber section 3416. Refrigerant from the heating coil 3414 is also passed to the absorber section 3416 at the other end thereof. The refrigerant from both the heating and cooling coils 3412, 3414 is absorbed in the absorbent 3418 and this is passed via line 3422 by a pump 3424 to a generator 3426. Heat $Q_A$ is fed to the generator 3426 to evaporate the refrigerant from the refrigerant/absorbent combination 428. The evaporated refrigerant is produced at high pressure and is fed to the vortex tube via inlet 3313. The concentrated absorbent is fed via line 3430 to an expansion valve 3432 to expand the absorbent prior to being passed to the absorber section 3416 of the heat pipe 3410.

Figure 24:
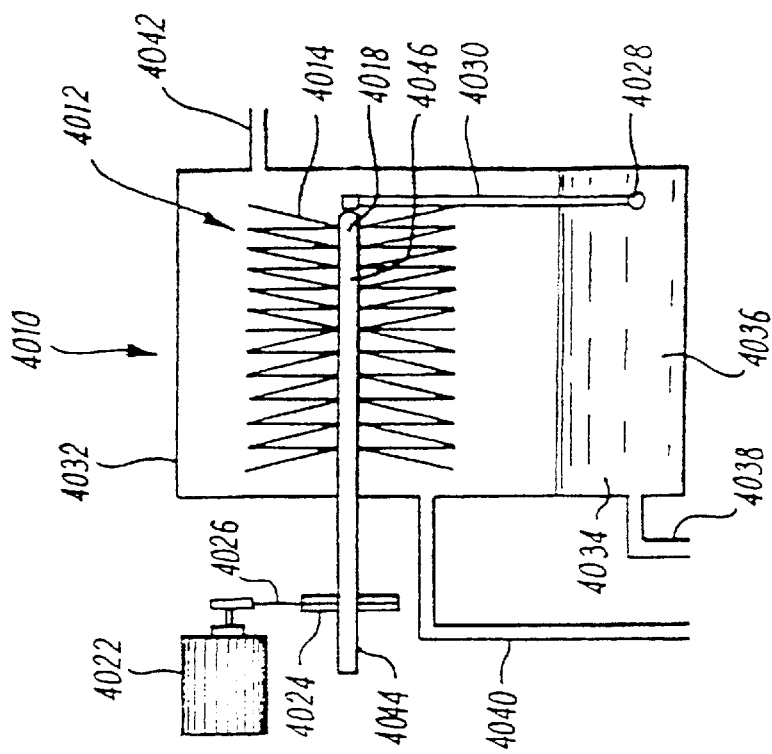
FIG. 24 is a schematic representation of a modification of the heat transfer apparatus shown in FIG. 23.
Figure 23:
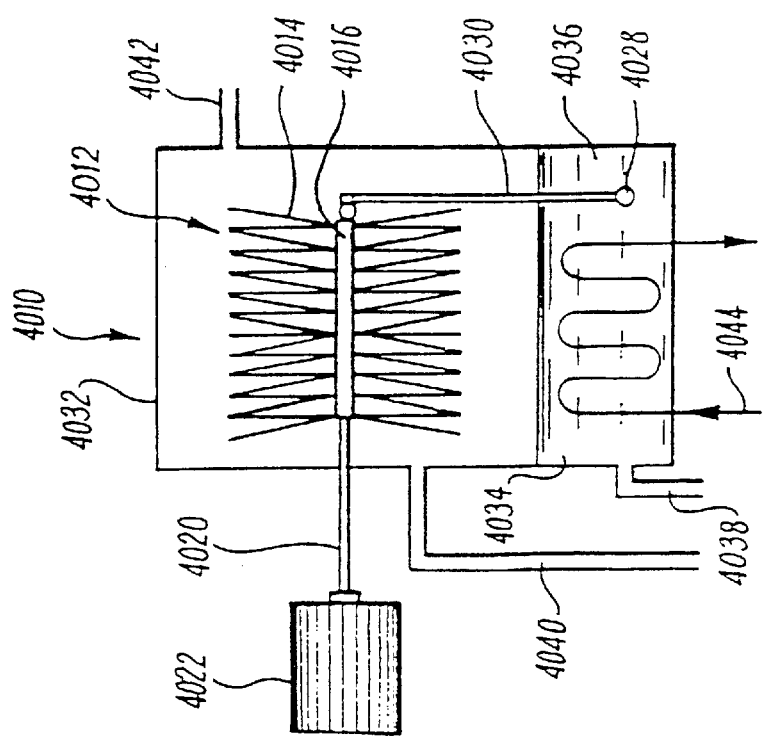
FIG. 23 is a schematic representation of further heat transfer apparatus according.

Referring to FIGS. 23 and 24, there is shown heat transfer apparatus 4010 comprising a rotatable heat exchanger 4012 comprising a plurality of elongate elements in the form of elongate needles 4014 mounted on a shaft which, in the case of the embodiment shown in FIG. 23 is in the form of a spindle 4016, and in the case of the embodiment shown in FIG. 24, is in the form of a rotatable heat pipe 4018.

In the case of the apparatus shown in FIG. 23, the spindle 4016 is connected via a rod 4020 to a drive motor 4022. In the case of the embodiment shown in FIG. 24, the heat pipe 4018 is connected via a pulley 4024 and a belt 4026 to the drive motor 4022.

The elongate needles 4014 extend outwardly from the spindle 4016 or heat pipe 4018 circumferentially around the spindle 4016 or heat pipe 4018 to provide a large surface area for the transfer of heat to or from heat transfer fluid applied to the needles 4014. The apparatus includes collection means in the form of a scoop pipe 4028 mounted on an elongate member 4030 which, in turn, is fixedly to the shaft 4016 or heat pipe 4018, as shown.

The apparatus 4010 comprises a housing 4032 in which the heat exchanger is housed, and the housing 4032 includes a reservoir 4034 in which a heat transfer fluid 4036 is contained. An outlet pipe 4038 extends from the reservoir to discharge the heat transfer fluid 4036 therefrom, and an inlet pipe 4040 is connected to the housing 4032 to supply a heat transfer fluid thereto. The heat transfer fluid supplied to the housing 4032 may, or may not, be the same as the heat transfer fluid 4036 discharged via the pipe 4038. For example, if the apparatus is functioning as an absorber, the heat transfer fluid entering the apparatus 4010 will be in the form of a refrigerant whereas the heat transfer fluid in the reservoir 4032 will be in the form of a solution of refrigerant/absorbent.

A conduit 4042 extends from the housing 4032 in the vicinity of the needles 4014 to supply evaporated heat transfer fluid to the needles 4014, or to discharge evaporated heated transfer fluid from the housing 4032, depending upon the function of the apparatus 4010. Referring to FIG. 23, heat in put or removal means 4044 is provided either to heat the heat transfer fluid 4036, or remove heat therefrom depending upon the function of the apparatus 4010.

Referring to FIG. 24, the heat pipe 4018 comprises a first end region 4044 external of the housing 4032, and a second end region 4046 located inside the housing 4032. In operation, heat may be supplied to the end region 4044 to be transferred along the heat pipe to the end region 4046 thereby to evaporate heat transfer fluid on the needles 4014. Alternatively, heat can be removed from the end region 4044 thereby allowing heat to be transferred from the second end region 4046 to a region outside the housing 4032.

The drive motor 4022 operates to rotate the heat exchanger 4012 which, in turn, rotates the scoop pipe 4028. This causes heat transfer fluid 4036 to be dispersed over the whole surface of the needles 4014, to provide efficient heat transfer.

The apparatus shown in FIGS. 23 and 24 can be in the form of a generator for generating evaporated heat transfer fluid, a condenser for condensing evaporated heat transfer fluid, an absorber holding an absorbent for absorbing the evaporated heat transfer fluid, and an evaporator for evaporating heat transfer fluid thereby creating a refrigerating effect.

FIGS. 25 to 29 show various heat transfer assemblies which comprise, in different combinations, heat transfer apparatus of the form shown in FIGS. 23 and 24 as generator, condenser, absorber, and evaporator, and will now be described below.

Figure 25:
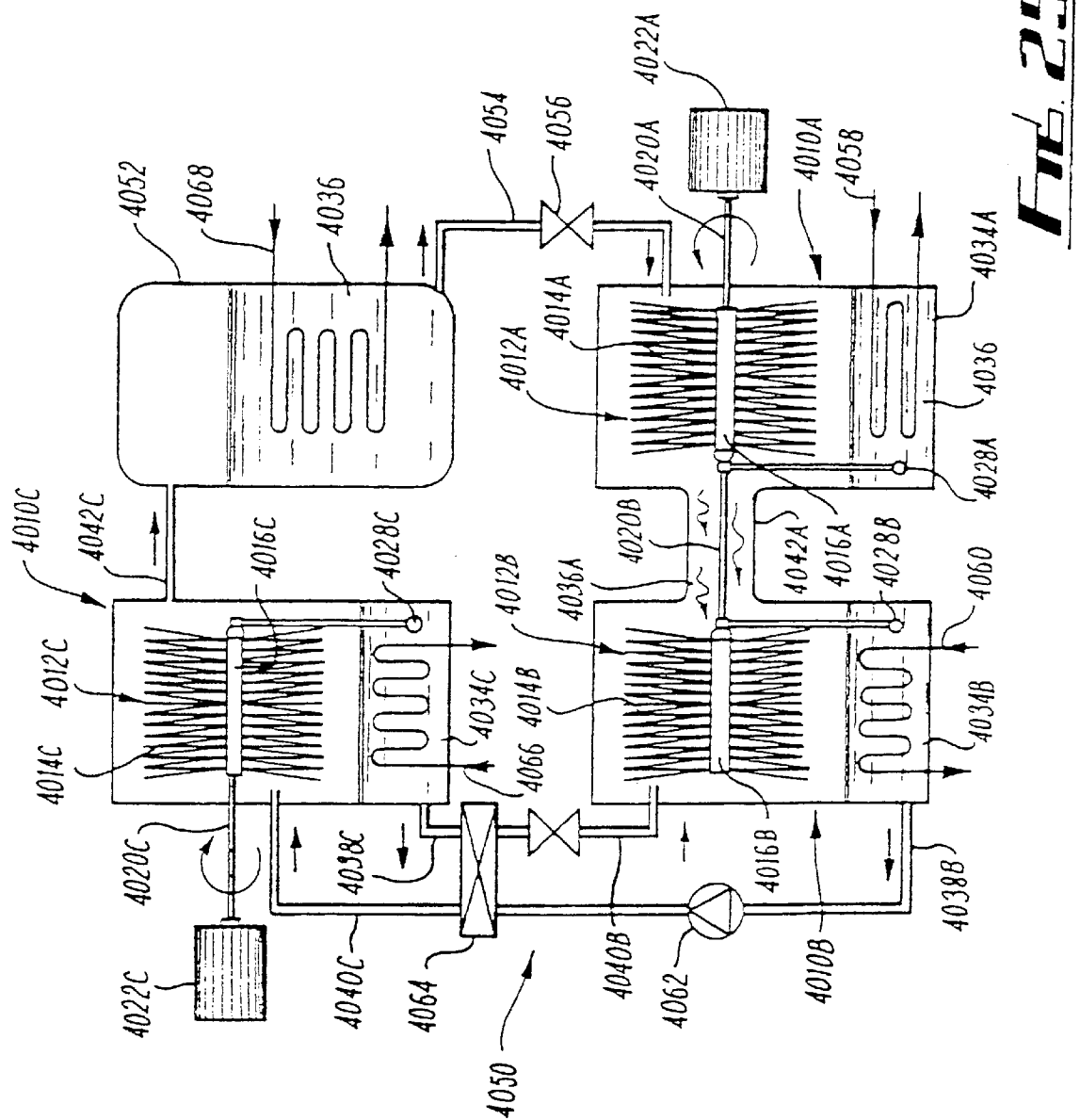
FIG. 25 is a schematic representation of one embodiment of a heat transfer assembly.

FIG. 25 shows a heat transfer assembly 4050 comprising an evaporator 4010A, an absorber 4010B and a generator 4010C. The evaporator 4010A, the absorber 4010B and the generator 4010C each comprises a heat exchanger 4010 of the type shown in FIG. 23. The assembly 4050 also comprises a condenser 4052 which is of the standard type.

Condensed heat transfer fluid, or refrigerant, 4036 is passed via a pipe 4054 and an expansion valve 4056 to the evaporator 4010A. The expansion valve 4056 expands the refrigerant 4036 passing therethrough to reduce its pressure. The reduced pressure refrigerant 4036 entering the evaporator 4010A passes onto the needles 4014A and to the reservoir 4034A where the scoop pipe 4028A disperses the refrigerant 4036 over the needles 4014A to enable evaporation to take place upon rotation of the spindle 4016A by the motor 4022A, thereby rotating the needles 4014A to enhance evaporation. This creates a refrigerating effect and fluid being passed through the reservoir 4034A via the conduits 4058 is cooled.

The evaporated refrigerant 4036A is passed via the conduit 4042 to the absorber 4010B. A connecting rod 4020B extends from the spindle 4016A in the evaporator to the spindle 4016B in the absorber 4010B. Thus, the heat exchangers 4012A and B in the evaporator 4010A and the absorber 4010B are rotated synchronously by the motor 4022.

The reservoir 4034B of the absorber 4010B holds a refrigerant/absorbent solution which is dispersed over the needles 4014B by the scoop pipe 4028B in the absorber 4010B. This causes the incoming evaporated refrigerant 4036A to be absorbed into the refrigerant/absorbent solution on the needles 4014. Heat of absorption is extracted from the reservoir 4034B of the absorber 4010B via fluid conduit 4060. A strong refrigerant/absorbent solution is passed via an outlet 4038B and a pump 4062, through a heat exchanger 4064 where the solution is heated. The solution is then passed by a pipe 4040C to the generator 4010C, and collects in the reservoir 4064C. Heat is supplied to the generator 4010C via the conduits 4066, and the scoop pipe 4028C disperses the refrigerant/absorbent solution over the needles 4014C whereby, upon rotation of the heat exchanger 4012C by the motor 4022C, the refrigerant is evaporated to be passed via the outlet 4042C to the condenser 4032. A weak refrigerant/absorbent solution is passed via the outlet 4038C through the evaporator 4064 to heat the fluid passing therethrough from the pipe 4038B. This results in the weak refrigerant/absorbent solution being cooled and this solution is then passed via the inlet conduit 4040B to the absorber 4010B for further absorption. The evaporated refrigerant in the outlet 4042C entering the condenser is condensed by cooling fluid passing through the conduits 4068. The cycle is then repeated.

The expression "strong refrigerant/absorbent solution" used herein refers to a solution having a high concentration of refrigerant. The expression "weak refrigerant/absorbent solution" refers to a solution having a low concentration of refrigerant.

Figure 26:
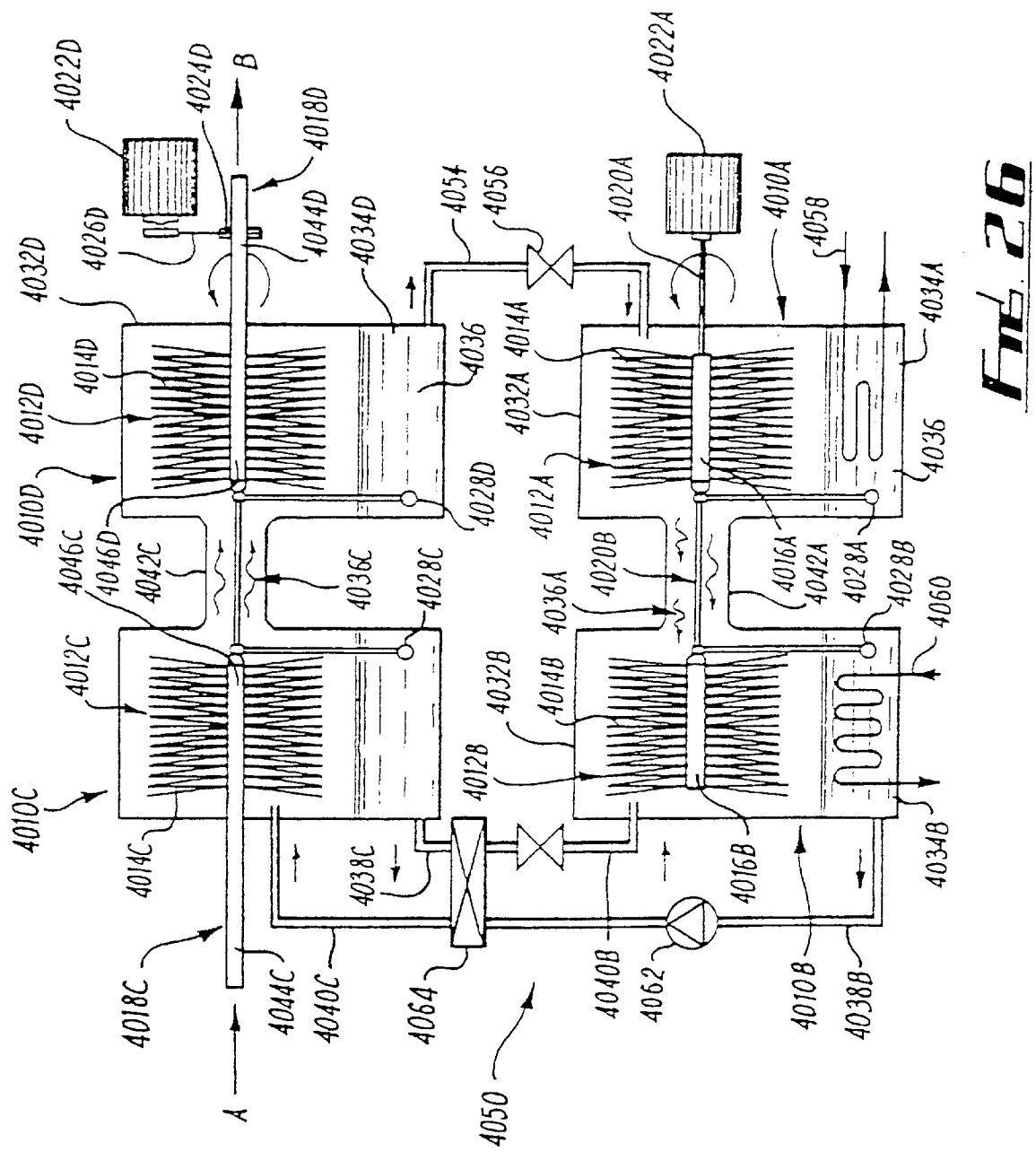
FIGS. 26 to 31 are schematic representations of a modifications heat transfer assemblies.

Referring to FIG. 26, there is apparatus similar to that shown in FIG. 23, but which differs in that the standard condenser 4032 is replaced by heat exchange apparatus 4010D which is of the type shown in FIG. 24. The generator 4010C comprises heat exchanger 4012C, also of the type shown in FIG. 24, i.e. both including heat pipes 4018C, 4018D.

The operation of the evaporator 4010A and the absorber 4010B is the same as for FIG. 25, and will not be described below. The operation of the generator 4010C is similar to the generator 4010C shown in FIG. 25, with the exception that the conduit 4066 for heating the solution in the reservoir 4034C has been omitted. The heat exchanger 4012C and the heat exchanger 4012D are both rotated by means of the drive motor 4022D which is connected via the pulley 4024D and a belt 4026D to the heat pipe 4018D. Heat, designated by the arrow A is supplied to the first end region 4044C and is transferred to the second end region 4046C of the heat pipe 4018C which causes refrigerant in the refrigerant/absorbent solution on the needles 4014C to be evaporated upon rotation thereof. The evaporated refrigerant passes along the conduit 4042C to the condenser 4010D to collect in the reservoir 4034D and to be dispersed over the needles 4016D by the scoop pipe 4028D. Heat is transferred along the heat pipe 4018D from the second end region 4046D to the first end region 4044D to be removed from the heat pipe 4018D as represented by the arrow B. The condensed refrigerant 4036 collects in the reservoir 4034D and is passed via the pipe 4054 to the evaporator 4010A via the expansion valve 4056.

Figure 27:
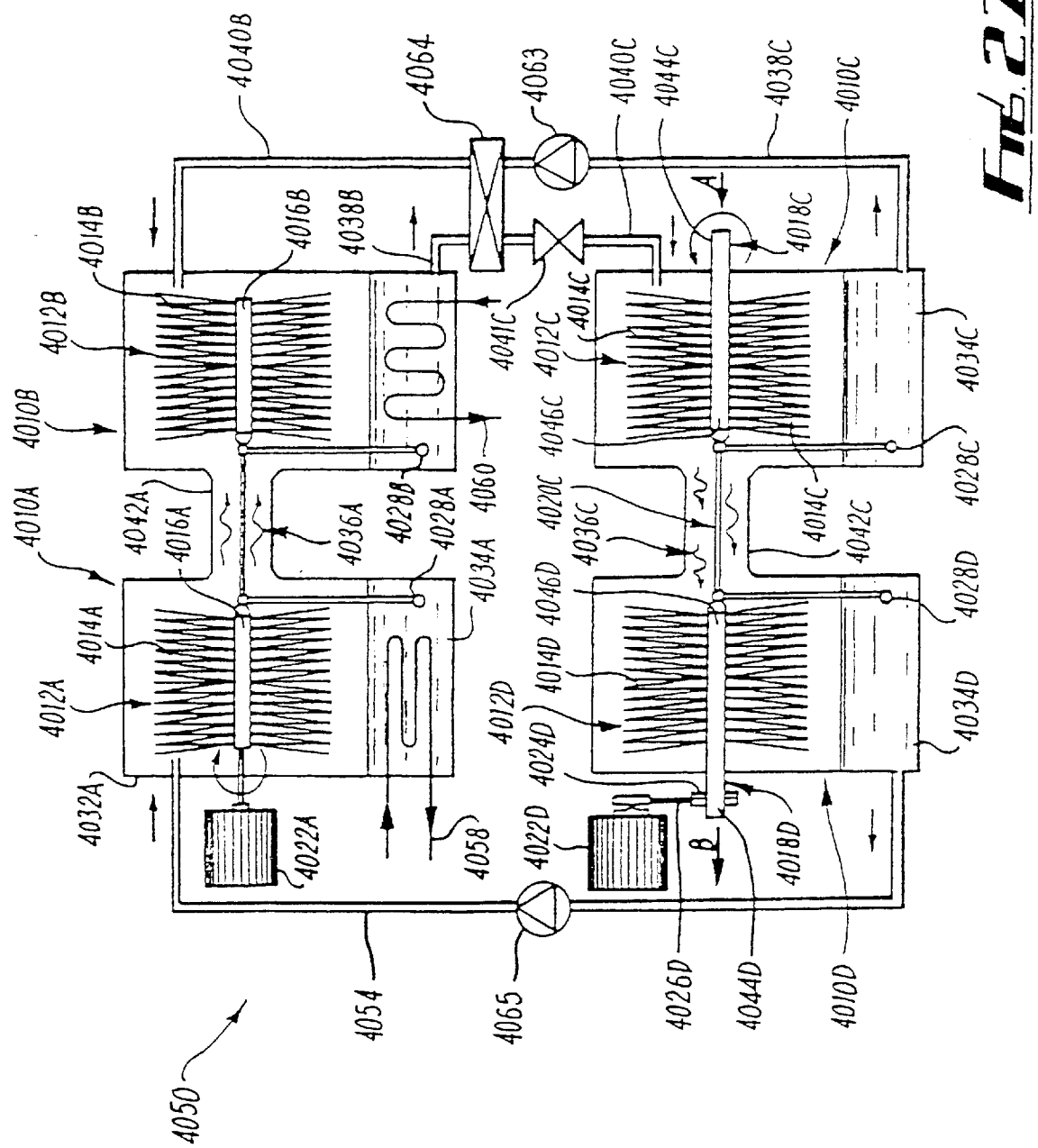

Referring to FIG. 27 there is shown a heat transfer means which comprises the same components as the embodiment shown in FIG. 26 but operates in a different manner.

Waste heat is fed to the generator 4010C via the heat pipe 4018C as shown by the arrow A and to the evaporator 4010A via the heating fluid in the conduit 4058.

The heat fed to the heat pipe 4018C on the generator 4010C evaporates incoming refrigerant from strong refrigerant/absorbent solution entering from the conduit 4040C after having been expanded through an expansion valve 4041C so that the refrigerant/absorbent solution enters the generator 4010C at low pressure. The evaporated refrigerant generated by the generator 4010C passes via the conduit 4042C to the condenser 4010D, where heat is extracted from the refrigerant passing over the needles 4016D so that the refrigerant condenses on the needles 4016D and collects in the reservoir 4034D, at a low temperature. Heat is removed from the condenser 4010D via the heat pipe 4018D as shown by the arrow B.

The absorbent from which the refrigerant has been evaporated collects in the reservoir 4034C of the generator 4010C and thereafter the weak refrigerant/absorbent solution is pumped by a pump 4063 to the absorber 4010B in the conduits 4038C and 4040B.

A scoop pipe 4028C, rotating with the rotatable heat exchanger 4012C in the generator 4010C ensures that the needles 4014C are kept covered with the refrigerant/absorbent solution. Similarly, the scoop pipe 4028D ensures that the needles 4014D of the rotatable heat exchanger 4012D are kept coated with condensed refrigerant.

The condensed refrigerant in the reservoir 4034D is pumped by a pump 4063 via the conduit 4054 to the evaporator 4010A. Waste heat fed to the evaporator 4010A by fluid in the conduit 4058 to evaporate the refrigerant on the needles 4014A. The scoop pipe 4028A ensures that the needles 4014A are kept coated with the refrigerant.

The evaporated refrigerant is passed via the conduit 4042A to the absorber 4010B where the refrigerant is absorbed by the absorbent on the needles 4014B giving out heat of absorption. The heat of absorption is removed by fluid in the conduit 4060.

Thus waste heat is fed into the system, at the generator 4010C and the evaporator 4010A at a moderate temperature, and by virtue of heat transfer in the system is removed at low temperature from the condenser, and at high temperature from the absorber.

Figure 28:
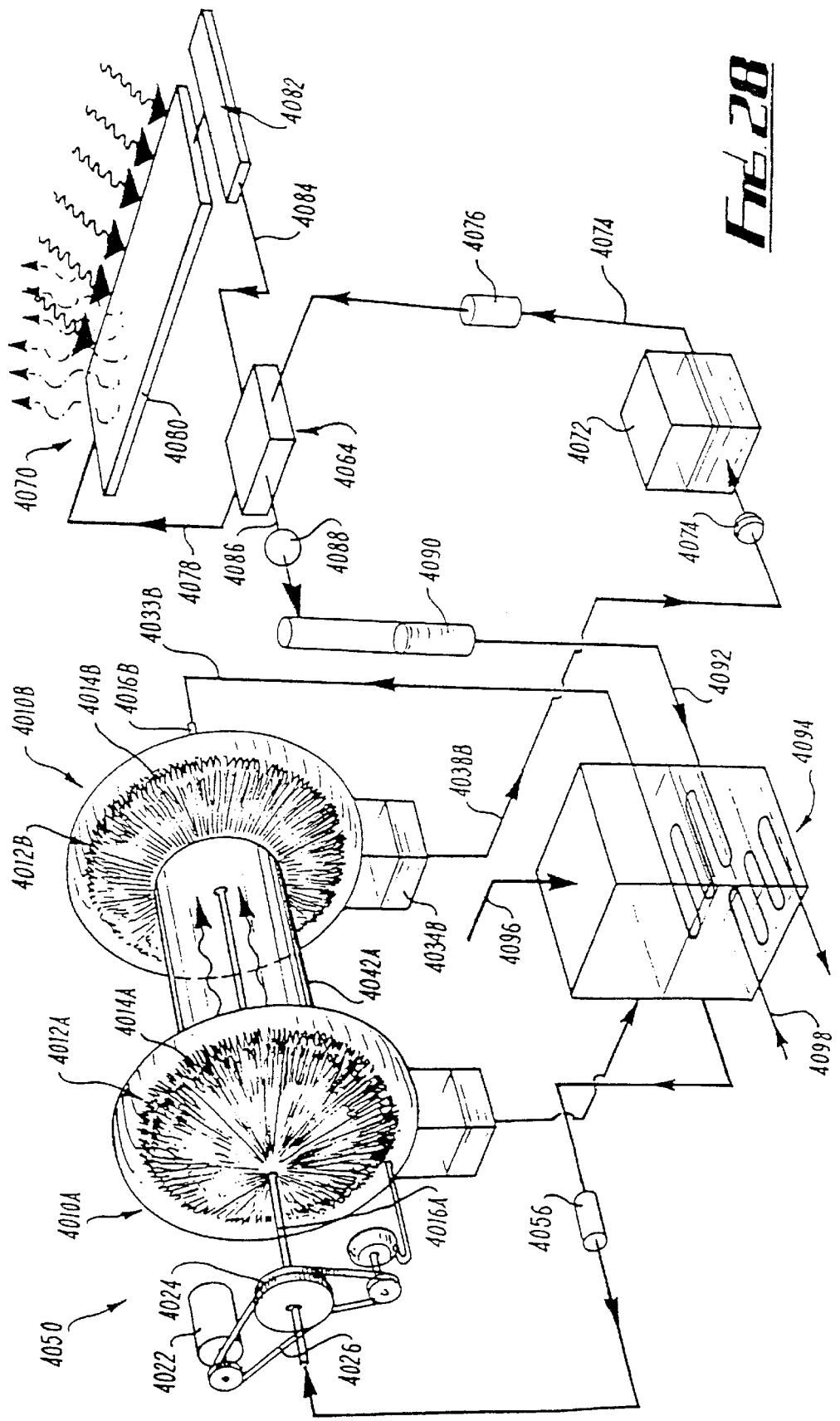

Referring to FIG. 28, there is shown a perspective schematic view of a further embodiment of heat transfer assembly 4050 and comprises a generator 4010A, an absorber 4010B, and a generator 4070. The evaporator 4010A comprises a rotatable heat exchanger 4012A having a plurality of elongate needles 4014A mounted on a hollow spindle 4016A driven by a motor 4022 and a pulley 4024 and belt 4026 arrangement.

In operation, refrigerant is fed via an expansion valve 4056 to the hollow spindle 4016A to be passed to the needles 4014A. Rotation of the heat exchanger 4012A by the motor 4022A causes refrigerant to move along the needles 4014A so that complete coverage of the needles 4014A is obtained. The refrigerant in the evaporator 4010A is evaporated and passes along the conduit 4042A to the absorber 4010B. The absorber 4010B receives via the conduit 4033B a weak refrigerant/absorbent solution via the hollow spindle 4016B to be spread over the needles 4014B by centrifugal forces. This causes the refrigerant entering the absorber 4010B via the conduit 4042A to be absorbed into the absorbent on the needles 4014B. A strong refrigerant/absorbent solution is collected in the reservoir 4034B and is passed via the conduit 4038B to a holding tank 4072 via a filter 4074. The strong refrigerant/absorbent solution is then pumped via conduits 4074 by a pump 4076 to a heat exchanger 4064 to be heated thereby. The solution is then pumped via a conduit 4078 to the generator 4070.

The generator 4070 comprises a solar collector 4080 to receive solar energy. This evaporates the refrigerant in the strong refrigerant/absorbent solution and a weak refrigerant/absorbent solution is collected in a collecting tank 4082. The weak refrigerant/absorbent solution, which is now at a high temperature, is passed via the conduit 4084 to the heat exchanger 4064 to be cooled by the incoming solution through the conduit 4074. The weak refrigerant/absorbent solution is then passed by a conduit 4086 through a one way valve 4088 to a hydroseal 4090, and thereafter to a tank 4094 via the conduit 4092. The conduit 4092 extends through the tank 4094 and exits therefrom as conduit 4033B. The tank 4094 is in the form of a heat exchanger adapted to receive make-up water to replace the water evaporated at the generator 4070 via the conduit 4096. This cools the weak refrigerant/absorbent solution passing therethrough to the conduit 4033B. Conduits 4098 supply water to be cooled to the tank 4094 and extends therethrough and exits therefrom at a lower temperature.

Figure 29:
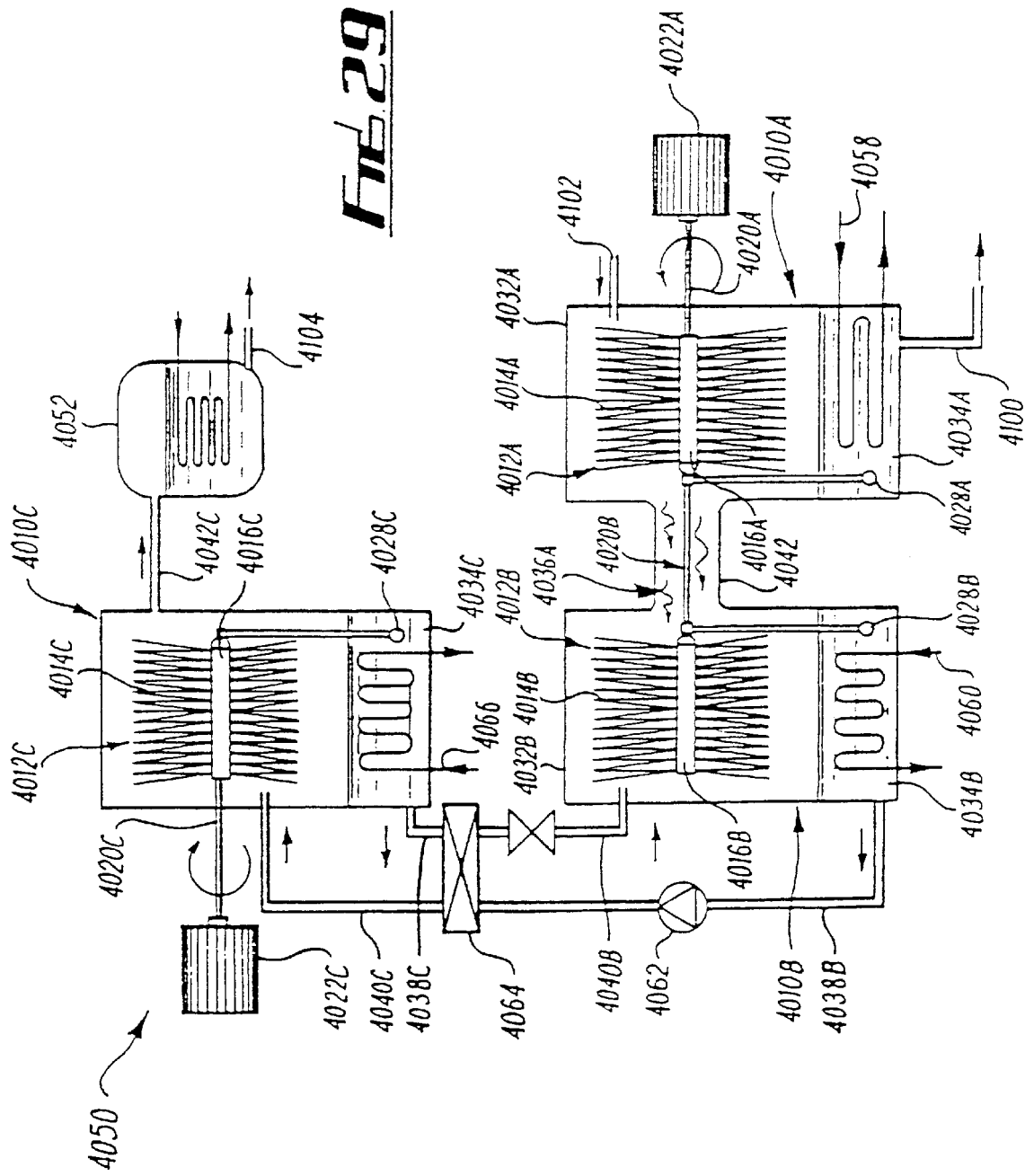

Referring to FIG. 29 there is shown a heat transfer assembly 4050 which can be used, for example, in water desalination. The assembly 4050 comprises an evaporator 4010A, and an absorber 4010B, which operate in the same manner as the evaporators 4010A and the absorbers 4010B shown in FIGS. 25 and 26. The only difference in the operation of the evaporator 4010A shown in FIG. 29 are that it receives incoming water to be desalinated from outside the assembly, rather than recycled water from the condenser, and the evaporator 4010A comprises an outlet conduit 4100 for discharging the concentrated salt solution therefrom.

In operation, the salt solution is fed via an inlet pipe 4102 to the evaporator 4010A. The salt solution is dispersed over the needles 4014A and can collect in the reservoir 4034A. The incoming solution from the conduit 4102 is at a low pressure and is evaporated on the needles 4014A on rotation of the rotatable heat exchanger 4012A. A concentrated salt solution collects in the reservoir 4034A and this is discharged via the discharge conduit 4100. The evaporated refrigerant passes to the absorber 4010B where it is absorbed into an absorbent on the needles 4014B to form a strong refrigerant/absorbent solution. This solution is then pumped by a pump 4062A via a pipe 4038B to a heat exchanger to be heated and thereafter to the generator 4010C to be dispersed over the needles 4014C by the scoop pipe 4028C on rotation of the needles by the rotatable motor 4022C. Heat is supplied to the generator 4020C by conduit 4066 carrying heated fluid. This causes the refrigerant in the refrigerant/absorbent solution on the needles 4014C to be evaporated and thereafter passed via conduit 4042C to the condenser 4052 to be condensed thereby and thereafter the liquid water is passed via conduit 4104 to waste or storage. The evaporation of the refrigerant from the strong refrigerant/absorbent solution leaves a weak refrigerant/absorbent solution which is passed via conduit 4038C and heat exchanger 4064 where it is cooled and fed back to the absorber 4010 via the conduit 4040B.

Figure 30:
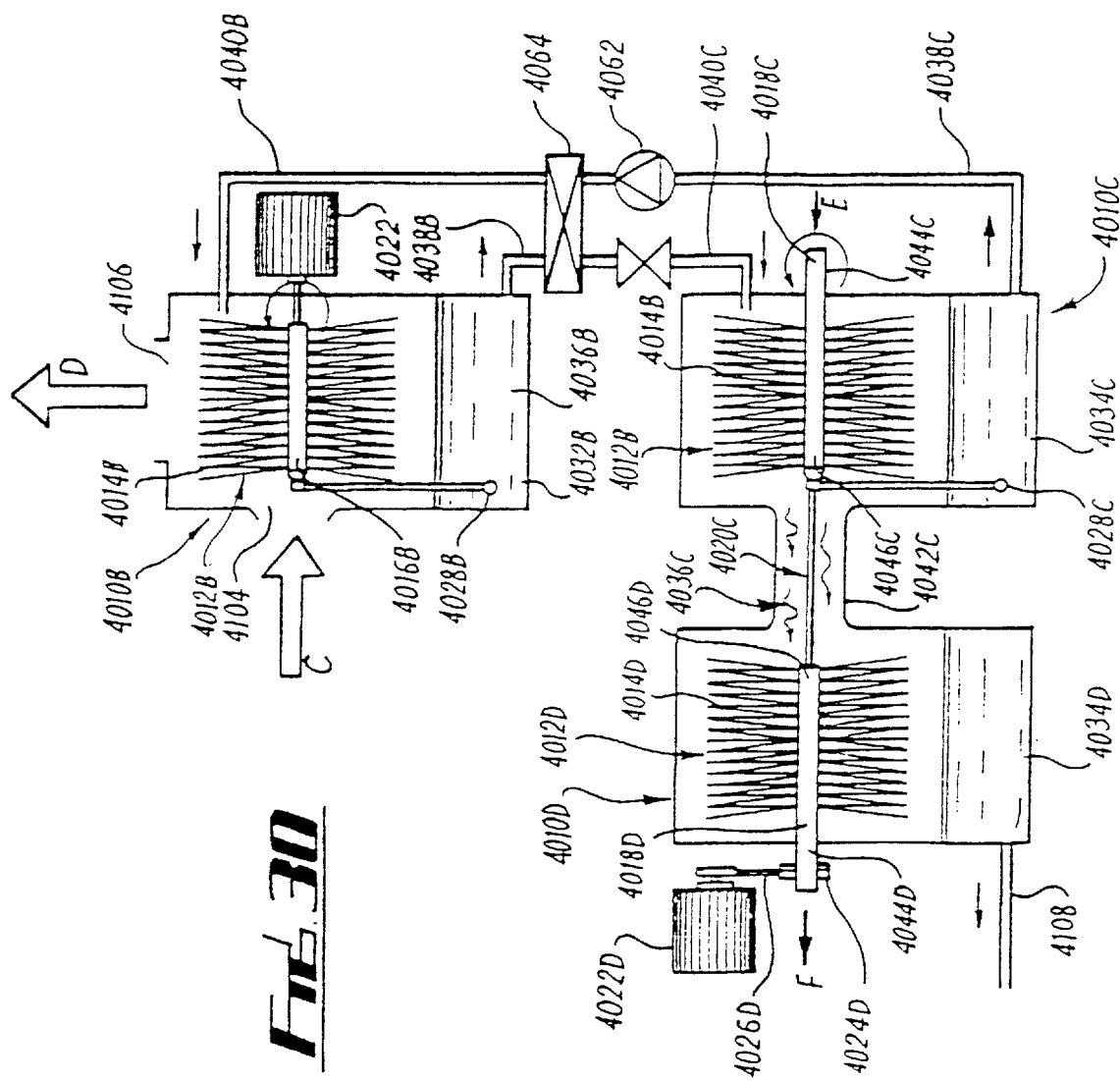

Referring to FIG. 30 there is shown a de-humidification assembly which comprises an absorber 4010B, a generator 4010C, and a condenser 4010D.

The absorber 4010B is of the type shown in FIG. 23, and comprises a rotatable heat exchanger 4012B comprising a spindle 4016B and a plurality of needles 4014B extending therefrom. Heat transfer apparatus 4010B further includes a reservoir 4032B to hold a refrigerant/absorbent solution 4036B and a scoop pipe 4028B for transferring a solution 4036B from the reservoir 4032B to the needles 4014B. In operation, incoming humid warm air is passed to the rotatable heat exchanger 4012B via an inlet 4104 as shown by the arrow C. The rotatable heat exchanger 4012B is rotated by the drive motor 4022 and the needles are covered in the absorbent solution 4036B. This absorbs water in the air entering the heat exchanger 4010B so that dry air heated by the heat absorption exits from the absorber 4010B via the outlet 4010C as shown by the arrow D.

The absorption of the water into the absorbent 4036B produces a strong refrigerant/absorbent solution which is passed via conduit 4038B to heat exchanger 4064 to be heated and thereafter through conduit 4040C to the generator 4010C which is of a construction similar to the heat transfer apparatus shown in FIG. 24, and comprises a heat pipe 4018C to which heat is supplied to the first end region 4034C as shown by the arrow D. Heat is transferred along the heat pipe 4018C to the second end region 4046C to evaporate the refrigerant from the incoming refrigerant/absorbent solution. Evaporated refrigerant 4036C passes along the conduit 4042C, and the weak refrigerant/absorbent solution is pumped via the line 4038C by the pump 4062 to the heat exchanger 4064 to be cooled and thereafter passed by the line 4040B to the absorber 4010B. The refrigerant 4036C entering the condenser 4010D is condensed therein on the needles 4014D of the rotatable heat exchanger 4012D. The condensed refrigerant collects in the reservoir 4034D to be discharged therefrom via the outlet conduits 4108.

Heat is removed from the heat pipe 4018D as shown by the arrow F, which means that heat is transferred from the second end region 4046D to the first end region 4044D to create the condensing effect. The rotatable heat exchangers 4012B,4012D are connected together by the elongate rod 4020C and are rotated by operation of the motor 4022D connected to the heat pipe 4018D by a pulley 4024D and belt 4026D.

Figure 31:
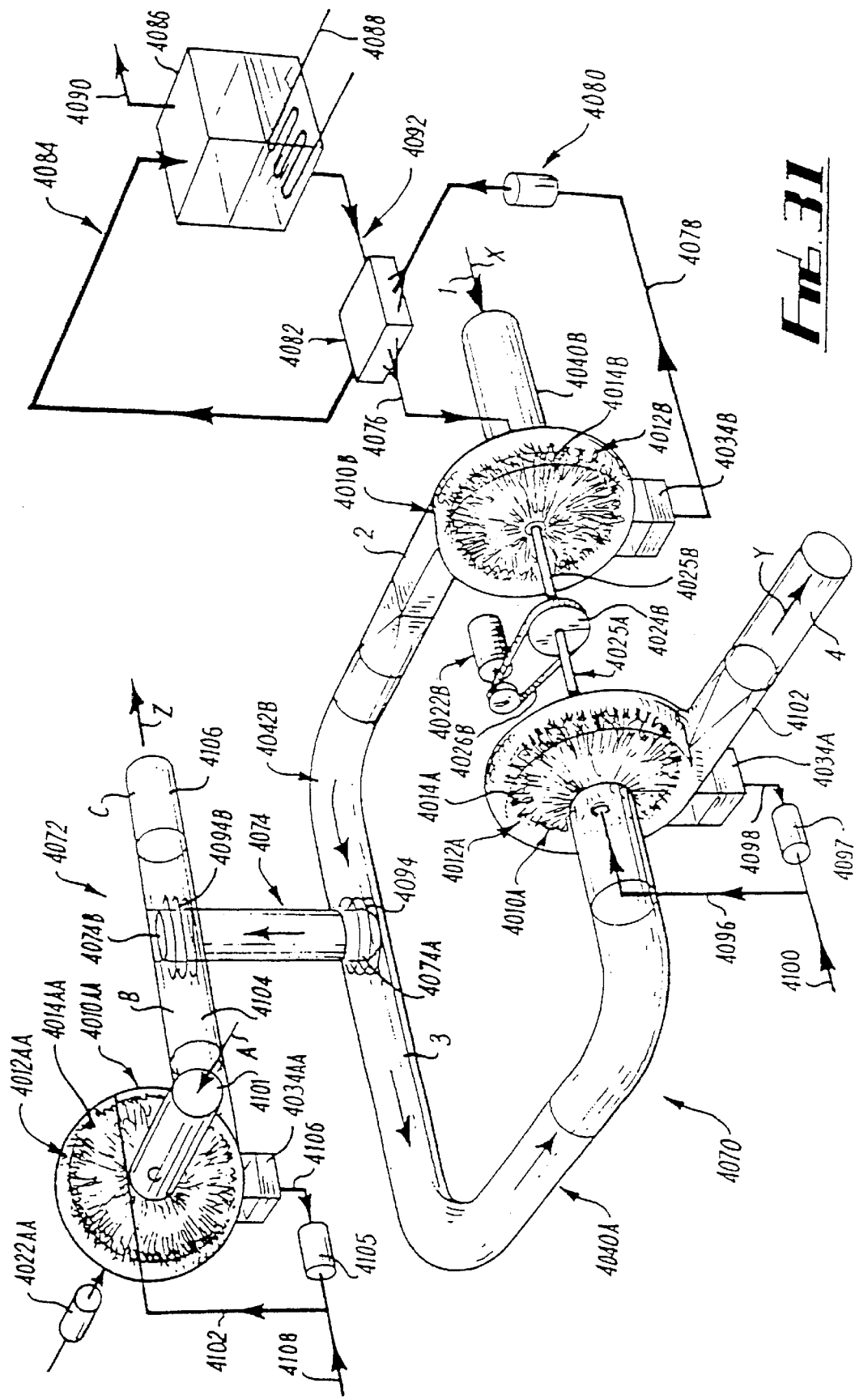
Figure 32:
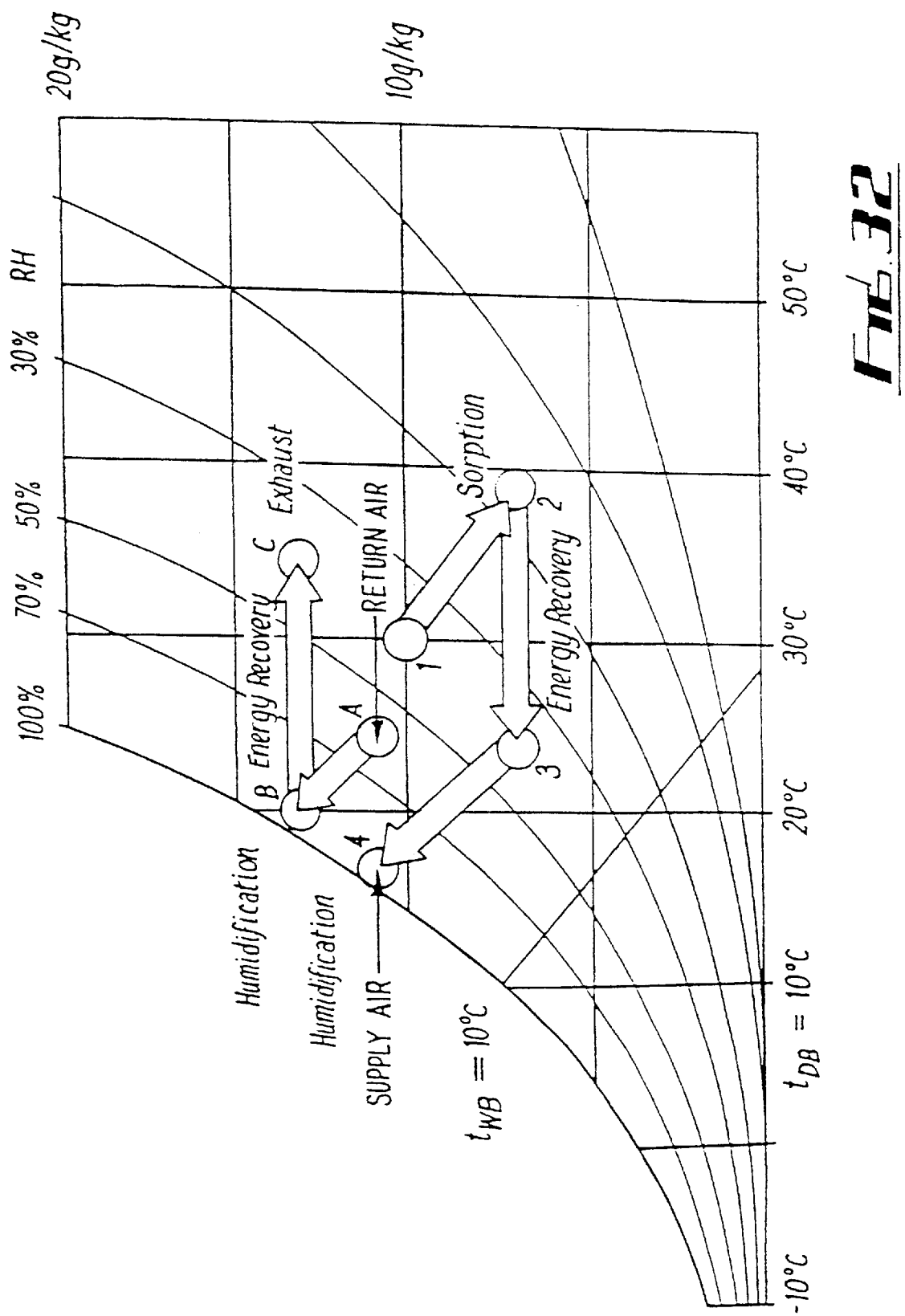
FIG. 32 is a psychometric chart representing the cycles of the assembly shown in FIG. 31.

Referring to FIGS. 31 and 32, FIG. 31 shows an air conditioning assembly which comprises a first open cycle 4070 and a second open cycle 4072 thermodynamically connected by a heat pipe 4074.

The first cycle 4070 comprises an absorber 4010B adapted to receive incoming air from outside the room or building to be cooled, as indicated by arrow 1. The air so entering passes along a conduit 4040B to a rotatable heat exchanger 4012B which can be rotated by a motor 4022B connected to the heat exchanger 4012B via a belt 4026B and pulley 4024B system and a spindle 4025B. A spindle 4025A extends to a first evaporator 4010A as will be explained below.

An absorbent is passed via a conduit 4076 to the needles 4014B of the rotary heat exchanger 4012B whereby water in the incoming air is absorbed.

Heat of absorption warms the incoming air, and the warmed dried air is passed via an outlet conduit 4042B towards a first evaporator 4010A.

The strong refrigerant/absorbent solution i.e. the solution which is the result of the water in the air being absorbed in the absorbent, is collected in a reservoir 4034B and pumped via a conduit 4078 by a pump 4080 to a heat exchanger 4082 to be further warmed. Thereafter the strong absorbent/refrigerant solution is passed via a conduit 4084 to a generator 4086, in which a heating element 4088 causes the water in the solution to be evaporated and passed to the atmosphere as shown at 4090.

The weak refrigerant/absorbent solution is then passed via a conduit 4092 to the heat exchanger 4082 to be cooled and thereafter passed via conduit 4076 to the absorber 4010B.

The warmed dried air in the conduit 4042B passes over a first end region 4074A of the heat pipe 4074 where heat is transferred via fins 4094 to the heat pipe 4074 to transfer heat to the second cycle 4072 as will be explained below.

On transferring heat to the heat pipe 4074, the air in the conduit 4042B is cooled and passes therefrom via a conduit 4040A to the first evaporator 4010A which includes a rotatable heat exchanger 4012A having needles 4014A.

The rotatable heat exchanger is rotated by means of the motor 4022B which operates via a belt 4026B and a pulley 4024B to transmit the rotational force of the motor to the rotary heat exchanger 4012A via a spindle 4025A.

A refrigerant, in the form of water is fed to the rotary heat exchanger via a conduit 4096 to coat the needles 4014A. Evaporation of the water on the needles cools the air entering the evaporator 4010A and increases the humidity of the air. Cooled humid air exits from the evaporator 4010A via a conduit 4102 as shown by the arrow Y to the room or building to be cooled.

Unevaporated water is collected in a reservoir 4034A to be recycled back to the evaporator 4010A by a pump 4097 via a conduit 4098 and the conduit 4096. The water lost by evaporation is replaced by incoming water via the conduit 4100.

The second cycle 4072 comprises a second evaporator 4010AA adapted to receive warm air from the room or building to be cooled via a conduit 101. The second evaporator 4010AA comprises a rotatable heat exchanger 4012AA.

A refrigerant, e.g. water is passed via a conduit 4102 onto the needles 4014AA of the rotatable heat exchanger 4012AA, which is rotated by a motor 4022AA. The water is evaporated on the needles 4012AA which cools and humidifies the incoming air from the conduit 4101. The cooled, humidified air is then passed via a conduit 4104 over a second end region 4074B of the heat pipe 4074 whereby heat is transferred via fins 4094B from the heat pipe 4074 to the warmed air is then exhausted via a conduit 4106 to atmosphere, as shown by arrow Z. Unevaporated water is collected in a reservoir 4034AA to be recycled by a pump 4105 back to the rotatable heat exchanger 4012AA via conduits 4106 and 4102 along with incoming water from conduit 4108 to replace water lost by evaporation.

Referring to FIG. 32 there is shown a psychrometic chart showing the changes in temperature and humidity of the air as it passes through the two cycles of the apparatus shown in FIG. 31.

If FIG. 32 is cross-referenced with FIG. 31, it will be seen that there are four ringed numbers 1,2,3 and 4, and these ringed letters A,B, and C. Each of these represent a point on the psychrometic chart in FIG. 32 which has been designated with the same number or letter.

Referring to FIG. 32 air passing between points 1 and 2 increases in temperature and reduces in humidity as water is absorbed by the absorbent in the absorber 4010B and the air is warmed by the heat of absorption.

The air passing between points 2 and 3 reduces in temperature as the air passes over the first end region 4074A of the heat pipe 4074 which extracts heat from the air.

The air passing between points 3 and 4 increases in humidity and decreases in temperature, as the evaporator cools the air by evaporation and the evaporated water humidifies the air. Thus, cooled air is passed into the room of building to be cooled.

The air passing between points B and C increases in temperature as the air passes of the second end region 4074B of the heat pipe 4074 to extract heat therefrom.

Figure 33:
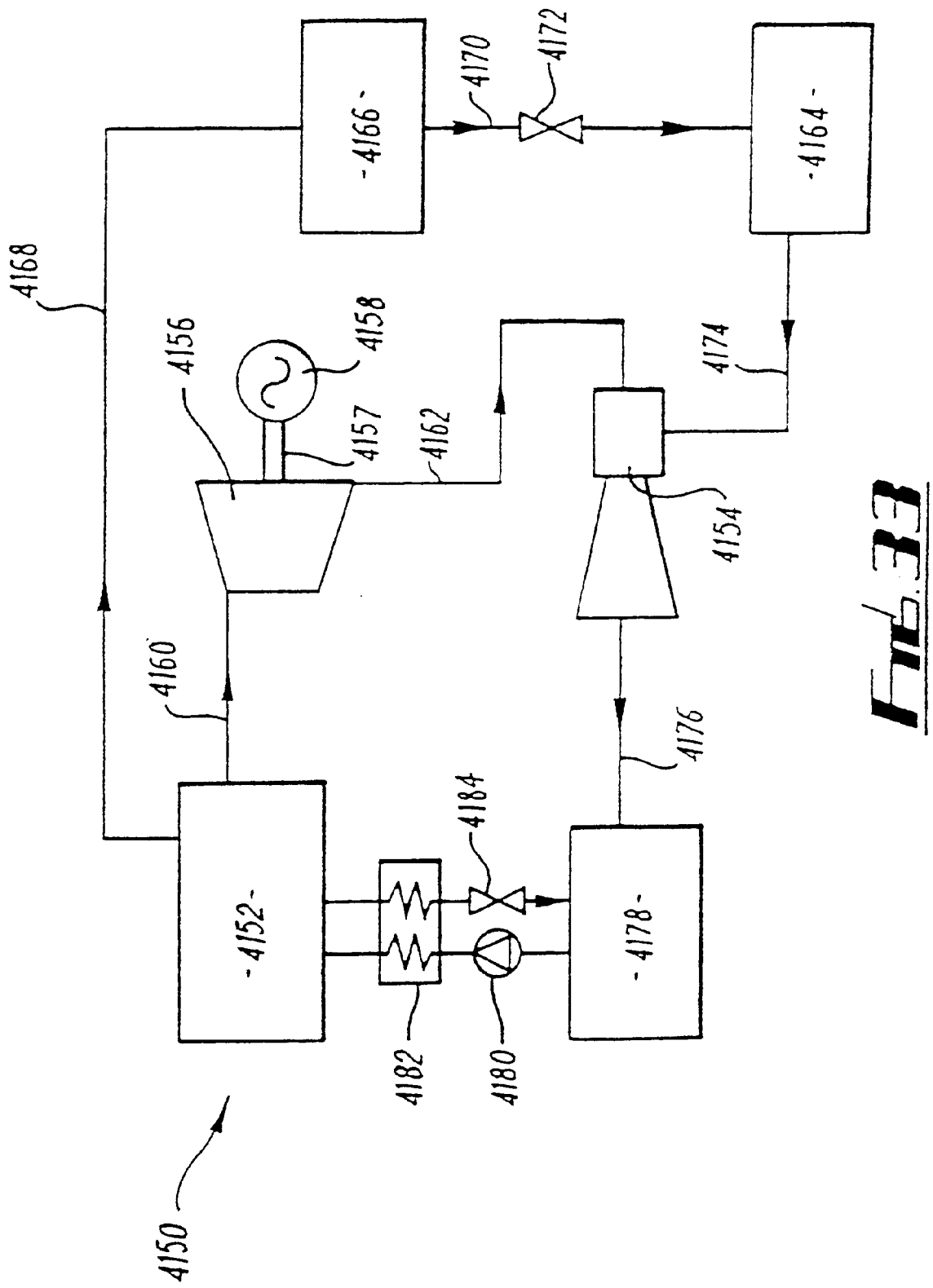
FIG. 33 is a schematic representation of another embodiment of heat transfer apparatus.

FIGS. 33 to 37 show various embodiments of heat transfer apparatus 4130. In FIG. 33, the apparatus 4150 comprises a generator 4152 to which heat is supplied for generating the evaporated refrigerant, an ejector 4154 to receive evaporated refrigerant from the generator 4152 via work extraction means in the form of a turbine 4156. The turbine 4156 is connected by a shaft 4157 to an alternator 4158 for generating electric power. Conduit 4160 connects the generator 1152 to the turbine 1156, and conduit 1162 connects the turbine to the ejector 1154. High pressure evaporated refrigerant from the generator 1152 drives the turbine 1156 thereby producing electric power from the alternator 1158. The refrigerant from the turbine 1156 passes to the ejector 1154. The apparatus further includes an evaporator 1164 which is connected to the generator 1152 via a condenser 1166. The conduit 1168 connects the generator to the condenser, and the conduit 1170 connects the condenser to the evaporator. An expansion valve 1172 is provided in the conduit 1170 to expand the heat transfer fluid passing from the condenser 1166 to the evaporator 1164.

The remainder of the evaporated refrigerant from the generator 4152 passes along the conduit 4168 to be condensed in the condenser 4166. The condensed refrigerant is passed via the expansion valve 4172 along the conduit 4170 to the evaporator 4164, where the refrigerant is at a low pressure.

The refrigerant passing through the ejector 4154 from the turbine 4156 entrains therewith refrigerant in the evaporator 4164 via the conduit 4174. A mixture of refrigerant from the turbine 4156 and evaporator 4164 is ejected from the ejector 4154 via the conduit 4176 to an absorber 4178.

The absorber contains an absorbent to absorb the incoming refrigerant from the conduit 4176 to provide a strong refrigerant/absorbent solution. The strong refrigerant/absorbent solution is pumped by a solution pump 4180 through a heat exchanger 4182 to be heated and thereafter to the generator 4152 where the refrigerant in the strong refrigerant/absorbent solution is evaporated to reduce a weak refrigerant/absorbent solution which is returned to the absorber via the heat exchanger 4182 where it is cooled and a non return valve 4184.

Figure 34:
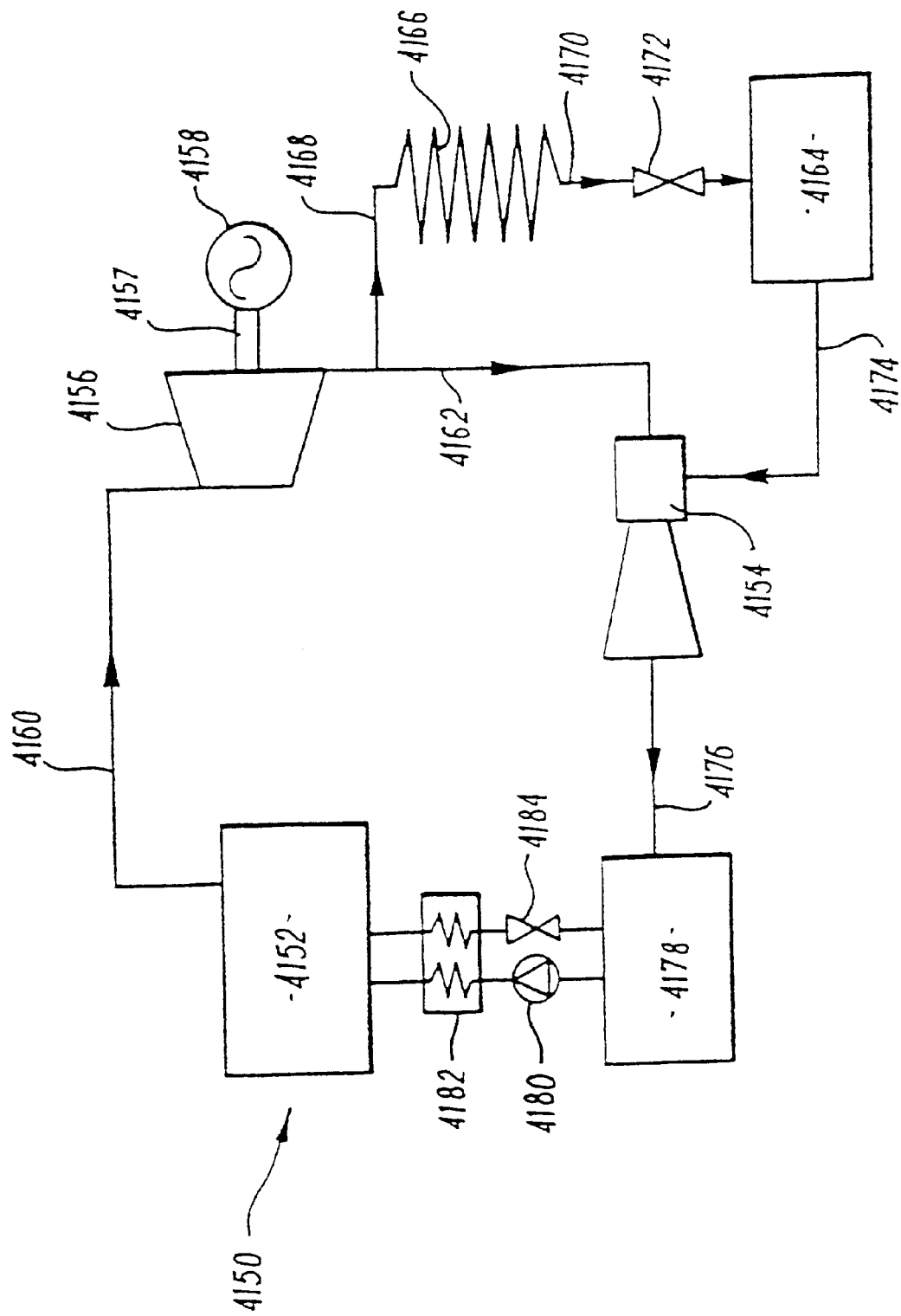
FIGS. 34 to 37 are schematic representations of modifications of the heat transfer apparatus shown in FIG. 33.

Referring to FIG. 34, similar apparatus to that shown in FIG. 33 is shown and comprises the same features as those in FIG. 33, these have been designated with the same reference numeral.

The apparatus shown in FIG. 34 differs from that shown in FIG. 33 in that the condenser 4166 is connected downstream of the turbine 4156. The conduit 4168 extends from the conduit 4162.

Each of the apparatus shown in FIG. 34, refrigerant can be water, and the absorbent can be potassium formate. The apparatus shown in these figures has the advantage that it increases the pressure in the absorber thereby preventing crystallisation of the potassium formate.

Figure 35:
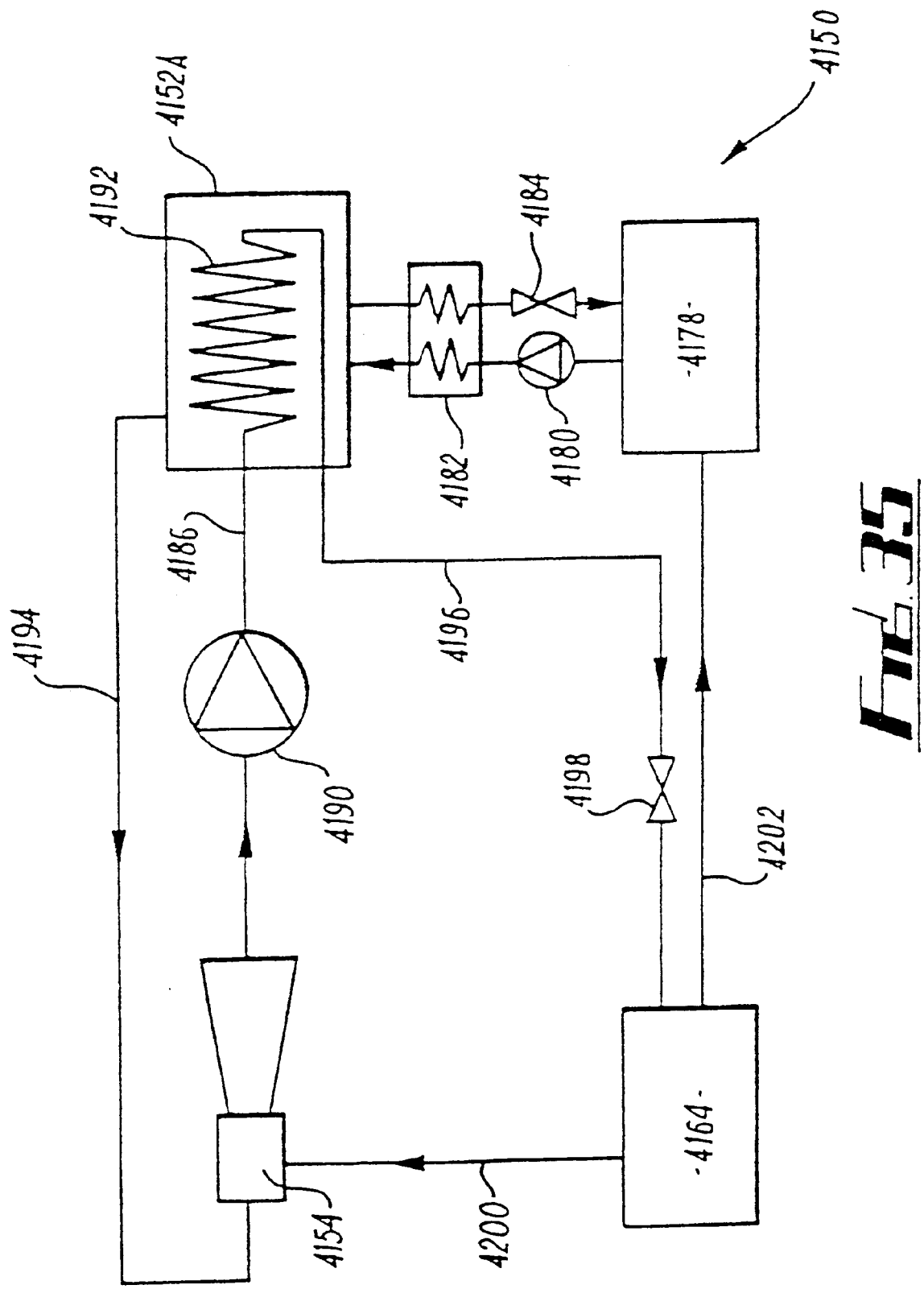

Referring to FIG. 35, the apparatus 4150 comprises many of the features of those shown in FIGS. 33 and 34, and these have been designated with the same reference numeral. In this apparatus, the generator is designated 4152A and is in the form of a heat exchanger which is supplied with heat transfer fluid ejected from the ejector 4154 via a conduit 4186. A compressor 4190 is arranged in the conduit 4186 to compress heat transfer fluid ejected from the ejector 4154. This increases the temperature of the heat transfer fluid in the conduit 4186. A heat exchanger coil 4192 extends from the conduit 4186 and the compressed refrigerant passing therethrough transfers heat to the incoming strong refrigerant/absorbent solution from the absorber 4178. This causes refrigerant in the strong refrigerant/absorbent solution to evaporate and the evaporated refrigerant is passed via conduit 4194 to the ejector 4154. The resulting solution after evaporation is a weak refrigerant/absorbent solution and this is returned to the absorber 4178 in the same way as described for FIGS. 33 and 34.

A refrigerant in the heat exchanger coil 4192 is cooled by the heat exchange and is passed by conduit 4196 via an expansion valve 4198 which reduces the pressure of the refrigerant prior to being passed to the evaporator 4164.

The refrigerant ejected through the ejector 4154 entrained with it some of the refrigerant in the evaporator 4164 which passes to the ejector 4154 via conduit 4200, to be mixed with the refrigerant passing through the ejector from conduit 4194. The remainder of the refrigerant in the evaporator 4164 passes via conduit 4202 to the absorber 4178 to be absorbed by the absorbent.

Figure 36:
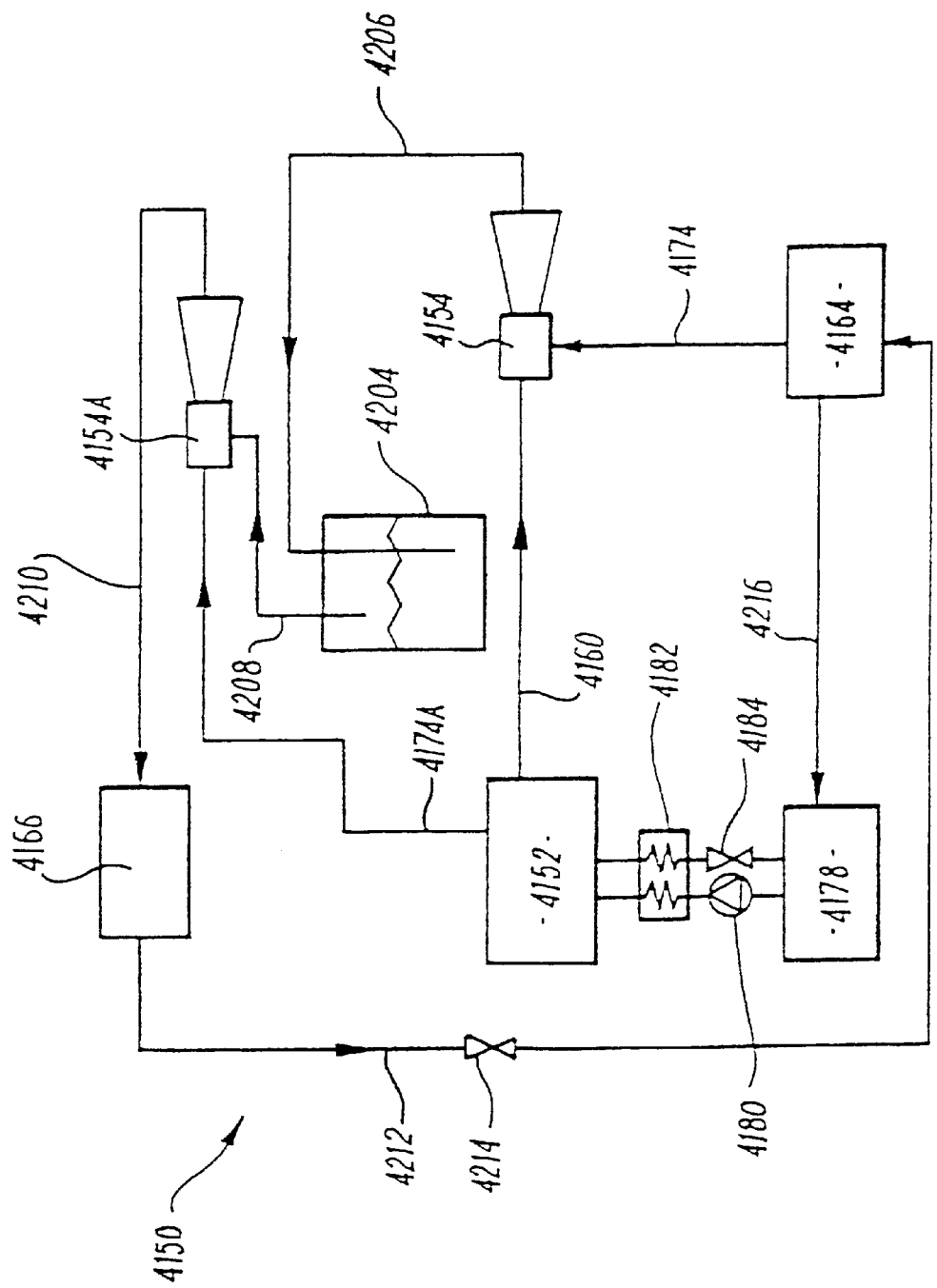

Referring to FIG. 36, there is shown a further embodiment of the apparatus 4150 which comprises first and second ejectors 4154,4154A. The apparatus 4150 shown in FIG. 36 comprises many of the features of the apparatus shown in FIGS. 33 and 34, and these have been designated with the same reference numeral.

In operation, heat is supplied to the generator 4152, to generate the refrigerant vapour. Some of the refrigerant vapour was passed via conduit 4160 to the first ejector 4154. The fluid passing through the first ejector 4154 from the conduit 4160 entrains therewith refrigerant from the evaporator 4164 via the conduit 4174. The combined refrigerant passing from the ejector 4154 is passed to cooling means 4204 via a conduit 4206.

The remainder of the evaporated refrigerant generated in the generator 4152 is passed via a conduit 4174A to the second ejector 4154A, the refrigerant passing through the second ejector 4154A entrains therewith refrigerant vapour from the cooling means 4204 via the conduit 4208. The refrigerant vapour ejected from the ejector 4154 is passed via a conduit 4210 to the condenser 4160. The condensed refrigerant is passed via a conduit 4212 and an expansion valve 4214 to the evaporator 4164. Some of the refrigerant in the evaporator 4164 is passed via conduits 4216 to the absorber 4178 which operates in the same manner as described above.

Figure 37:
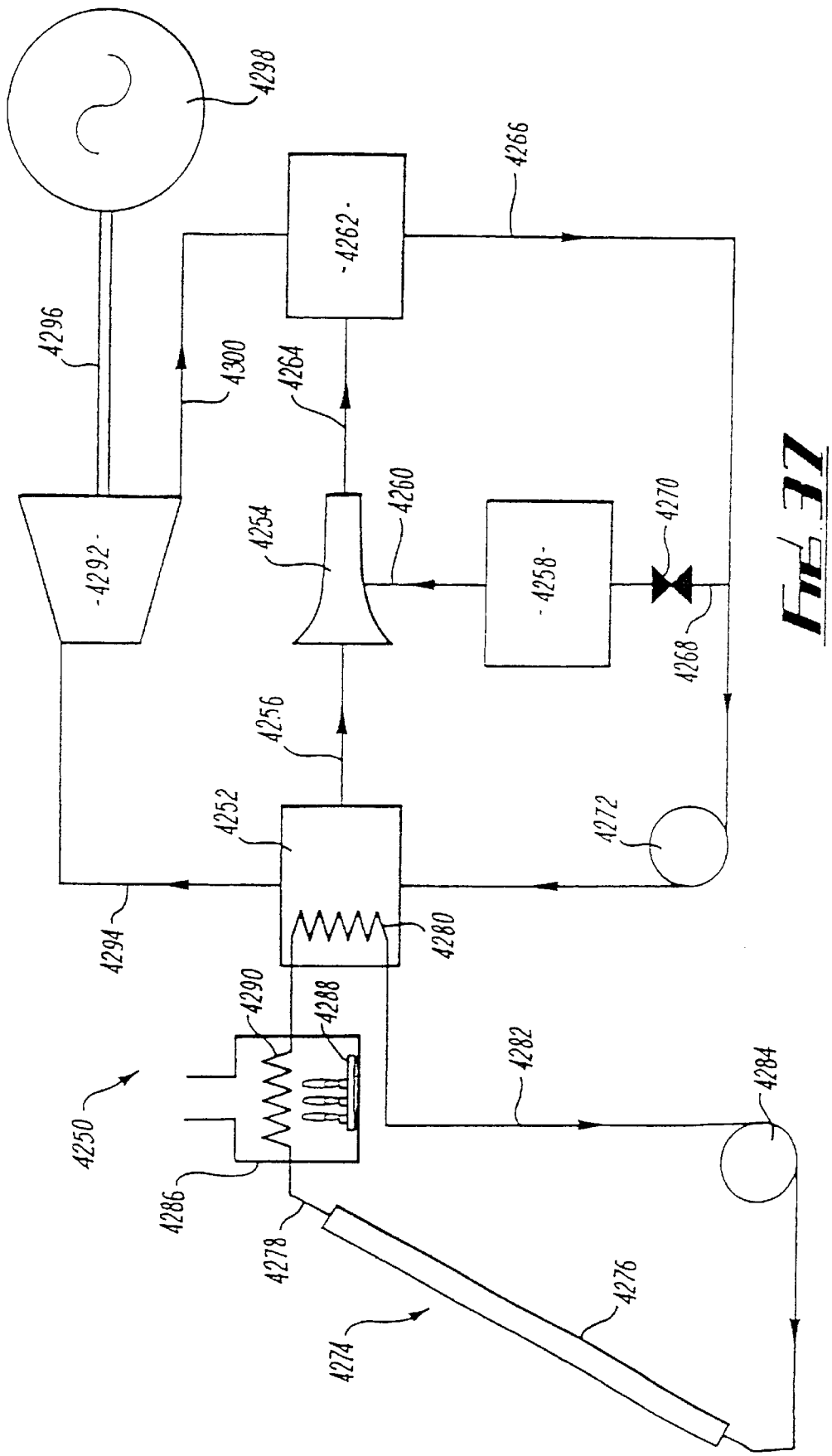

Referring to FIG. 37 there is shown heat transfer apparatus 4250 which comprises a generator 4252 to which heat is supplied for generating evaporated refrigerant, an ejector 4254 to receive evaporated refrigerant from the generator 4252 via the conduit 4256, an evaporator 4258 whereby high pressure refrigerant vapour passing through the ejector 4254 entrains low pressure refrigerant in the evaporator 4258 which passes to the ejector 4254 via the conduit 4260 to mix with the refrigerant vapour from the generator 4252, and the mixed refrigerant vapour is passed to a condenser 4262 via the conduit 4264. The refrigerant is condensed in the condenser 4262 and passed via line 4266. Some of the refrigerant in the line 4266 is passed via line 4268 through an expansion valve 4270 for entering the evaporator 4258 at low pressure. The remainder of the condensed refrigerant in the line 4266 is pumped by a pump 4272 to the generator 4252 to repeat the cycle.

The apparatus 4250 further includes heating means 4274 for supplying heat to the generator 4252. The heating means 4274 comprises a solar collector 4276 for collecting solar energy and heating refrigerant passing therethrough. The heated refrigerant from the solar collector 4276 passes via line 4278 to heating elements 4280 arranged in the generator 4252 to heat and evaporate incoming refrigerant. Refrigerant from the heating element 4280 is pumped via line 4282 by a pump 4284 back to the solar collector 4276.

Subsidiary heating means 4286 is also provided which comprises gas burners 4288. Refrigerant from the solar collector 4276 passes to heating element 4290 in the subsidiary heating means 4286 to be heated by the gas burners 4288. The heated refrigerant from the heating element 4290 is then passed to the heating element 4280 in the generator 4252.

The apparatus 4252 further comprises a turbine 4292 to which evaporated refrigerant from the generator 4252 is passed via a conduit 4294. The high pressure refrigerant from the generator 4252 drives the turbine 4292 which is connected via a shaft 4296 to an alternator 4298 which enables electricity to be generated. Refrigerant from the turbine 4292 is passed via line 4300 to the condenser to mix with incoming refrigerant from the ejector 4254.

Suitable refrigerant/absorbent combinations are as follows:

Water/Libr, methanol/Libr, water/CsOH, water/KOH. In each of these refrigerant/absorbent pairs, the refrigerant is water or methanol and the absorbent is Libr, CsOH or KOH. A further refrigerant refrigerant/absorbent pair is water as the refrigerant and a mixture of Libr and Zmbr and the absorbent. Also, it is possible to use a mixture of water as the refrigerant and potassium formate (HCOOK) as the absorbent.

Figure 38:
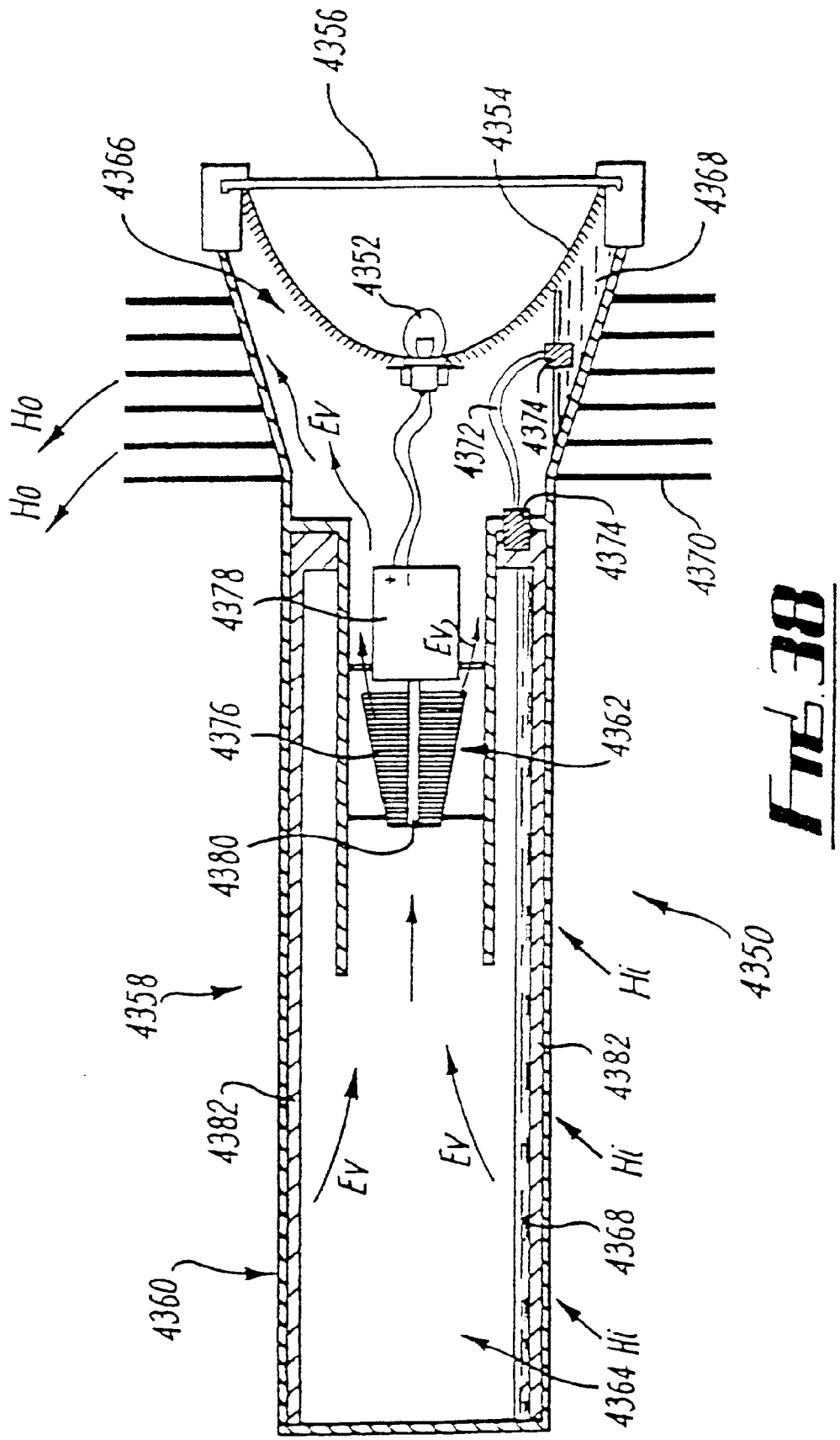

Referring to FIG. 38, there is shown a torch or lamp 4350 comprising a light bulb 4352, mounted in an appropriate holder 4354. The light bulb 4352 is shielded by clear glass or plastics material 4356.

The lamp 4350 comprises a power source 4358 in the form of a heat pipe 4360, and power generating means 4362. The heat pipe 4360 comprises a first region in the form of an evaporator 4364, and a second region in the form of a condenser 4366. A heat transfer fluid or refrigerant 4368 circulates between the evaporator 4364 and the condenser 4366.

In operation heat is applied to the evaporator 4364 as will be discussed below, and as shown by the arrows Hi. This causes the refrigerant 4368 to evaporate as shown by the arrows marked Ev to produce high pressure refrigerant vapour in the evaporator 4364.

The high pressure refrigerant vapour in the evaporator 4364 passes therefrom to the condenser 4366 where heat is extracted therefrom, as shown by the arrow Ho. This causes the refrigerant in the condenser 4366 to condense. The extraction of the heat is facilitated by the provision of fins 4370. Transport means in the form of a conduit 4372 and wicks 4374 return the condensed refrigerant 4368 from the condenser 4366 to the evaporator 4364.

The electricity generating means 4362 is arranged in the path of the refrigerant vapour 4368 as it passes from the evaporator 4364 to the condenser 4366. The electricity generating means 4362 comprises a turbine 4376 to an alternator 4378 connected to the turbine 4376 by a shaft 4380.

The evaporated refrigerant passes through the turbine 4376 thereby causing it to rotate which rotation is transmitted to the alternator 4378 by the shaft 4380 to generate electricity to light the light bulb 4352.

The evaporator 4364 includes a wick 4382 which extends around the circumference thereof and along the length of the evaporator 4364.

Figure 39:
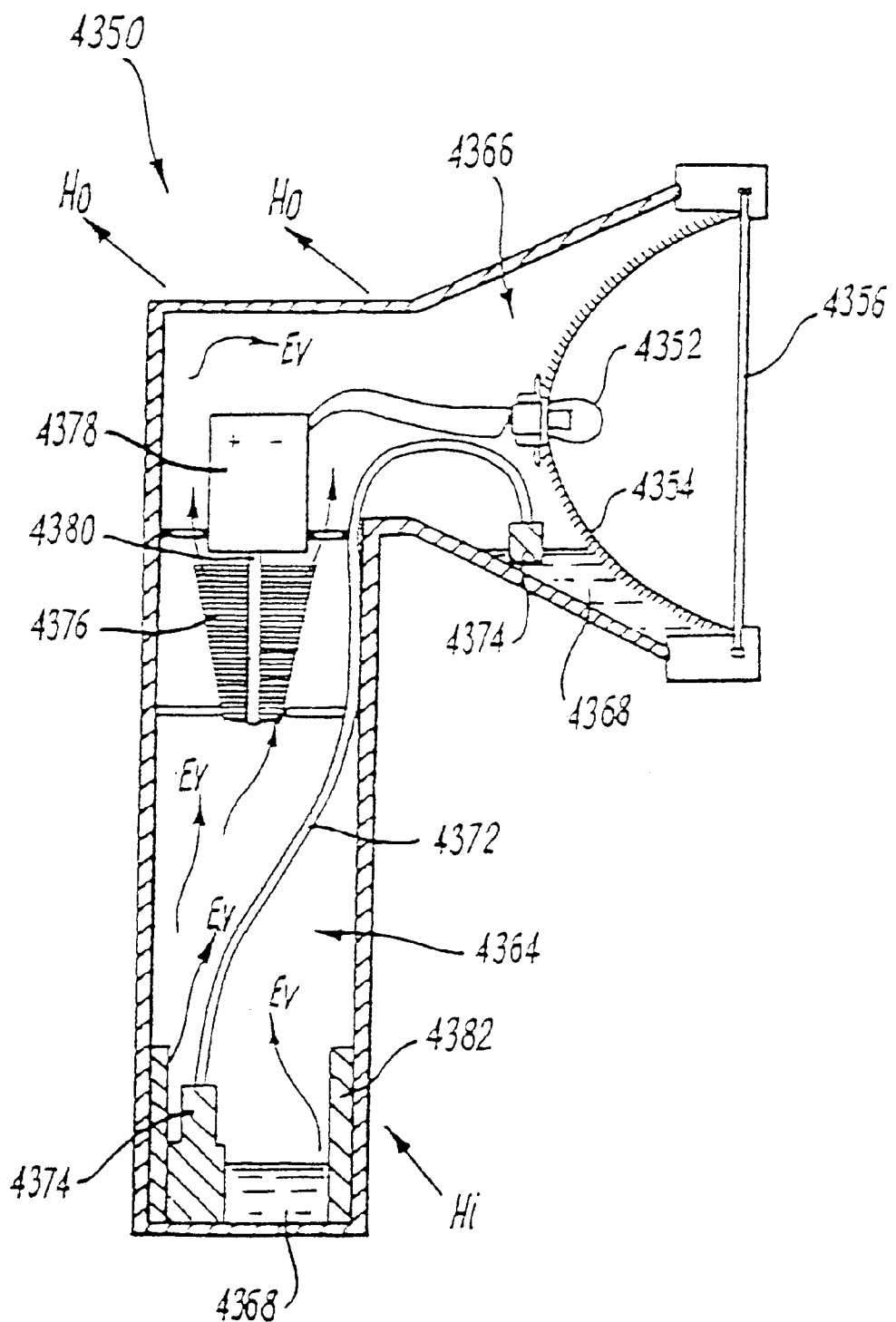

Referring to FIG. 39, there is shown a further embodiment of the torch or lamp 4350 which comprises many of the same features as those shown in FIG. 38, and these have been designated with the same reference numeral.

The lamp 4350 shown in FIG. 39 differs from that shown in FIG. 38 in that the condenser is angled at substantially 90° to the evaporator, and the transport means for returning the condensed refrigerant to the evaporator comprises a conduit 4372 which is longer than the conduit 4372 as shown in FIG. 38. Also, the wick 4382 extending around the circumference of the evaporator 4364 is provided only around the lower end region thereof, as shown.

Referring to FIG. 40, there is shown further embodiment of the lamp 4350 which is similar to the embodiments shown in FIGS. 38 and 39, and the same features have been designated with the same reference numeral. The embodiment shown in FIG. 40 differs from the embodiment shown in FIGS. 38 and 39 in that the condensed refrigerant 4368 in the condenser 4366 is collected on a surface 4384.

The lamp 4350 shown in FIG. 40 is also provided with a handle 4386 to enable the lamp 4350 to be carried.

Heat can be supplied to the evaporator 4364 of the lamp shown in FIGS. 38 to 40 by various means. For example, by body heat for example supplied by a person holding it, solar energy, waste heat or by the use of thermal storage material such as phase change materials. An example of such a phase change material is TERMAC TH 30. Phase change materials could be used to power the lamps 4350 as shown in FIGS. 38 to 40 in applications which involve high safety risks such as in mines or fuel tankers, i.e. those areas where explosive gases may be present. Phase change materials can be used to supply heat to the lamps 4350 at a temperature and can be integrated with the evaporator section in the lamp, or held in a separate container connected thereto.

Various modifications can be made without departing from the scope of the invention.

Whist endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. Heat transfer apparatus comprising:

a rotatable heat exchanger including a rotatable shaft;

the apparatus further including a drive connected to the shaft for rotating the heat exchanger;

a supply for supplying a heat transfer fluid to the rotatable heat exchanger; and, the rotatable heat exchanger including a plurality of elongate elements extending outwardly from the rotatable shaft;

the length of each elongate element being greater than the diameter of the rotatable shaft;

whereby when the heat exchanger is rotated, heat can be transferred to or from the heat transfer fluid at said elongate elements.

2. Heat transfer apparatus according to claim 1 wherein the elongate elements comprise fins in the form a selected one of spines, needles and narrow strips.

3. Heat transfer apparatus according to claim 1 comprising a housing for the rotatable heat exchanger, the housing including a reservoir to hold a liquid, and further including collection means to collect some of said liquid and deliver the liquid to the elongate elements of the rotatable heat exchanger.

4. Heat transfer apparatus according to claim 3 wherein the collection means comprises a pipe rotatable with said rotatable heat exchanger, and being fixedly mounted on the shaft for rotation.

5. Heat transfer apparatus according to claim 1, wherein the rotatable shaft comprises a conduit capable of transferring heat from one end region thereof to the opposite end region, upon which conduit the elongate elements are fixedly mounted.

6. A heat transfer assembly comprising a heat transfer apparatus as claimed in claim 1 connected to at least one further heat transfer apparatus for transferring the heat transfer fluid from one region of the assembly to another thereby transferring heat from one region of the assembly to another.

7. A heat transfer assembly according to claim 6 wherein the, at least one, or each, of said further heat transfer apparatus is in the form of said heat transfer apparatus.

8. A heat transfer assembly according to claim 6 comprises an evaporator for evaporating expanded heat transfer fluid, an absorber to receive said evaporated heat transfer fluid from the evaporator, the absorber containing an absorbent to absorb said heat transfer fluid, to produce a strong heat transfer fluid/absorbent solution, a generator for receiving said strong solution to generate evaporated heat transfer fluid and to produce a weak heat transfer fluid/absorbent solution, and a condenser to receive and condense said evaporated heat transfer fluid from the generator.

9. A heat transfer assembly according to claim 8 wherein at least one of the evaporator, the absorber, the generator, and the condenser comprises a heat transfer apparatus.

10. The heat transfer apparatus of claim 1 wherein the elongate elements have a length substantially greater than the diameter of the shaft.

11. The heat transfer apparatus of claim 1 wherein the elongate elements have a length and several tines the diameter of the shaft.

12. A heat transfer according to claim 1 wherein heat exchange is effected without a separate blower mechanism to effect air circulation.

* * * * *